United States Patent
Takasaki et al.

(10) Patent No.: US 10,649,124 B2
(45) Date of Patent: May 12, 2020

(54) COMPOSITION INCLUDING COMPOUND HAVING MESOGENIC GROUP, POLYMER AND OPTICALLY ANISOTROPIC BODY OBTAINED BY POLYMERIZING POLYMERIZABLE COMPOSITION, AND PHASE DIFFERENCE FILM

(71) Applicant: DIC Corporation, Tokyo (JP)

(72) Inventors: Mika Takasaki, Kita-adachi-gun (JP); Masahiro Horiguchi, Kita-adachi-gun (JP); Yasuhiro Kuwana, Kita-adachi-gun (JP)

(73) Assignee: DIC CORPORATION, Tokyo (JP)

( * ) Notice: Subject to any disclaimer, the term of this patent is extended or adjusted under 35 U.S.C. 154(b) by 135 days.

(21) Appl. No.: 15/757,421

(22) PCT Filed: Jul. 14, 2016

(86) PCT No.: PCT/JP2016/070829
§ 371 (c)(1),
(2) Date: Mar. 5, 2018

(87) PCT Pub. No.: WO2017/038266
PCT Pub. Date: Mar. 9, 2017

(65) Prior Publication Data
US 2019/0025490 A1  Jan. 24, 2019

(30) Foreign Application Priority Data
Sep. 3, 2015 (JP) ................. 2015-173756

(51) Int. Cl.
| | | |
|---|---|---|
| *G02B 26/00* | (2006.01) | |
| *G02B 5/30* | (2006.01) | |
| *C08F 2/48* | (2006.01) | |
| *C09K 19/34* | (2006.01) | |
| *C09K 19/54* | (2006.01) | |
| *C08F 222/10* | (2006.01) | |
| *C09K 19/20* | (2006.01) | |
| *C08F 220/36* | (2006.01) | |
| *C09K 19/02* | (2006.01) | |
| *C08F 226/06* | (2006.01) | |
| *C08F 220/30* | (2006.01) | |
| *G02F 1/13363* | (2006.01) | |
| *C09K 19/04* | (2006.01) | |
| *C08F 220/10* | (2006.01) | |

(52) U.S. Cl.
CPC .............. *G02B 5/3083* (2013.01); *C08F 2/48* (2013.01); *C08F 220/30* (2013.01); *C08F 220/36* (2013.01); *C08F 222/1006* (2013.01); *C08F 226/06* (2013.01); *C09K 19/02* (2013.01); *C09K 19/2007* (2013.01); *C09K 19/3491* (2013.01); *C09K 19/3497* (2013.01); *C09K 19/54* (2013.01); *C09K 19/542* (2013.01); *G02B 5/30* (2013.01); *G02F 1/13363* (2013.01); *C08F 220/10* (2013.01); *C09K 2019/0448* (2013.01); *C09K 2019/2078* (2013.01); *C09K 2019/3408* (2013.01); *C09K 2019/3433* (2013.01); *G02F 2001/133637* (2013.01)

(58) Field of Classification Search
CPC ..................................................... G02B 5/3083
USPC .......................................................... 359/238
See application file for complete search history.

(56) References Cited

U.S. PATENT DOCUMENTS

| | | | |
|---|---|---|---|
| 6,514,578 B1 | 2/2003 | Farrand | |
| 2012/0224245 A1 | 9/2012 | Adlem et al. | |
| 2017/0029655 A1 | 2/2017 | Hasebe et al. | |
| 2018/0037680 A1* | 2/2018 | Saito | B32B 7/02 |

FOREIGN PATENT DOCUMENTS

| | | | | |
|---|---|---|---|---|
| JP | 2003-313252 A | 11/2003 | | |
| JP | 2009-242718 | * 10/2009 | | G09K 19/38 |
| JP | 2009-242718 A | 10/2009 | | |
| JP | 2010-31223 A | 2/2010 | | |
| JP | 2011057635 A | 3/2011 | | |
| JP | 2011207765 A | 10/2011 | | |
| JP | 2013-509458 A | 3/2013 | | |
| JP | 2014081622 A | 5/2014 | | |
| WO | 2009119191 A1 | 10/2009 | | |
| WO | 2014010325 A1 | 1/2014 | | |
| WO | 2014/069515 A1 | 5/2014 | | |
| WO | 2015/080219 A1 | 6/2015 | | |

(Continued)

OTHER PUBLICATIONS

International Search Report dated Aug. 30, 2016, issued in counterpart International Application No. PCT/JP2016/070829 (2 pages).

*Primary Examiner* — James C. Jones
(74) *Attorney, Agent, or Firm* — Westerman, Hattori, Daniels & Adrian, LLP

(57) ABSTRACT

A polymerizable composition of the present invention has favorable solubility, and an optically anisotropic body using the polymerizable composition is unlikely to discolor and is excellent in heat resistance and light resistance. The problem to be solved by the present invention is to provide a polymer obtained by polymerizing the polymerizable composition and an optically anisotropic body using the polymer. The present invention relates to a polymerizable composition which includes a compound having at least one mesogenic group and satisfying an expression represented by Expression (1), and which satisfies an expression represented by Expression (2).

$0.5 \leq Y/\Delta n \leq 500$  Expression (2)

14 Claims, No Drawings

(56) References Cited

FOREIGN PATENT DOCUMENTS

| WO | 2015/080220 A1 | 6/2015 |
| WO | 2015/098702 A1 | 7/2015 |
| WO | 2015141784 A1 | 9/2015 |
| WO | 2017038267 A1 | 3/2017 |

* cited by examiner

COMPOSITION INCLUDING COMPOUND HAVING MESOGENIC GROUP, POLYMER AND OPTICALLY ANISOTROPIC BODY OBTAINED BY POLYMERIZING POLYMERIZABLE COMPOSITION, AND PHASE DIFFERENCE FILM

TECHNICAL FIELD

The present invention relates to a composition having a value of YI/Δn falling within a specific range, a polymer obtained by polymerizing a polymerizable composition, an optically anisotropic body obtained by polymerizing the polymerizable composition, and a phase difference film obtained by polymerizing the polymerizable composition, and relates to a display device, an optical element, a light-emitting device, a printed material, an optical information recording apparatus, and the like, which have the optically anisotropic body.

BACKGROUND ART

A compound having a mesogenic group is used for various optical materials. For example, a polymer having uniform alignment can be prepared by subjecting a polymerizable composition containing a compound having a mesogenic group being in a liquid crystal state to alignment, and then performing polymerization. Such a polymer can be used for a polarizing plate, a phase difference plate, and the like which are necessary for a display. In many cases, in order to satisfy required optical properties, polymerization rate, solubility, melting point, glass transition temperature, polymer transparency, mechanical strength, surface hardness, heat resistance, and light resistance, a polymerizable composition containing two or more polymerizable compounds is used. At that time, it is required for the compound having a mesogenic group to be used to provide favorable physical properties to the polymerizable composition without adversely affecting other properties.

In regard to the optically anisotropic body, it is desirable that the optically anisotropic body (film) used for a display device, an optical element, or the like is less likely to discolor in the case of being used for a long period of time, from the viewpoint of reliability. As a cause of discoloration, for example, exposure to ultraviolet and visible light from various light sources such as backlight, indoor light, and sunlight, and to various heat sources causes deterioration of the optically anisotropic body. In addition, in the case where the polymer is insufficient, discoloration may occur even by heating, ultraviolet irradiation, or the like performed to complete polymerization (PTLs 1 and 2). In the case where an optically anisotropic body which discolors or an optically anisotropic body which is likely to discolor is used, for example, for a purpose of expending a viewing angle and converting polarization of a liquid crystal display or the like, there is a problem that the quality of a display product is greatly deteriorated, since brightness or contrast of the display deteriorates, or hue of the image changes along with the use time of the display.

On the other hand, in order to improve a viewing angle of a liquid crystal display, it is required to reduce wavelength dispersibility of birefringence of a phase difference film or to reverse the wavelength dispersibility. As a material for the above purpose, various polymerizable liquid crystal compounds having reverse wavelength dispersibility or low wavelength dispersibility have been developed. However, a polymerizable liquid crystal compound having reverse wavelength dispersibility or low wavelength dispersibility has low solubility in solvents used generally, and in the case where the polymerizable composition is applied on a substrate and then polymerized, there has been a problem that unevenness easily occurred (PTL 3).

Therefore, there has been a demand for a polymerizable composition which has favorable solubility, is less likely to discolor, and has reverse wavelength dispersibility or low wavelength dispersibility.

CITATION LIST

Patent Literature

[PTL 1] JP-A-2003-313252
[PTL 2] U.S. Pat. No. 6,514,578
[PTL 3] JP-T-2013-509458

SUMMARY OF INVENTION

Technical Problem

The problem to be solved by the present invention is to provide a polymerizable composition which has favorable solubility, is likely to discolor, and has excellent heat resistance and light resistance in the case where the composition is used for an optically anisotropic body, and to provide a polymer obtained by polymerizing the polymerizable composition, and an optically anisotropic body using the polymer.

Solution to Problem

According to the present invention, there is provided a polymerizable composition including a compound having at least one mesogenic group and satisfying an expression represented by Expression (1):

$$\text{Re}(450 \text{ nm})/\text{Re}(550 \text{ nm}) < 1.05 \qquad \text{Expression (1)}$$

(in the expression, Re (450 nm) represents an in-plane phase difference at a wavelength of 450 nm obtained in the case where the molecules of the compound are aligned on a substrate such that a major axis direction of each molecule is aligned substantially horizontally with respect to the substrate, and Re (550 nm) represents an in-plane phase difference at a wavelength of 550 nm in the case where the molecules of the compound are aligned on a substrate such that a major axis direction of each molecule is aligned substantially horizontally with respect to the substrate), the composition satisfying an expression represented by Expression (2):

$$0.5 \leq \text{YI}/\Delta n \leq 500 \qquad \text{Expression (2)}$$

(in the expression, YI represents a yellowness index of a material consisting only of the above-defined compound present in the polymerizable composition, Δn represents a refractive index anisotropy of a material consisting only of the above-defined compound in the polymerizable composition, provided that a chiral compound having a mesogenic group is excluded from a material consisting only of the above-defined compound).

According to the present invention, there is further provided a polymer, an optically anisotropic body, and a phase difference film obtained by polymerizing the polymerizable composition.

Advantageous Effects of Invention

The polymerizable composition of the present invention has favorable solubility, the optically anisotropic body obtained by using the polymerizable composition of the present invention is unlikely to discolor and has excellent heat resistance and light resistance, and therefore the polymerizable composition is useful as an optical material such as a phase difference film.

DESCRIPTION OF EMBODIMENTS

A best embodiment of the present invention will be described below. In the following description, a polymerizable composition will be referred to as a polymerizable liquid crystal composition in some cases. The term "liquid crystal" means that the polymerizable composition is liquid crystalline in the case where the composition is applied, printed, or dropped on a substrate, or injected into a cell, and the composition does not necessarily be liquid crystalline as itself.

The polymerizable composition of the present invention contains at least one compound having at least one mesogenic group and satisfying an expression represented by Expression 1, and may further contain a compound not containing a mesogenic group, stabilizers, organic solvents, polymerization inhibitors, antioxidants, photopolymerization initiators, thermal polymerization initiators, surfactants, alignment control agents, chain transfer agents, infrared absorbents, thixo agents, antistatic agents, dyestuffs, fillers, ultraviolet absorbents, and the like, if necessary.

In the polymerizable composition, selection of a compound having at least one mesogenic group and satisfying an expression represented by Expression 1 which is a constituent material, and setting of combinations thereof, blending proportions, and the like are important in obtaining a material which satisfies various characteristics such as optical properties, polymerization rate, solubility, melting point, glass transition temperature, polymer transparency, mechanical strength, surface hardness, heat resistance, and light resistance which are required in the case where the composition is an optically anisotropic body. For example, a magnitude of a refractive index anisotropy of the composition is adjusted in order to satisfy optical properties required in the case where the composition is used an optically anisotropic body.

On the other hand, a purified compound having a mesogenic group is generally used for the polymerizable composition used as a material for the optically anisotropic body. The compound having a mesogenic group is purified in a producing step to become a compound having a small content of impurities. It is difficult to completely eliminate impurities even if the compound is subjected to a purification step, and thus the compound becomes to contain considerable contents of impurities in accordance with a degree of purification and the like in an actual case. In the case where a yellowness index of a compound having one or two or more mesogenic groups is measured, the more purified compound is, the lower a value of the yellowness index tends to become.

As a result of intensive studies on the constitution of the polymerizable composition satisfying characteristics required in the case where the composition is used for an optically anisotropic body, the present inventors have found that values of a yellowness index (YI) and a refractive index anisotropy ($\Delta n$) of the compound having a mesogenic group in the polymerizable composition have an influence on the characteristics of the polymerizable composition. That is, by adjusting values of a yellowness index (YI) and a refractive index anisotropy ($\Delta n$) to optimum values in the polymerizable composition, it has been found that a liquid crystal composition satisfying the characteristics required for being used as the material for the optically anisotropic body can be prepared.

The polymerizable composition is a composition satisfying the expression represented by the following expression.

$$0.5 \leq YI/\Delta n \leq 500 \qquad \text{Expression (2)}$$

(In the expression, YI represents the yellowness index of a material consisting only of the compound in the polymerizable composition, and $\Delta n$ represents the refractive index anisotropy of a material consisting only of the compound in the polymerizable composition, provided that a chiral compound having a mesogenic group is excluded from a material consisting only of the compound.)

The polymerizable composition of the present invention has favorable solubility and in order to obtain the optically anisotropic body which is obtained by using a polymerizable composition and is unlikely to discolor, a value of YI/$\Delta n$ of the material is preferably 0.5 or higher and more preferably 1.0 or higher and is preferably 500 or lower and more preferably 400 or lower.

The yellowness index (YI) is measured as below. First, a material containing only the compound having a mesogenic group in the polymerizable composition of the present invention and having the same content ratio as the % by mass in the composition is prepared. Using an acetonitrile solution containing the obtained material by a proportion of 20 ppm as a measurement object, the measurement object is put into a transparent cell having an optical path length of 1 cm, and measurement is performed using a spectrophotometer. A solvent other than acetonitrile may be used as long as the solution is a solution by which sufficient solubility of the compound having a mesogenic group can be obtained. Examples thereof include cyclopentanone, chloroform, and the like. The obtained measurement value is measured by using a cell having an optical path length of 1 cm with a concentration of the material solution as the measurement object being 20 ppm, and thus, the yellowness index of the material consisting only of the compounds having a mesogenic group in the polymerizable composition (YI) is calculated.

The refractive index anisotropy ($\Delta n$) of the material consisting only of the compounds having a mesogenic group in the polymerizable composition of the present invention is measured as below. First, a material containing only the compounds having a mesogenic group in the polymerizable composition of the present invention and having the same content ratio as the % by mass in the composition is prepared. A solution which contains the material consisting only of the compound having a mesogenic group and to which an initiator is added is applied to a glass substrate provided with a polyimide alignment film by a spin coating method, the resulting coated film is dried and then cooled, and then the film is irradiated with ultraviolet rays using a high pressure mercury lamp to be thereby cured, thereby obtaining a cured film. A phase difference and a film thickness of the obtained film are measured, and the refractive index anisotropy ($\Delta n$) of the material consisting only of the compounds having a mesogenic group in the polymerizable composition is obtained by conversion.

YI obtained as described above is divided by $\Delta n$ obtained as described above, and a value of YI/$\Delta n$ of the material consisting only of the compound having a mesogenic group in the polymerizable composition is obtained.

(Reverse Wavelength Dispersive or Low Wavelength Dispersive Compound)

The compound having at least one mesogenic group of the present invention has a characteristic that birefringence of the compound is larger on a long wavelength side than on a short wavelength side in a visible light region. Specifically, as long as Expression (1) is satisfied, the birefringence is not required to be larger on the long wavelength side than on the short wavelength side in an ultraviolet region and an infrared region.

Re(450 nm)/Re(550 nm)<1.05    Expression (1)

(In the expression, Re (450 nm) represents an in-plane phase difference at a wavelength of 450 nm in the case where the molecules of the compound are aligned on a substrate such that a major axis direction of each molecule is aligned substantially horizontally with respect to the substrate, and Re (550 nm) represents an in-plane phase difference at a wavelength of 550 nm in the case where the molecules of the compound are aligned on a substrate such that a major axis direction of each molecule is aligned substantially horizontally with respect to the substrate.)

In the compound having at least one mesogenic group and satisfying Expression (1), in Expression (1), Re (450 nm)/Re (550 nm) is preferably less than 1.00, more preferably less than 0.95, and particularly preferably less than 0.90 from the viewpoint of manifesting reverse wavelength dispersibility. From the viewpoint of low wavelength dispersibility, Re (450 nm)/Re (550 nm) is preferably 1.00 or higher and less than 1.05, more preferably 1.00 or higher and less than 1.03, and particularly preferably 1.00 or higher and less than 1.01.

(Compound Having Mesogenic Group)

As the compound having at least one mesogenic group, in the related field, as long as the compound exhibits a liquid crystal phase in the case where a plurality of compounds are mixed to form a composition, a compound having one or more polymerizable functional groups in a molecule or a compound having no polymerizable functional group in a molecule may be used without particular limitation. Further, the polymerizable liquid crystal compound alone may not exhibit liquid crystallinity. Here, since the mesogenic group is a group composed of two or more ring structures and a linking group which links these ring structures or a single bond, the group means a portion in which two or more ring structures are linked by a linking group having 2 or fewer atoms having a bond site connecting the ring structure and the ring structure in the shortest path or a single bond.

Examples of the reverse wavelength dispersive or low wavelength dispersive compound having at least one mesogenic group include those described in JP-A-2010-31223, JP-A-2009-173893, JP-A-2010-30979, JP-A-2009-227667, JP-A-2009-274984, JP-A-2011-207765, JP-A-2011-42606, JP-A-2011-246381, JP-A-2012-77055, JP-A-2011-6360, JP-A-2011-6361, JP-A-2008-107767, JP-A-2008-273925, JP-A-2009-179563, JP-A-2010-84032, WO2012/141245 A1, WO2012/147904 A1, WO2013/180217 A1, WO2014/010325 A1, WO2014/065176 A1, WO2012/169424 A1, WO2012/176679 A1, WO2014/061709 A1, JP-T-2010-522892, and JP-T-2013-509458.

More specifically, as the reverse wavelength dispersive or low wavelength dispersive compound having at least one mesogenic group, a compound represented by General Formula (I) is preferable.

[Chem. 1]

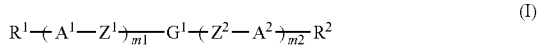

(I)

(In the formula, $R^1$ and $R^2$ each independently represent a hydrogen atom or a hydrocarbon group having 1 to 80 carbon atoms, the group may have a substituent, and an arbitrary carbon atom may be substituted with a hetero atom, $A^1$ and $A^2$ each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, and these groups may be unsubstituted or substituted with one or more of substituents L, L represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which one —CH$_2$— or two or more non-adjacent —CH$_2$—'s may be independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, an arbitrary hydrogen atom in the alkyl group may be substituted with a fluorine atom, or L may represent a group represented by $P^L$-(Sp$^L$-X$^L$)$_{kL}$— in which $P^L$ represents a polymerizable group and a preferred polymerizable group therefor is the same as in the following case of $P^0$, Sp$^L$ represents a spacer group or a single bond, a preferred spacer group therefor is the same as in the following case of Sp$^0$ and in the case where a plurality of Sp$^L$'s are present, these may be the same as or different from each other, $X^L$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —CH$_2$CH$_2$—COO—, —CH$_2$CH$_2$—OCO—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$COO—, —CH$_2$OCO—, —CH=CH—, —N=N—, —CH=N—N=CH—, —CF=CF—, —C≡C—, or a single bond, and in the case where a plurality of $X^L$'s are present, these may be the same as or different from each other, with the proviso that $P^L$-(Sp$^L$-X$^L$)$_{kL}$— does not contain an —O—O— bond, kL represents an integer of 0 to 10, and in the case where a plurality of L's are present in the compound, these may be the same as or different from each other, $Z^1$ and $Z^2$ each independently represent a group represented by —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —CH$_2$CH$_2$—COO—, —CH$_2$CH$_2$—OCO—, —OCO—CH$_2$CH$_2$—, —COO—CH$_2$—, —OCO—CH$_2$—, —CH$_2$COO—, —CH$_2$OCO—, —CH=CH—, —N=N—, —CH═N—, —N═CH—, —CH═N—N═CH—, —CF═CF—, —C≡C—, or a single bond, in the case where a plurality of $Z^1$'s are present, these may be the same as or different from each other, and in the case where a plurality of $Z^2$'s are present, these may be the same as or different from each other, but in the case where the plurality of $Z^1$'s and $Z^2$'s are present, at least one of $Z^1$ and $Z^2$ each independently represent a group selected from —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —NH—O—, —O—NH—, —SCH$_2$—, —CH$_2$S—, —CF$_2$O—, —OCF$_2$—, —CF$_2$S—, —SCF$_2$—, —CH═CH—, —N═N—, —CH═N—, —N═CH—, —CF═CF—, —C≡C—, or a single bond, $G^1$ represents a divalent group having at least one aromatic ring selected from the group consisting of an aromatic hydrocarbon ring or an aromatic heterocyclic ring, the number of π electrons contained in the aromatic ring in the group represented by $G^1$ is 12 or higher, and the group represented by $G^1$ may be unsubstituted or substituted with one or more substituents $L^G$'s, $L^G$ represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which one —CH$_2$— or two or more non-adjacent —CH$_2$—'s may be independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, an arbitrary hydrogen atom in the alkyl group may be substituted with a fluorine atom, or $L^G$ may represent a group represented by $P^{LG}$-(Sp$^{LG}$-X$^{LG}$)$_{kLG}$— in which $P^{LG}$ represents a polymerizable group and a preferred polymerizable group therefor is the same as that defined for $P^0$ above, Sp$^{LG}$ represents a spacer group or a single bond and a preferred spacer group therefor represents the same as that defined for Sp$^0$, in the case where a plurality of Sp$^{LG}$'s are present, these are the same as or different from each other, $X^{LG}$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—N═CH—, —CF═CF—, —C≡C—, or a single bond, and in the case where a plurality of $X^G$'s are present, these may be the same as or different from each other, with the proviso that $P^{LG}$-(Sp$^{LG}$-X$^{LG}$)$_{kLG}$— does not contain an —O—O— bond, kLG represents an integer of 0 to 10, and in the case where a plurality of $L^G$'s are present in the compound, these may be the same as or different from each other, and m1 and m2 each independently represent an integer of 0 to 6, provided that m1+m2 represents an integer of 0 to 6.)

From the viewpoint of mechanical strength in the case where the compound is a film, it is preferable that the reverse wavelength dispersive or low wavelength dispersive compound having at least one mesogenic group has at least one polymerizable group in a molecule thereof. From the viewpoint of liquid crystallinity, it is more preferable that the molecule has at least one group represented by General Formula (I-0-R).

[Chem. 2]

(I-0-R)

(In the formula, $P^0$ represents a polymerizable group, Sp$^0$ represents a spacer group or a single bond and in the case where a plurality of Sp$^0$'s are present, these may be the same as or different from each other, $X^0$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—N═CH—, —CF═CF—, —C≡C—, or a single bond, and in the case where a plurality of $X^0$'s are present, these may be the same as or different from each other, with the proviso that $P^0$-(Sp$^0$-X$^0$)$_{k0}$— does not contain an —O—O— bond, and k0 represents an integer of 0 to 10.)

In Formula (I-0-R), $P^0$ represents a polymerizable group, and $P^0$ preferably represents a group selected from Formulas (P-1) to (P-20).

[Chem. 3]

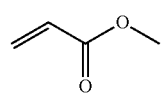

(P-1)

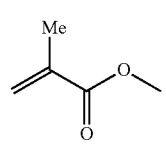

(P-2)

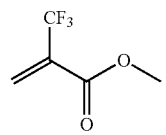

(P-3)

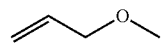

(P-4)

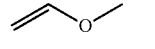

(P-5)

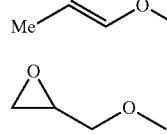

(P-6)

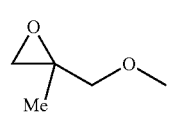

(P-7)

(P-8)

-continued

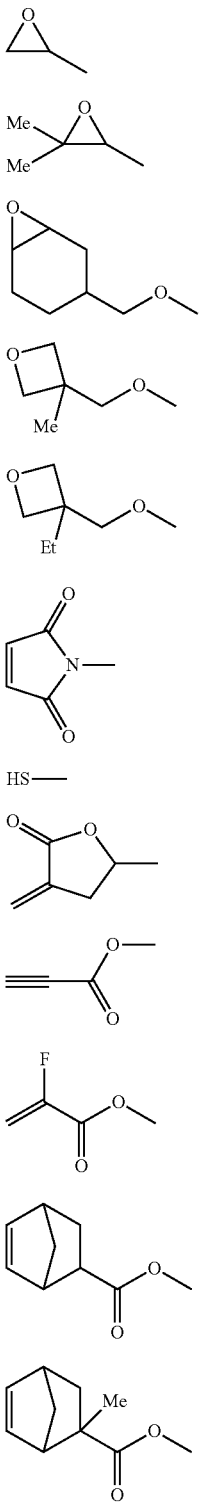

These polymerizable groups are polymerized by radical polymerization, radical addition polymerization, cationic polymerization, and anionic polymerization. In particular, in the case where ultraviolet polymerization is carried out as a polymerization method, Formula (P-1), Formula (P-2), Formula (P-3), Formula (P-4), Formula (P-5), Formula (P-7), Formula (P-11), Formula (P-13), Formula (P-15), or Formula (P-18) is preferable, Formula (P-1), Formula (P-2), Formula (P-3), Formula (P-7), Formula (P-11), or Formula (P-13) is more preferable, Formula (P-1), Formula (P-2), or Formula (P-3) is still more preferable, and Formula (P-1) or Formula (P-2) is particularly preferable.

In Formula (I-0-R), $Sp^0$ represents a spacer group or a single bond and in the case where a plurality of $Sp^0$'s are present, these may be the same as or different from each other. The spacer group may be unsubstituted or substituted with one or more substituents L described above. The spacer group may be substituted with a substituent $L^{SP}$, and preferably represents an alkylene group having 1 to 20 carbon atoms in which one —$CH_2$— or two or more non-adjacent —$CH_2$—'s may be independently substituted with —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—N=CH—, —CF=CF—, or —C≡C—. In the case where a plurality of $Sp^0$'s are present from the viewpoints of easy availability of raw materials and ease of synthesis, these may be the same as or different from each other. $Sp^0$'s each may be independently substituted with a substituent $L^{SP}$ and it is preferable that $Sp^0$'s each independently represent an alkylene group having 1 to 20 carbon atoms in which one —$CH_2$— or two or more non-adjacent —$CH_2$—'s may be independently substituted with —O—, —COO—, —OCO—, —OCO—O—, —CO—NH—, —NH—CO—, —CH=CH—, or —C≡C—. $Sp^0$'s each may be independently substituted with a methyl group and it is more preferable that $Sp^0$ each independently represent an alkylene group in which one —$CH_2$— or two or more non-adjacent —$CH_2$—'s may be independently substituted with —O—, —COO—, or —OCO—, and which has 1 to 10 carbon atoms or a single bond. It is still more preferable that $Sp^0$'s each independently represent an alkylene group having 1 to 10 carbon atoms or a single bond. In the case where the plurality of $Sp^0$'s are present, these may be the same as or different from each other. It is particularly preferable that $Sp^0$'s each independently represent an alkylene group having 1 to 8 carbon atoms.

In Formula (I-0-R), $L^{SP}$ represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which one —$CH_2$— or two or more non-adjacent —$CH_2$— may be independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—. An arbitrary hydrogen atom in the alkyl group may be substituted with a fluorine atom, or $L^{SP}$ may represent a group represented by $P^{LSP}$-$(Sp^{LSP}$-$X^{LSP})_{kLSP}$— in which $P^{LSP}$ represents a polymerizable group and a preferred polymerizable group therefor is the same as that of the case of $P^0$ above, $Sp^{LSP}$ is a spacer group or a single bond, a preferred spacer group therefor or a single bond is the same as that of the case of $Sp^0$, and in the case where a plurality of $Sp^{LSP}$'s are present, these may be the same as or different from each other, $X^{LSP}$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond and in the case where a plurality of $X^{LSP}$'s are present, these may be the same as or different from each other, with the proviso that $P^{LSP}$-$(Sp^{LSP}$-$X^{LSP})_{kLSP}$— does not contain an —O—O— bond, kLSP represents an integer of 0 to 10, and in the case where a plurality of $L^{sp}$'s are present in the compound, these may be the same as or different from each other. From the viewpoints of easy availability of raw materials and ease of synthesis, $L^{SP}$ represents a fluorine atom, a chlorine atom, a cyano group, or a linear or branched alkyl group having 1 to 10 carbon atoms in which one —CH$_2$— or two or more non-adjacent —CH$_2$—'s may be independently substituted with —O—, —S—, —CO—, —COO—, —OCO—, —CH=CH—, or —C≡C—. An arbitrary hydrogen atom in the alkyl group may be substituted with a fluorine atom, or $L^{SP}$ preferably represents a group represented by $P^{LSP}$-$(Sp^{LSP}$-$X^{LSP})_{kLSP}$—. $L^{SP}$ represents a fluorine atom or a linear alkyl group having 1 to 10 carbon atoms in which one —CH$_2$— or two or more non-adjacent —CH$_2$—'s may be independently substituted with —O—, —COO—, or —OCO—. It is more preferable that an arbitrary hydrogen atom in the alkyl group represents a group which may be substituted with a fluorine atom. It is still more preferable that L represents a fluorine atom or a methyl group. It is particularly preferable that $L^{SP}$ represents a methyl group.

In Formula (I-0-R), k0 represents an integer of 0 to 10, preferably an integer of 0 to 5, more preferably an integer of 0 to 2, and particularly preferably 1.

From the viewpoints of liquid crystallinity and ease of synthesis, it is preferable that at least one of $R^1$ and $R^2$ in General Formula (I) represents a group represented by Formula (I-0-R). From the viewpoint of mechanical strength in the case where the compound is a film, it is more preferable that $R^1$ and $R^2$ each independently represent a group represented by Formula (I-0-R), and it is particularly preferable that $R^1$ and $R^2$ each independently represent the same group represented by Formula (I-0-R).

In General Formula (I), $R^1$ and $R^2$ each may independently represent a hydrogen atom or a hydrocarbon group having 1 to 80 carbon atoms which may have a substituent, in which an arbitrary carbon atom may be substituted with a hetero atom. In the case where $R^1$ or $R^2$ represents a group other than the group represented by Formula (I-0-R), from the viewpoints of liquid crystallinity and ease of synthesis, it is preferable that $R^1$ or $R^2$ each independently represent a hydrogen atom, a fluorine atom, a chlorine atom, a bromine atom, an iodine atom, a pentafluorosulfuranyl group, a cyano group, a nitro group, an isocyano group, a thioisocyano group, or a linear or branched alkyl group having 1 to 20 carbon atoms in which one —CH$_2$— or two or more non-adjacent —CH$_2$—'s may be independently substituted with —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, or —C≡C—. It is more preferable that $R^1$ or $R^2$ each independently represent a hydrogen atom, a fluorine atom, or a chlorine atom, or a linear or branched alkyl group having has 1 to 12 carbon atoms in which one —CH$_2$— or two or more non-adjacent —CH$_2$—'s may be independently substituted with —O—, —COO—, —OCO—, or —O—CO—O—. It is still more preferable that $R^1$ or $R^2$ each independently represent a hydrogen atom, a fluorine atom, or a chlorine atom, or a linear alkyl group or a linear alkoxy group having 1 to 12 carbon atoms. It is particularly preferable that $R^1$ or $R^2$ each independently represent a linear alkyl group or a linear alkoxy group having 1 to 12 carbon atoms.

In General Formula (I), $A^1$ and $A^2$ each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group. These groups may be unsubstituted or substituted with one or more of the substituents L described above. As preferred forms, it is more preferable that $A^1$ and $A^2$ each independently represent a 1,4-phenylene group, a 1,4-cyclohexylene group, and a naphthalene-2,6-diyl group which may be unsubstituted or substituted with one or more of the substituents L. It is still more preferable that $A^1$ and $A^2$ each independently represent a group selected from Formulas (A-1) to Formula (A-11).

[Chem. 4]

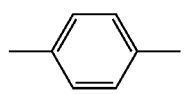

(A-1)

(A-2)

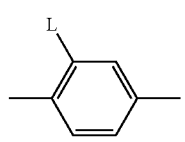

(A-3)

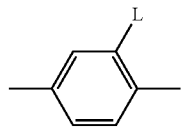

(A-4)

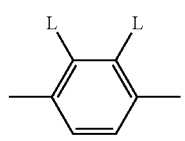

(A-5)

-continued

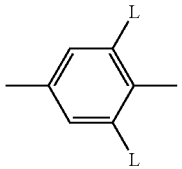
(A-6)

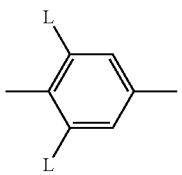
(A-7)

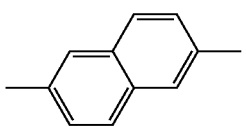
(A-8)

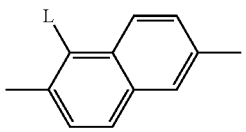
(A-9)

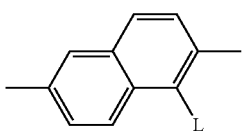
(A-10)

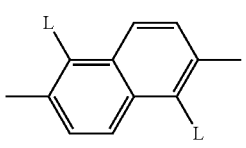
(A-11)

It is still more preferable that $A^1$ and $A^2$ each independently represent a group selected from Formulas (A-1) to (A-8). It is particularly preferable that $A^1$ and $A^2$ each independently represent a group selected from Formulas (A-1) to (A-4). From the viewpoint of reverse dispersibility, with respect to a group represented by $A^1$ bonded to a group represented by $Z^1$ adjacent to a group represented by $G^1$, and a group represented by $A^2$ bonded to a group represented by $Z^2$ adjacent to a group represented by $G^1$, it is preferable that $A^1$ and $A^2$ each independently represent a 1,4-cyclohexylene group which may be unsubstituted or substituted with one or more of the substituents L. It is more preferable that $A^1$ and $A^2$ each independently represent a group represented by Formula (A-2). In the case where a plurality of groups represented by $A^1$ and $A^2$ are present, from the viewpoints of refractive index anisotropy, ease of synthesis, and solubility in a solvent, as groups represented by $A^1$ and $A^2$ other than the above $A^1$ and the $A^2$, it is preferable that A: and $A^2$ each independently represent a 1,4-phenylene group or a naphthalene-2,6-diyl group which may be unsubstituted or substituted with one or more of the substituents L. It is more preferable that $A^1$ and $A^2$ each independently represent a group selected from Formula (A-1) and Formulas (A-3) to (A-11). It is still more preferable that $A^1$ and $A^2$ each independently represent a group selected from Formula (A-1) and Formulas (A-3) to (A-8). It is particularly preferable that $A^1$ and $A^2$ each independently represent a group selected from Formulas (A-1), (A-3), and (A-4).

In General Formula (I), L represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which one —$CH_2$— or two or more non-adjacent —CH—'s may be independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—. An arbitrary hydrogen atom in the alkyl group may be substituted with a fluorine atom. Alternatively, L may represent a group represented by $P^L$-$(Sp^L\text{-}X^L)_{kL}$— in which $P^L$ represents a polymerizable group and a preferable polymerizable group is the same as that of the case of $P^0$ above, $Sp^L$ represents a spacer group or a single bond, a preferred spacer group therefor is the same as that of the case of $Sp^0$ below, and in the case where a plurality of $Sp^L$'s are present, these may be the same as or different from each other, $X^L$ represents —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—N=CH—, —CF=CF—, —C≡C—, or a single bond, and in the case where a plurality of $X^L$'s are present, these may be the same as or different from each other, with the proviso that $P^L$-$(Sp^L\text{-}X^L)_{kL}$— does not contain an —O—O— bond, kL represents an integer of 0 to 10, and in the case where plurality of L's are present in the compound, these may be the same as or different from each other. From the viewpoints of liquid crystallinity and ease of synthesis, it is preferable that L represents a fluorine atom, a chlorine atom, a pentafluorosulfuranyl group, a nitro group, a methylamino group, a dimethylamino group, a diethylamino group, a diisopropylamino group, or a linear or branched alkyl group having 1 to 20 carbon atoms in which an arbitrary hydrogen atom may be substituted with a fluorine atom and one —$CH_2$— or two or more non-adjacent —$CH_2$—'s may be independently substituted with a group selected from —O—, —S—, —CO—, —COO—, —OCO—, —O—CO—O—, —CH=CH—, —CF=CF—, or —C≡C—. It is more preferable that L represents a fluorine atom, a chlorine atom, or a linear or branched alkyl group having 1 to 12 carbon atoms in which an arbitrary hydrogen atom may be substituted with a fluorine atom and one —$CH_2$— or two or more non-adjacent —$CH_2$—'s may be independently substituted with a group selected from —O—, —COO—, or —OCO—. It is still more preferable that L represents a fluorine atom, a chlorine atom, or a linear or branched alkyl group or alkoxy group having 1 to 12 carbon atoms in which an arbitrary hydrogen atom may be substituted with a fluorine atom. It is particularly preferable that L represents a fluorine atom, a chlorine atom, or a linear alkyl group or a linear alkoxy group having 1 to 8 carbon atoms.

In General Formula (I), $Z^1$ and $Z^2$ each independently represent a group represented by —O—, —S—, —$OCH_2$—, —CH₂O—, —CH₂CH₂—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH₂—, —CH₂S—, —CF₂O—, —OCF₂—, —CF₂S—, —SCF₂—, —CH═CH—COO—, —CH═CH—OCO—, —COO—CH═CH—, —OCO—CH═CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CH═CH—, —N═N—, —CH═N—, —N═CH—, —CH═N—N═CH—, —CF═CF—, —C≡C—, or a single bond. In the case where a plurality of Z's are present, these may be the same as or different from each other, and in the case where a plurality of $Z^2$'s are present, these may be the same as or different from each other. In the case where the plurality of $Z^1$'s and $Z^2$'s are present, at least one of $Z^1$ and $Z^2$ represents a group selected from —O—, —S—, —OCH₂—, —CH₂O—, —CH₂CH₂—, —CO—, —COO—, —OCO—, —CO—S—, —S—CO—, —O—CO—O—, —CO—NH—, —NH—CO—, —NH—O—, —O—NH—, —SCH₂—, —CH₂S—, —CF₂O—, —OCF₂—, —CF₂S—, —SCF₂—, —CH═CH—, —N═N—, —CH═N—, —N═CH—, —CF═CF—, —C≡C—, or a single bond. From the viewpoints of liquid crystallinity, ease of availability of raw materials, and ease of synthesis, it is preferable that $Z^1$ and $Z^2$ each independently represent —OCH₂—, —CH₂O—, —COO—, —OCO—, —CF₂O—, —OCF₂—, —CH₂CH₂—, —CF₂CF₂—, —CH═CH—COO—, —CH═CH—OCO—, —COO—CH═CH—, —OCO—CH═CH—, —COO—CH₂CH₂—, —OCO—CH₂CH₂—, —CH₂CH₂—COO—, —CH₂CH₂—OCO—, —CH═CH—, —CF═CF—, —C≡C—, or a single bond. It is more preferable that $Z^1$ and $Z^2$ each independently represent —OCH₂—, —CH₂O—, —COO—, —OCO—, —CF₂O—, —OCF₂—, —CH₂CH₂—, —COO—CH₂CH₂—, —OCO—CH₂CH₂—, —CH₂CH₂—COO—, —CH₂CH₂—OCO—, —CH═CH—, —C≡C—, or a single bond. It is still more preferable that $Z^1$ and $Z^2$ each independently represent —OCH₂—, —CH₂O—, —COO—, —OCO—, —CF₂O—, —OCF₂—, or a single bond. It is particularly preferable that $Z^1$ and $Z^2$ each independently represent —OCH₂—, —CH₂O—, —COO—, —OCO, or a single bond.

In General Formula (I), m1 and m2 each independently represent an integer of 0 to 6, provided that m1+m2 represents an integer of 0 to 6. From the viewpoints of solubility in a solvent and liquid crystallinity, it is preferable that m1 and m2 each independently represent an integer of 1 to 3, and it is particularly preferable that m1 and m2 each independently represent 1 or 2. From the viewpoint of ease of synthesis, it is more preferable that m1 and m2 are the same.

In General Formula (I), $G^1$ represents a divalent group having at least one aromatic ring selected from the group consisting of an aromatic hydrocarbon ring or an aromatic heterocyclic ring, the number of π electrons contained in the aromatic ring in the group represented by $G^1$ is 12 or higher, and the group represented by $G^1$ may be unsubstituted or substituted with one or more substituents $L^G$'s. From the viewpoint of reverse wavelength dispersibility, $G^1$ is preferably a group having an absorption maximum from 300 nm to 900 nm and is more preferably a group having an absorption maximum from 310 nm to 500 nm. From the viewpoints of the liquid crystallinity, ease of availability of raw materials, and ease of synthesis of the compound, it is more preferable that $G^1$ represents a group selected from Formulas (M-1) to (M-6).

[Chem. 5]

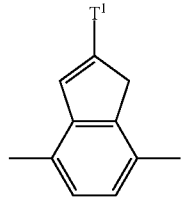

(M-1)

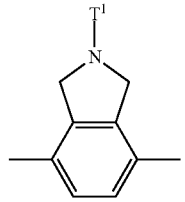

(M-2)

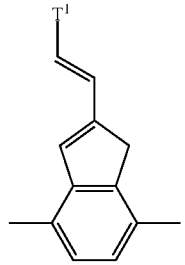

(M-3)

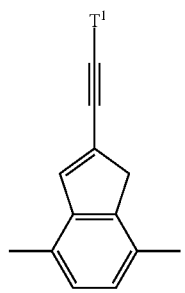

(M-4)

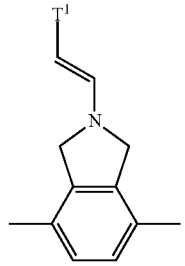

(M-5)

(M-6)

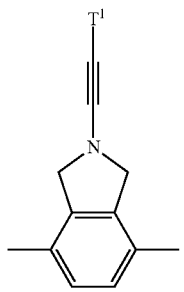

(In the formulas, these groups may be unsubstituted or substituted with one or more of the substituents $L^G$'s above, an arbitrary —CH= may be independently substituted with —N=, —CH$_2$— may be independently substituted with —O—, —S—, —NR$^T$— (where R$^T$ represents a hydrogen atom or an alkyl group having 1 to 20 carbon atoms), —CS—, or —CO—, and T$^1$ represents a group selected from Formulas (T1-1) to (T1-6).)

[Chem. 6]

(T1-1)

(T1-2)

(T1-3)
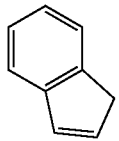

(T1-4)
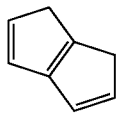

(T1-5)
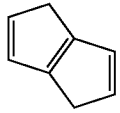

(T1-6)
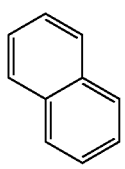

(In the formulas, a bond site may be provided at an arbitrary position, an arbitrary —CH= may be independently substituted with —N=, and each —CH$_2$— may be independently substituted with —O—, —S—, —NR$^T$— (where R$^T$ represents a hydrogen atom or an alkyl group having 1 to 20 carbon atoms), —CS—, or —CO—. A bond site being provided at an arbitrary position means that, for example, one bond site is provided at an arbitrary position of Formula (T1-1) in the case where Formula (T1-1) is combined with T$^1$ of Formulas (M-1) to (M-6) (hereinafter, in the present invention, the same meaning applies to the phrase that a bond site may be provided at an arbitrary position). In addition, these groups may be unsubstituted or substituted with one or more substituents $L^G$'s described above.)

Alternatively, it is more preferable that G$^1$ represents a group selected from Formulas (M-7) to (M-14).

[Chem. 7]

(M-7)
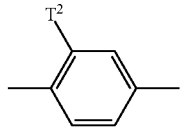

(M-8)
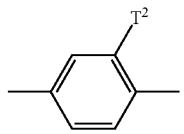

(M-9)
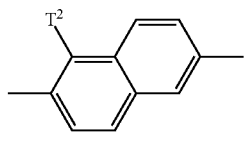

(M-10)
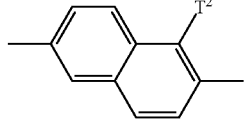

(M-11)
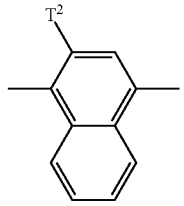

(M-12)
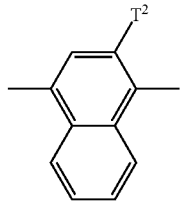

(M-13)
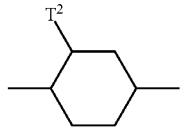

(M-14)
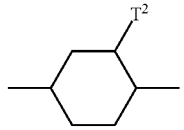

(In the formulas, these groups may be unsubstituted or substituted with one or more of the substituents $L^G$'s above, an arbitrary —CH= may be independently substituted with —N═, —CH$_2$— may be independently substituted with —O—, —S—, —NR$^T$— (where R$^T$ represents a hydrogen atom or an alkyl group having 1 to 20 carbon atoms), —CS—, or —CO—, and T$^2$ represents a group selected from Formula (T2-1) or (T2-2).)

[Chem. 8]

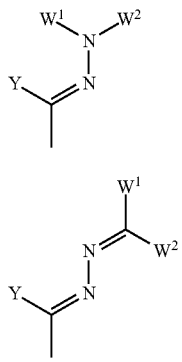

(T2-1)

(T2-2)

(In the formulas, W$^1$ represents a group containing an aromatic group and/or a non-aromatic group, which has 1 to 40 carbon atoms and may be substituted or unsubstituted, in which the aromatic group may be a hydrocarbon ring or a heterocyclic ring and the non-aromatic group may be a group in which an arbitrary carbon atom of a hydrocarbon group or a hydrocarbon group is substituted with a hetero atom (oxygen atoms do not directly bond to each other), W$^2$ represents a hydrogen atom or a linear or branched alkyl group having 1 to 20 carbon atoms in which an arbitrary hydrogen atom in the alkyl group may be substituted with a fluorine atom and one —CH$_2$— or two or more non-adjacent —CH$_2$—'s may be independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, or W$^2$ may represent a group which has 2 to 30 carbon atoms and has at least one aromatic group, the group may be unsubstituted or substituted with one or more of substituents L$^W$'s, or W$^2$ may represent a group represented by P$^W$-(Sp$^W$-X$^W$)$_{kW}$— in which P$^W$ represents a polymerizable group and a preferred polymerizable group therefor is the same as that defined for P$^0$ above, Sp$^W$ represents a spacer group or a single bond and a preferred spacer group therefor is the same as that defined for Sp$^0$ above, and in the case where a plurality of Sp$^W$'s are present, these may be the same as or different from each other, X$^W$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—N═CH—, —CF═CF—, —C≡C—, or a single bond, in the case where a plurality of X's are present, these are the same as or different from each other, with the proviso that P$^W$-(Sp$^W$-X$^W$)$_{kW}$— does not include an —O—O— bond, and kW represents an integer of 0 to 10, L$^W$ represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which an arbitrary hydrogen atom in the alkyl group may be substituted with a fluorine atom and one —CH$_2$— or two or more non-adjacent —CH$_2$—'s may be independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, or L$^W$ may represent a group represented by P$^{LW}$-(Sp$^{LW}$-X$^{LW}$)$_{kLW}$—, in which P$^{LW}$ represents a polymerizable group, Sp$^{LW}$ represents a spacer group or a single bond and in the case where a plurality of Sp$^{LW}$'s are present, these may be the same as or different from each other, X$^{LW}$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—N═CH—, —CF═CF—, —C≡C—, or a single bond, and in the case where a plurality of X$^{LW}$'s are present, these may be the same as or different from each other, with the proviso that P$^{LW}$-(Sp$^{LW}$-X$^{LW}$)$_{kLW}$— does not contain an —O—O— bond, kLW represents an integer of 0 to 10, and in the case where a plurality of L$^W$'s are present in the compound, these may be the same as or different from each other, and Y represents a hydrogen atom, a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which an arbitrary hydrogen atom in the alkyl group may be substituted with a fluorine atom and one —CH$_2$— or two or more non-adjacent —CH$_2$—'s may be independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —CH═CH—, —CF═CF—, or —C≡C—, or Y may represent a group represented by P$^Y$-(Sp$^Y$-X$^Y$)$_{kY}$—, P$^Y$ represents a polymerizable group and a preferred polymerizable group therefor is the same as defined for the P$^0$ above, Sp$^Y$ represents a spacer group or a single bond and a preferred spacer group therefor is the same as defined for the Sp$^0$, and in the case where a plurality of Sp$^Y$'s are present, these may be the same as or different from each other, X$^Y$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—

CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond, and in the case where a plurality of X$^Y$'s are present, these may be the same as or different from each other, with the proviso that P$^Y$-(Sp$^Y$-X$^Y$)$_{kY}$— does not contain an —O—O— bond, kY represents an integer of 0 to 10, and W$^1$ and W$^2$ may form a ring structure together.)

From the viewpoints of solubility in a solvent and ease of synthesis, G$^1$ still more preferably represents a group selected from Formulas (M-1), (M-3), (M-4), (M-7), and (M-8), still more preferably represents a group selected from Formulas (M-1), (M-7), and (M-8), and particularly preferably represents a group selected from Formulas (M-7) and (M-8). More specifically, the group represented by Formula (M-1) preferably represents the groups selected from Formulas (M-1-1) to (M-1-6), more preferably represents the groups selected from Formula (M-1-4) or (M-1-5), and particularly preferably represents the group selected from Formula (M-1-5).

[Chem. 9]

(M-1-1)
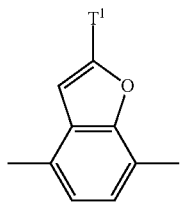

(M-1-2)
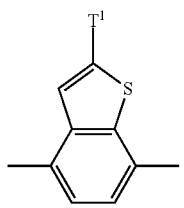

(M-1-3)
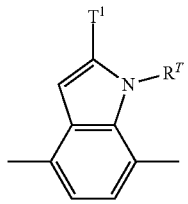

(M-1-4)
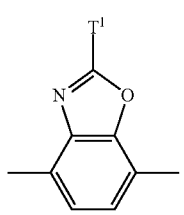

(M-1-5)
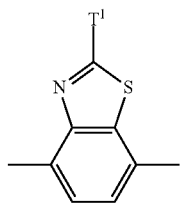

(M-1-6)
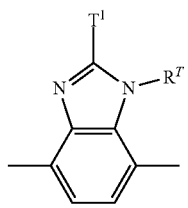

(In the formulas, T$^1$ represents the same meaning as defined above, and R$^T$ represents a hydrogen atom or an alkyl group having 1 to 20 carbon atoms.)

The group represented by Formula (M-3) preferably represents the groups selected from Formulas (M-3-1) to (M-3-6), more preferably represents the groups selected from Formula (M-3-4) or (M-3-5), and particularly preferably represents the group selected from Formula (M-3-5).

[Chem. 10]

(M-3-1)
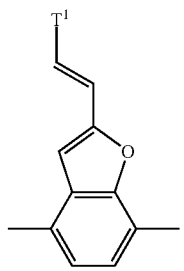

(M-3-2)
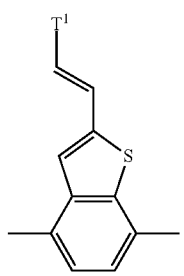

(M-3-3)
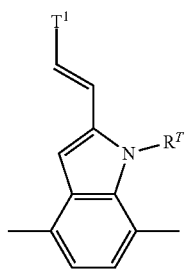

(M-3-4)
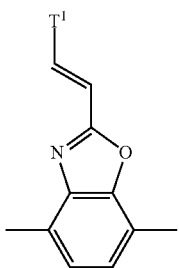

(M-3-5)
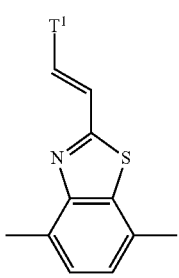

(M-3-6)
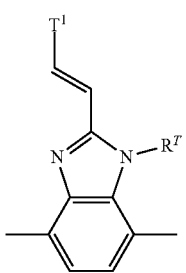

(In the formulas, $T^1$ represents the same meaning as defined above, and $R^T$ represents a hydrogen atom or an alkyl group having 1 to 20 carbon atoms.)

The group represented by Formula (M-4) preferably represents the groups selected from Formulas (M-4-1) to (M-4-6), more preferably represents the groups selected from Formula (M-4-4) or (M-4-5), and particularly preferably represents the group selected from Formula (M-4-5).

[Chem. 11]

(M-4-1)
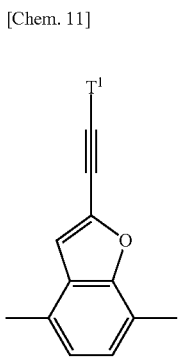

(M-4-2)
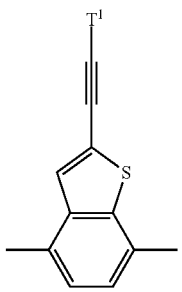

(M-4-3)
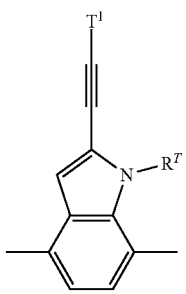

(M-4-4)
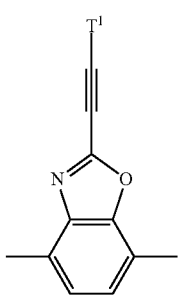

(M-4-5)
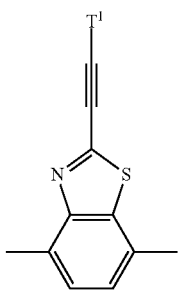

(M-4-6)
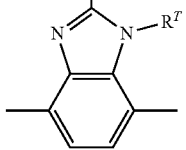

(In the formulas, $T^1$ represents the same meaning as defined above, and $R^T$ represents a hydrogen atom or an alkyl group having 1 to 20 carbon atoms.)

The groups represented by Formulas (M-7) to (M-14) preferably represent the groups selected from Formulas (M-7-1) to (M-14-1), more preferably represent the groups selected from Formulas (M-7-1) to (M-12-1), and particularly preferably represent the groups selected from Formula (M-7-1) or (M-8-1).

[Chem. 12]

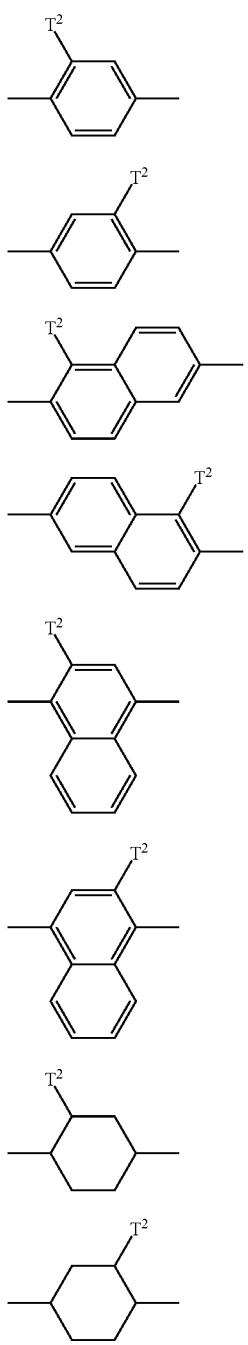

(In the formulas, $T^2$ represents the same meaning as defined above.)

In Formulas (M-1) to (M-6), from the viewpoints of wavelength dispersibility and ease of synthesis, $T^1$ preferably represents the groups selected from Formulas (T1-1), (T1-2), (T1-3), and (T1-6), more preferably represents the groups selected from Formulas (T1-3) and (T1-5), and particularly preferably represents the group selected from Formula (T1-3). More specifically, the group represented by Formula (T1-1) preferably represents the groups selected from Formulas (T1-1-1) to (T1-1-7), and more preferably represents the groups selected from Formulas (T1-1-2), (T1-1-4), (T1-1-5), (T1-1-6), and (T1-1-7).

[Chem. 13]

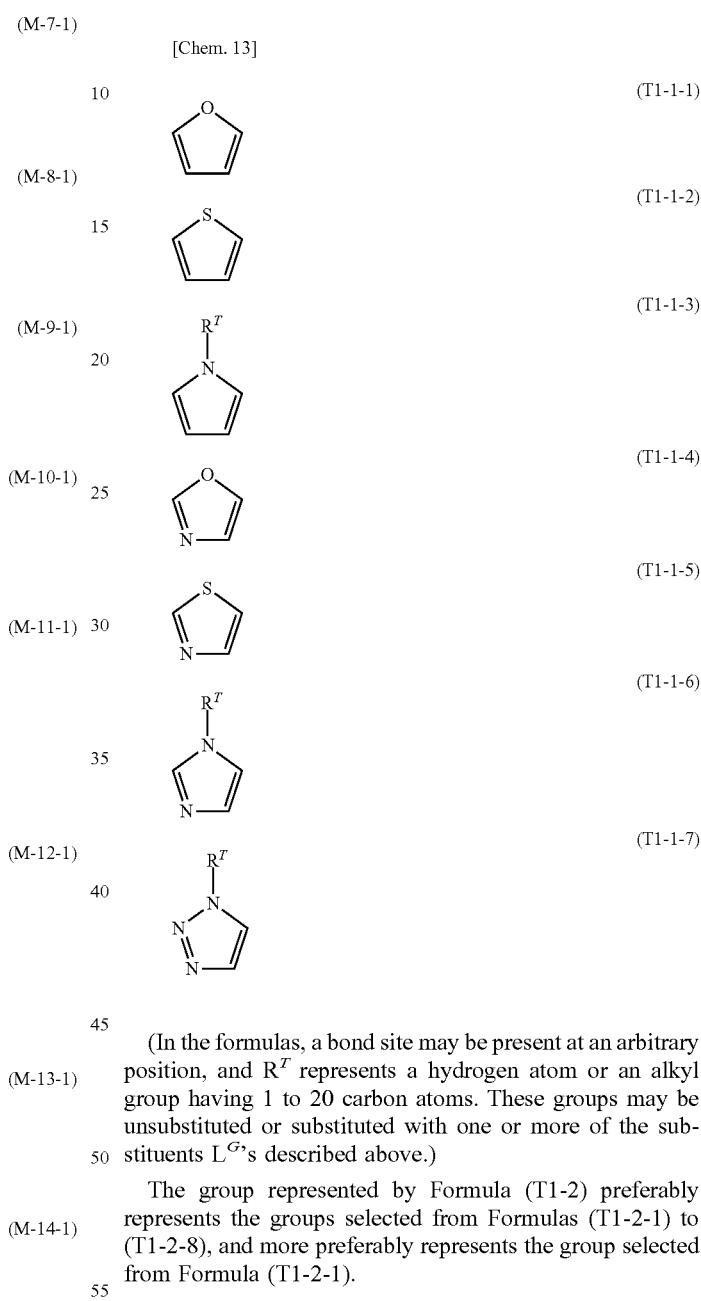

(In the formulas, a bond site may be present at an arbitrary position, and $R^T$ represents a hydrogen atom or an alkyl group having 1 to 20 carbon atoms. These groups may be unsubstituted or substituted with one or more of the substituents $L^G$'s described above.)

The group represented by Formula (T1-2) preferably represents the groups selected from Formulas (T1-2-1) to (T1-2-8), and more preferably represents the group selected from Formula (T1-2-1).

[Chem. 14]

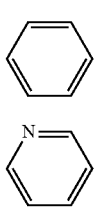

-continued (T1-2-3) 

(T1-2-4) 

(T1-2-5) 

(T1-2-6) 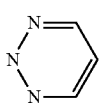

(T1-2-7) 

(T1-2-8) 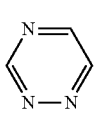

(In the formulas, a bond site may be present at an arbitrary position, and these groups may be unsubstituted or substituted with one or more of the substituents $L^G$'s described above.)

The group represented by Formula (T1-3) preferably represents the groups selected from Formulas (T1-3-1) to (T1-3-8), and more preferably represents the groups selected from Formulas (T1-3-2), (T1-3-3), (T1-3-6), and (T1-3-7).

[Chem. 15]

(T1-3-1) 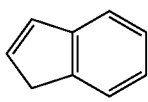

(T1-3-2) 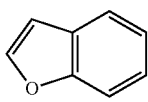

(T1-3-3) 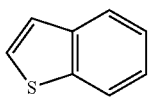

(T1-3-4) 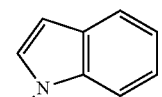

(T1-3-5) 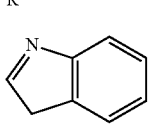

-continued (T1-3-6) 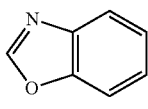

(T1-3-7) 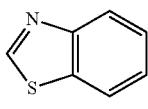

(T1-3-8) 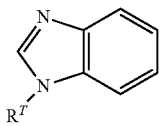

(In the formulas, a bond site may be present at an arbitrary position, and $R^T$ represents a hydrogen atom or an alkyl group having 1 to 20 carbon atoms. These groups may be unsubstituted or substituted with one or more of the substituents $L^G$'s described above.)

The group represented by Formula (T1-4) preferably represents the groups selected from Formulas (T1-4-1) to (T1-4-6).

[Chem. 16]

(T1-4-1) 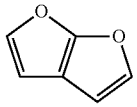

(T1-4-2) 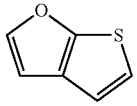

(T1-4-3) 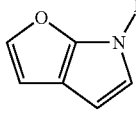

(T1-4-4) 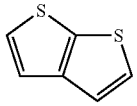

(T1-4-5) 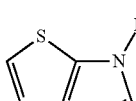

(T1-4-6) 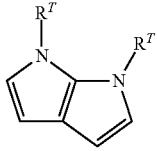

(In the formulas, a bond site may be present at an arbitrary position, and $R^T$ represents a hydrogen atom or an alkyl group having 1 to 20 carbon atoms. These groups may be unsubstituted or substituted with one or more of the substituents $L^G$'s described above.)

The group represented by Formula (T1-5) preferably represents the groups selected from Formulas (T1-5-1) to (T1-5-9).

[Chem. 17]

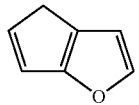 (T1-5-1)

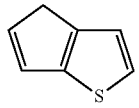 (T1-5-2)

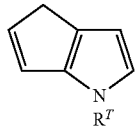 (T1-5-3)

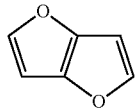 (T1-5-4)

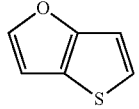 (T1-5-5)

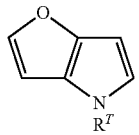 (T1-5-6)

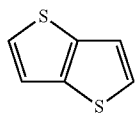 (T1-5-7)

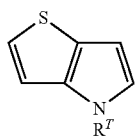 (T1-5-8)

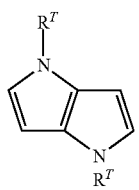 (T1-5-9)

(In the formulas, a bond site may be present at an arbitrary position, and $R^T$ represents a hydrogen atom or an alkyl group having 1 to 20 carbon atoms. These groups may be unsubstituted or substituted with one or more of the substituents $L^G$'s described above.)

The group represented by Formula (T1-6) preferably represents the groups selected from Formulas (T1-6-1) to (T1-6-7).

[Chem. 18]

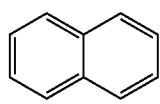 (T1-6-1)

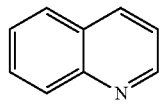 (T1-6-2)

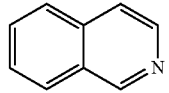 (T1-6-3)

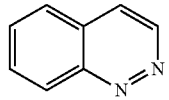 (T1-6-4)

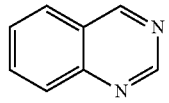 (T1-6-5)

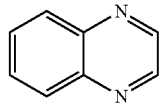 (T1-6-6)

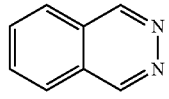 (T1-6-7)

(In the formulas, a bond site may be present at an arbitrary position, and these groups may be unsubstituted or substituted with one or more of the substituents $L^G$'s described above.)

In General Formula (I), $L^G$ represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which an arbitrary hydrogen atom in the alkyl group may be substituted with a fluorine atom and one —$CH_2$— or two or more non-adjacent —$CH_2$—'s may be independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—. $L^G$ may represent a group represented by $P^{LG}$-$(Sp^{LG}$-$X^{LG})_{kLG}$— in which $P^{LG}$ represents a polymerizable group and a preferred polymerizable group therefor is the same as defined for $P^0$ above, $Sp^{LG}$ is a spacer group or a single bond, a preferred spacer group therefor is the same as those defined for $Sp^0$ above, and in the case where a plurality of $Sp^{LG}$'s are present, these may be the same as or different from each other, $X^{LG}$ represents —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond, and in the case where a plurality of X$^{LG}$'s are present, these may be the same as or different from each other, with the proviso that P$^{LG}$-(Sp$^{LG}$-X$^{LG}$)$_{kLG}$— does not contain an —O—O— bond, kLG represents an integer of 0 to 10, and in the case where a plurality of L$^G$'s are present in the compound, these are the same as or different from each other. From the viewpoints of liquid crystallinity and ease of synthesis, L$^G$ preferably represents a fluorine atom, a chlorine atom, a bromine atom, an iodine atom, a pentafluorosulfuranyl group, a nitro group, a cyano group, an isocyano group, a thioisocyano group, or a linear or branched alkyl group having 1 to 12 carbon atoms in which an arbitrary hydrogen atom may be substituted with a fluorine atom and one —CH$_2$— or two or more non-adjacent —CH$_2$—'s may be independently substituted with a group selected from —O—, —S—, —COO—, or —OCO—, L$^G$ more preferably represents a fluorine atom, a chlorine atom, a nitro group, a cyano group, a thioisocyano group, or a linear or branched alkyl group having 1 to 8 carbon atoms in which an arbitrary hydrogen atom may be substituted with a fluorine atom and one —CH$_2$— or two or more non-adjacent —CH$_2$—'s may be independently substituted with a group selected from —O— or —S—, L still more preferably represents a fluorine atom, a chlorine atom, a nitro group, a cyano group, a thioisocyano group, a linear alkyl group having 1 to 8 carbon atoms, or a linear alkoxy group having 1 to 8 carbon atoms, and L$^G$ particularly preferably represents a fluorine atom, a chlorine atom, a nitro group, a cyano group, a linear alkyl group having 1 to 8 carbon atoms, or a linear alkoxy group having 1 to 8 carbon atoms.

In Formula (T2-1) or Formula (T2-2), from the viewpoints of liquid crystallinity and ease of synthesis, Y preferably represents a hydrogen atom, a fluorine atom, a chlorine atom, a nitro group, a cyano group, or a linear or branched alkyl group having 1 to 20 carbon atoms in which an arbitrary hydrogen atom in the group may be substituted with a fluorine atom and one —CH$_2$— or two or more non-adjacent —CH$_2$—'s may be independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, or a group represented by P$^Y$-(Sp$^Y$-X$^Y$)$_{kY}$—. Y more preferably represents a hydrogen atom or a linear or branched alkyl group having 1 to 12 carbon atoms in which an arbitrary hydrogen atom in the group may be substituted with a fluorine atom and one —CH$_2$— or two or more non-adjacent —CH$_2$—'s may be independently substituted with —O—, —COO—, or —OCO—. Y still more preferably represents a hydrogen atom or a linear or branched alkyl group having 1 to 12 carbon atoms in which an arbitrary hydrogen atom in the group may be substituted with a fluorine atom. Y particularly preferably represents a hydrogen atom or a linear alkyl group having 1 to 12 carbon atoms.

In Formula (T2-1) or (T2-2), from the viewpoints of liquid crystallinity and ease of synthesis, W$^1$ represents an aromatic and/or non-aromatic carbocyclic ring or heterocyclic ring, which has 1 to 80 carbon atoms and may be substituted, and an arbitrary carbon atom of the carbocyclic or heterocyclic ring may be substituted with a hetero atom. From the viewpoints of easy availability of raw materials and ease of synthesis, the aromatic group contained in W$^1$ preferably represents a group selected from Formulas (W-1) to (W-18) which may be unsubstituted or substituted with one or more substituents L$^W$'s.

[Chem. 19]

 (W-1)

 (W-2)

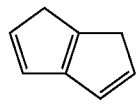 (W-3)

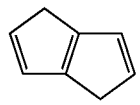 (W-4)

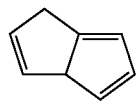 (W-5)

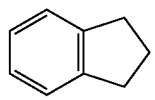 (W-6)

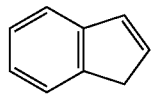 (W-7)

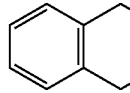 (W-8)

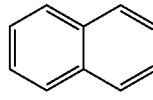 (W-9)

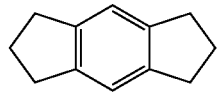 (W-10)

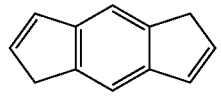 (W-11)

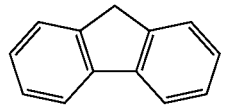 (W-12)

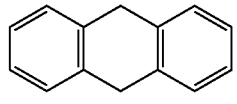 (W-13)

(W-14)

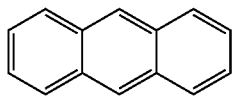

(W-15)

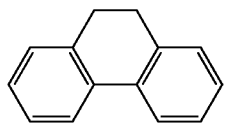

(W-16)

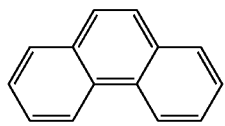

(W-17)

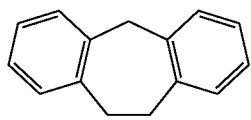

(W-18)

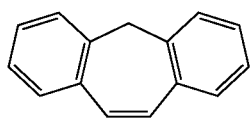

(In the formulas, the ring structure may have a bond site at an arbitrary position, a group formed by linking two or more aromatic groups selected from these groups by a single bond may be formed, an arbitrary —CH= may be each independently substituted with —N=, each —CH$_2$— may be independently substituted with —O—, —S—, —NR$^T$— (where R$^T$ is a hydrogen atom or an alkyl group having 1 to 20 carbon atoms), —CS—, or —CO—, provided that an —O—O— bond is not included. These groups may be unsubstituted or substituted with one or more of the substituents L$^W$'s above.)

The group represented by Formula (W-1) preferably represents a group selected from Formulas (W-1-1) to (W-1-7) which may be unsubstituted or substituted with one or more of the substituents L$^W$'s above.

[Chem. 20]

 (W-1-1)

 (W-1-2)

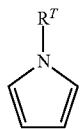 (W-1-3)

 (W-1-4)

 (W-1-5)

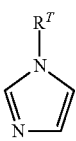 (W-1-6)

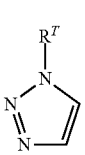 (W-1-7)

(In the formulas, these groups may have a bond site at an arbitrary position and R$^T$ represents a hydrogen atom or an alkyl group having 1 to 8 carbon atoms.)

The group represented by Formula (W-2) preferably represents a group selected from Formulas (W-2-1) to (W-2-8) which may be unsubstituted or substituted with one or more of the substituents L$^W$'s above.

[Chem. 21]

 (W-2-1)

 (W-2-2)

 (W-2-3)

 (W-2-4)

 (W-2-5)

 (W-2-6)

 (W-2-7)

 (W-2-8)

(In the formulas, these groups may have a bond site at an arbitrary position.)

The group represented by Formula (W-3) preferably represents a group selected from Formulas (W-3-1) to (W-3-6) which may be unsubstituted or substituted with one or more of the substituents $L^W$'s above.

[Chem. 22]

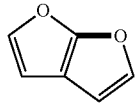
(W-3-1)

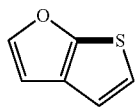
(W-3-2)

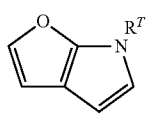
(W-3-3)

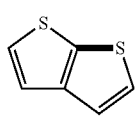
(W-3-4)

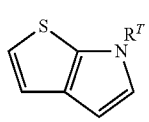
(W-3-5)

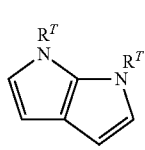
(W-3-6)

(In the formula, these groups may have a bond site at an arbitrary position and $R^T$ represents a hydrogen atom or an alkyl group having 1 to 8 carbon atoms.)

The group represented by Formula (W-4) preferably represents a group selected from Formulas (W-4-1) to (W-4-9) which may be unsubstituted or substituted with one or more of the substituents $L^W$'s above.

[Chem. 23]

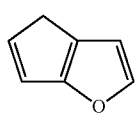
(W-4-1)

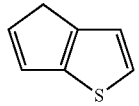
(W-4-2)

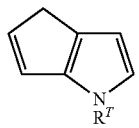
(W-4-3)

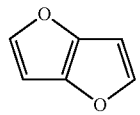
(W-4-4)

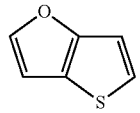
(W-4-5)

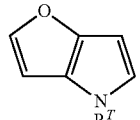
(W-4-6)

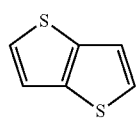
(W-4-7)

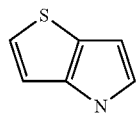
(W-4-8)

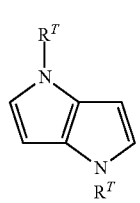
(W-4-9)

(In the formula, these groups may have a bond site at an arbitrary position and $R^T$ represents a hydrogen atom or an alkyl group having 1 to 8 carbon atoms.)

The group represented by Formula (W-5) preferably represents a group selected from Formulas (W-5-1) to (W-5-13) which may be unsubstituted or substituted with one or more of the substituents $L^W$'s above.

[Chem. 24]

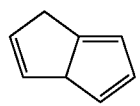
(W-5-1)

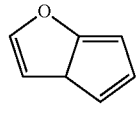
(W-5-2)

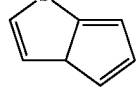
(W-5-3)

-continued (W-5-4) 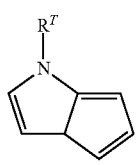

(W-5-5) 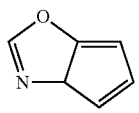

(W-5-6) 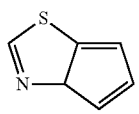

(W-5-7) 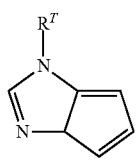

(W-5-8) 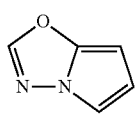

(W-5-9) 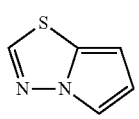

(W-5-10) 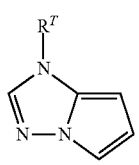

(W-5-11) 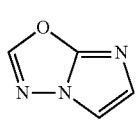

(W-5-12) 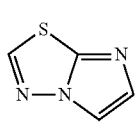

(W-5-13) 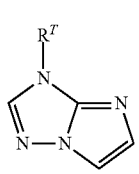

(In the formulas, these groups may have a bond site at an arbitrary position and $R^T$ represents a hydrogen atom or an alkyl group having 1 to 8 carbon atoms.)

The group represented by Formula (W-6) preferably represents a group selected from Formulas (W-6-1) to (W-6-12) which may be unsubstituted or substituted with one or more of the substituents $L^W$'s above.

[Chem. 25]

(W-6-1) 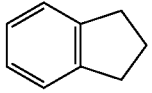

(W-6-2) 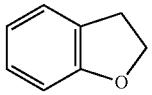

(W-6-3) 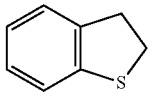

(W-6-4) 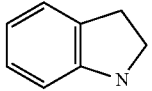

(W-6-5) 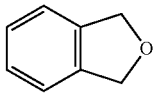

(W-6-6) 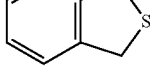

(W-6-7) 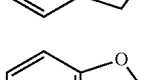

(W-6-8) 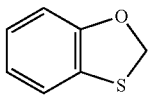

(W-6-9) 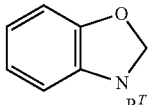

(W-6-10) 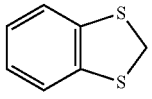

(W-6-11) 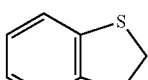

(W-6-12)

(In the formulas, these groups may have a bond site at an arbitrary position and $R^T$ represents a hydrogen atom or an alkyl group having 1 to 8 carbon atoms.)

The group represented by Formula (W-7) preferably represents a group selected from Formulas (W-7-1) to (W-7-8) which may be unsubstituted or substituted with one or more of the substituents $L^W$'s above.

[Chem. 26]

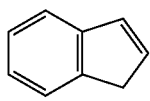 (W-7-1)

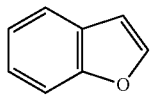 (W-7-2)

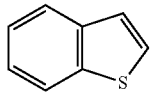 (W-7-3)

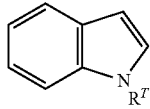 (W-7-4)

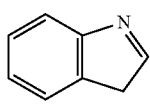 (W-7-5)

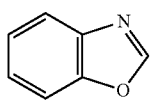 (W-7-6)

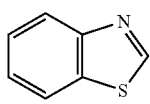 (W-7-7)

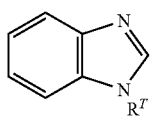 (W-7-8)

(In the formulas, these groups may have a bond site at an arbitrary position and $R^T$ represents a hydrogen atom or an alkyl group having 1 to 8 carbon atoms.)

The group represented by Formula (W-8) preferably represents a group selected from Formulas (W-8-1) to (W-8-19) which may be unsubstituted or substituted with one or more of the substituents L's above.

[Chem. 27]

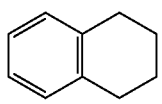 (W-8-1)

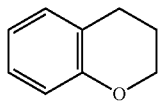 (W-8-2)

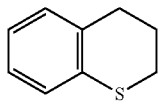 (W-8-3)

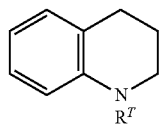 (W-8-4)

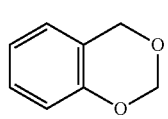 (W-8-5)

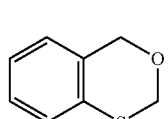 (W-8-6)

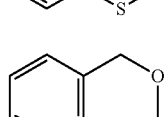 (W-8-7)

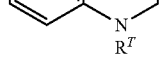 (W-8-8)

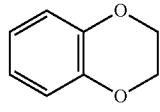 (W-8-9)

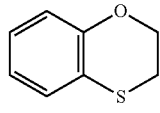 (W-8-10)

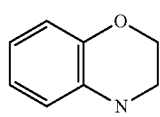 (W-8-11)

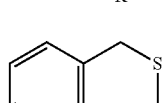 (W-8-12)

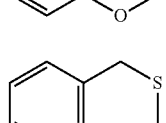 (W-8-13)

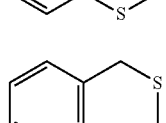 (W-8-14)

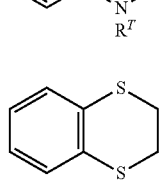 (W-8-15)

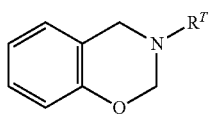 (W-8-16)

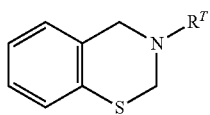 (W-8-17)

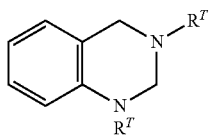 (W-8-18)

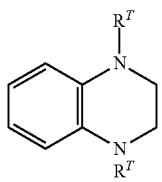 (W-8-19)

(In the formulas, these groups may have a bond site at an arbitrary position and $R^T$ represents a hydrogen atom or an alkyl group having 1 to 8 carbon atoms.)

The group represented by Formula (W-9) preferably represents a group selected from Formulas (W-9-1) to (W-9-7) which may be unsubstituted or substituted with one or more of the substituents $L^W$'s above.

[Chem. 28]

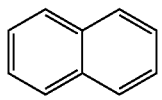 (W-9-1)

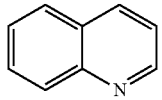 (W-9-2)

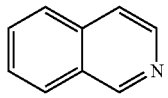 (W-9-3)

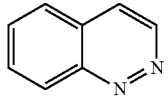 (W-9-4)

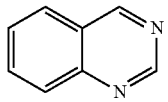 (W-9-5)

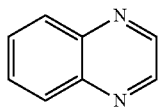 (W-9-6)

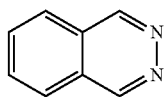 (W-9-7)

(In the formulas, these groups may have a bond site at an arbitrary position.)

The group represented by Formula (W-10) preferably represents a group selected from Formulas (W-10-1) to (W-10-16) which may be unsubstituted or substituted with one or more of the substituents $L^W$'s above.

[Chem. 29]

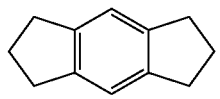 (W-10-1)

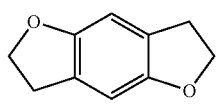 (W-10-2)

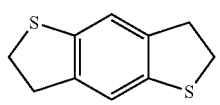 (W-10-3)

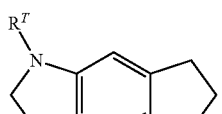 (W-10-4)

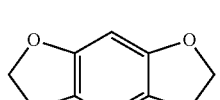 (W-10-5)

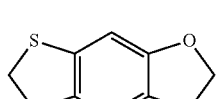 (W-10-6)

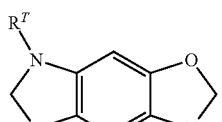 (W-10-7)

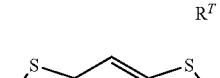 (W-10-8)

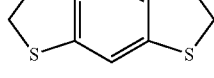

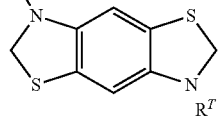 (W-10-9)

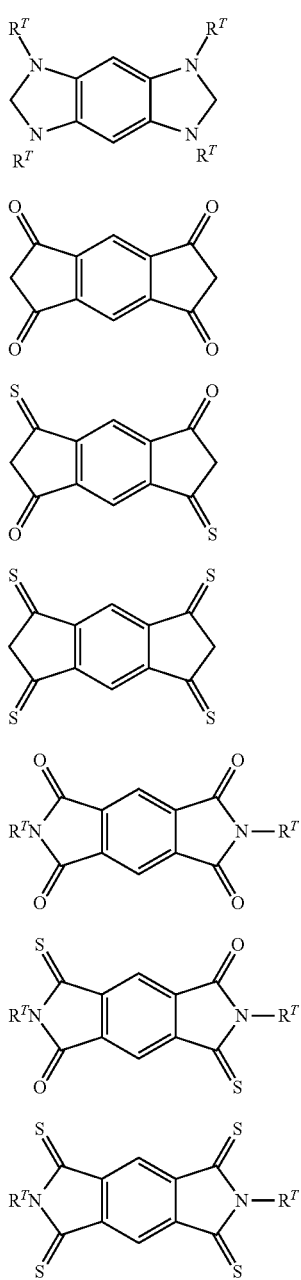

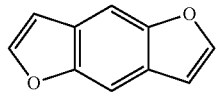

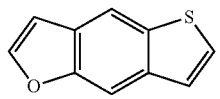

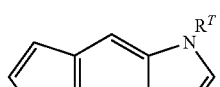

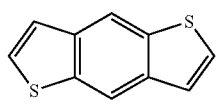

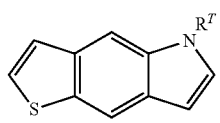

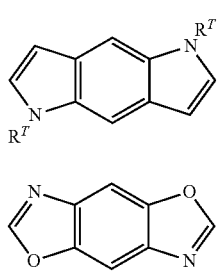

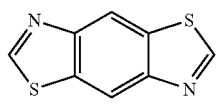

(In the formulas, these groups may have a bond site at an arbitrary position and $R^T$ represents a hydrogen atom or an alkyl group having 1 to 8 carbon atoms.)

The group represented by Formula (W-11) preferably represents a group selected from Formulas (W-11-1) to (W-11-10) which may be unsubstituted or substituted with one or more of the substituents $L^W$'s above.

[Chem. 30]

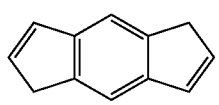

(W-11-1)

(In the formulas, these groups may have a bond site at an arbitrary position and $R^T$ represents a hydrogen atom or an alkyl group having 1 to 8 carbon atoms.)

The group represented by Formula (W-12) preferably represents a group selected from Formulas (W-12-1) to (W-12-4) which may be unsubstituted or substituted with one or more of the substituents $L^W$'s above.

[Chem. 31]

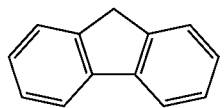

(W-12-1)

-continued (W-12-2)
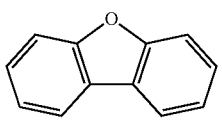

(W-12-3)
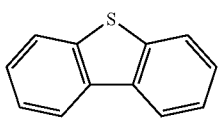

(W-12-4)
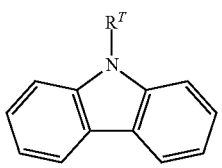

(In the formulas, these groups may have a bond site at an arbitrary position and $R^T$ represents a hydrogen atom or an alkyl group having 1 to 8 carbon atoms.)

The group represented by Formula (W-13) preferably represents a group selected from Formulas (W-13-1) to (W-13-10) which may be unsubstituted or substituted with one or more of the substituents $L^W$'s above.

[Chem. 32]

(W-13-1)
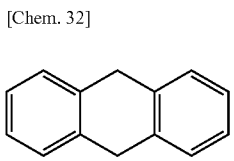

(W-13-2)
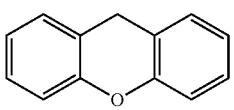

(W-13-3)
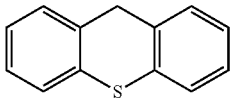

(W-13-4)
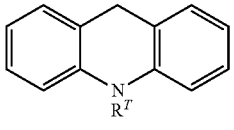

(W-13-5)
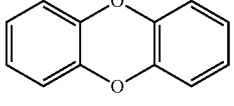

(W-13-6)
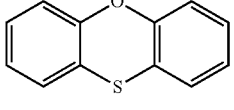

(W-13-7)
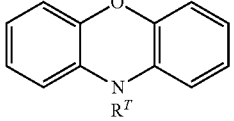

(W-13-8)
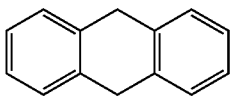

(W-13-9)
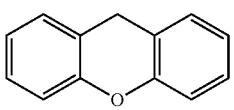

(W-13-10)
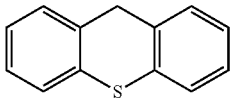

(In the formulas, these groups may have a bond site at an arbitrary position and $R^T$ represents a hydrogen atom or an alkyl group having 1 to 8 carbon atoms.)

The group represented by Formula (W-17) preferably represents a group selected from Formulas (W-17-1) to (W-17-16) which may be unsubstituted or substituted with one or more of the substituents $L^W$'s above.

[Chem. 33]

(W-17-1)
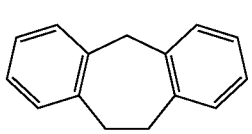

(W-17-2)
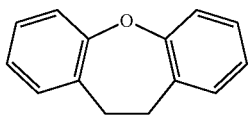

(W-17-3)
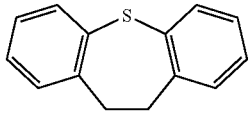

(W-17-4)
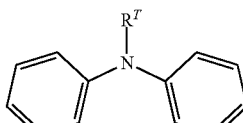

(W-17-5)
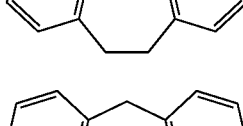

(W-17-6)
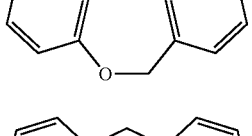

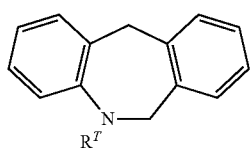 (W-17-7)

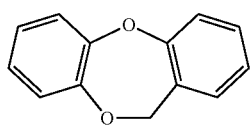 (W-17-8)

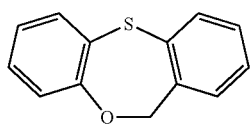 (W-17-9)

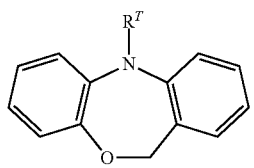 (W-17-10)

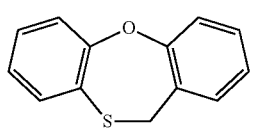 (W-17-11)

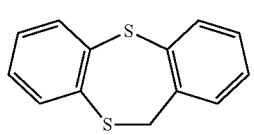 (W-17-12)

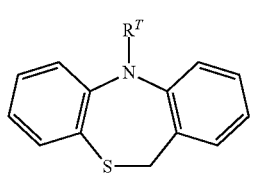 (W-17-13)

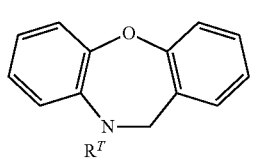 (W-17-14)

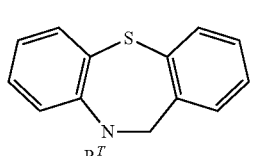 (W-17-15)

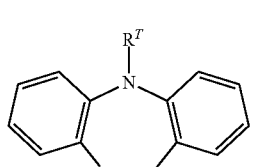 (W-17-16)

(In the formulas, these groups may have a bond site at an arbitrary position and $R^T$ represents a hydrogen atom or an alkyl group having 1 to 8 carbon atoms.)

The group represented by Formula (W-18) preferably represents a group selected from Formulas (W-18-1) to (W-18-4) which may be unsubstituted or substituted with one or more of the substituents $L^W$'s above.

[Chem. 34]

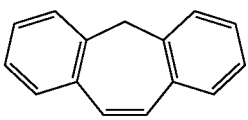 (W-18-1)

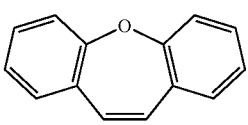 (W-18-2)

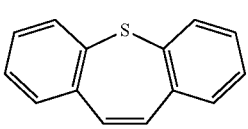 (W-18-3)

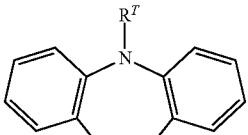 (W-18-4)

(In the formulas, these groups may have a bond site at an arbitrary position and $R^T$ represents a hydrogen atom or an alkyl group having 1 to 8 carbon atoms.)

The group containing a carbocyclic ring or a heterocyclic ring contained in $W^1$ more preferably represents a group selected from any one of Formulas (W-1-1), (W-1-2), (W-1-3), (W-1-4), (W-1-5), (W-1-6), (W-2-1), (W-6-9), (W-6-11), (W-6-12), (W-7-2), (W-7-3), (W-7-4), (W-7-6), (W-7-7), (W-7-8), (W-9-1), (W-12-1), (W-12-2), (W-12-3), (W-12-4), (W-13-7), (W-13-9), (W-13-10), (W-14), (W-18-1), and (W-18-4) which may be unsubstituted or substituted with one or more of the substituents $L^W$'s above, more preferably represents a group selected from any one of Formulas (W-2-1), (W-7-3), (W-7-7), and (W-14) which may be unsubstituted or substituted with one or more of the substituents L's above, still more preferably represents a group selected from any one of Formulas (W-7-3), (W-7-7), and (W-14) which may be unsubstituted or substituted with one or more of the substituents $L^W$'s above, still more preferably represents a group represented by Formula (W-7-7) which may be unsubstituted or substituted with one or more of the substituents $L^W$'s above, and particularly preferably represents a group represented by Formula (W-7-7-1) which may be unsubstituted or substituted with one or more of the substituents $L^W$'s above.

[Chem. 35]

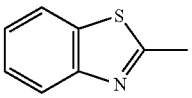 (W-7-7-1)

In Formula (T-1) or (T-2), from the viewpoints of availability of raw materials and ease of synthesis, $W^2$ more preferably represents a hydrogen atom or a linear or branched alkyl group having 1 to 20 carbon atoms in which an arbitrary hydrogen atom in the group may be substituted with a fluorine atom and one —CH$_2$— or two or more non-adjacent —CH$_2$—'s may be independently substituted with —O—, —CO—, —COO—, —OCO—, —O—CO—O—, —CH=CH—COO—, —CH=CH—OCO—, —COO—CH=CH—, —OCO—CH=CH—, —CH=CH—, —CF=CF, or —C≡C—, or a group represented by $P^W$-$(Sp^W$-$X^W)_{kW}$—, $W^2$ still more preferably represents a hydrogen atom or a linear or branched alkyl group having 1 to 20 carbon atoms in which an arbitrary hydrogen atom in the group may be substituted with a fluorine atom and one —CH$_2$— or two or more non-adjacent —CH$_2$—'s may be independently substituted with —O—, —CO—, —COO—, or —OCO—, or a group represented by $P^W$-$(Sp^W$-$X^W)_{kW}$—, and $W^2$ still more preferably represents a hydrogen atom, a linear alkyl group having 1 to 12 carbon atoms in which one —CH$_2$— or two or more non-adjacent —CH$_2$—'s may be independently substituted with —O—, or a group represented by $P^W$-$(Sp^W$-$X^W)_{kW}$—.

In the case where $W^2$ represents a group having 2 to 30 carbon atoms which has at least one aromatic group and may be unsubstituted or substituted with one or more of the substituents $L^W$'s above, $W^2$ preferably represents a group selected from Formulas (W-1) to (W-18) which may be unsubstituted or substituted with one or more of the substituents $L^W$'s above. In this case, the more preferable structure is the same as above.

In the case where $W^2$ represents a group represented by $P^W$-$(Sp^W$-$X^W)_{kW}$—, preferable structures of groups represented by $P^W$, $Sp^W$, $X^W$, and kW are the same as preferable structures of groups represented by $P^O$, $Sp^O$, $X^O$, and $k^O$.

$W^1$ and $W^2$ may form a ring structure together, and in this case, a cyclic group represented by —$NW^1W^2$ preferably represents a group selected from Formulas (W-19) to (W-40) which may be unsubstituted or substituted with one or more of the substituents $L^W$'s above.

[Chem. 36]

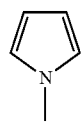
(W-19)

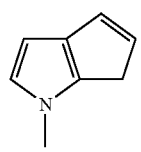
(W-20)

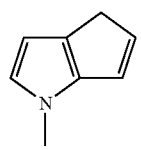
(W-21)

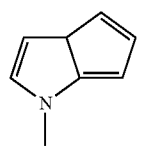
(W-22)

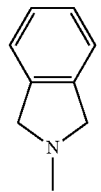
(W-23)

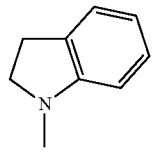
(W-24)

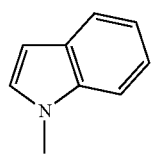
(W-25)

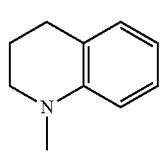
(W-26)

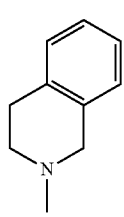
(W-27)

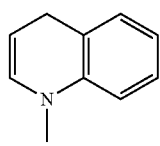
(W-28)

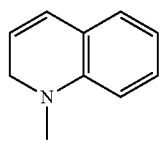
(W-29)

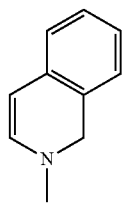
(W-30)

(W-31)
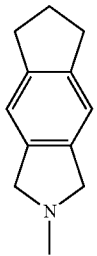

(W-32)
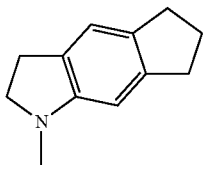

(W-33)
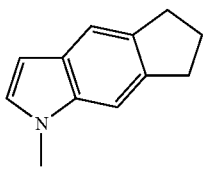

(W-34)
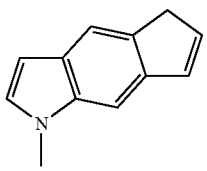

(W-35)
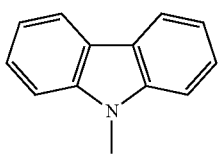

(W-36)
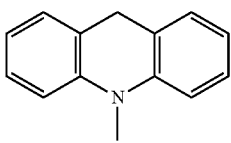

(W-37)
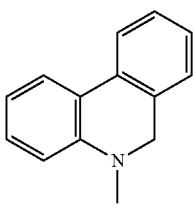

(W-38)
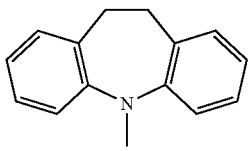

(W-39)
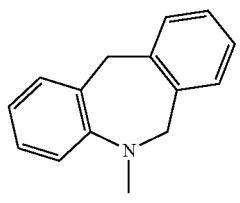

(W-40)
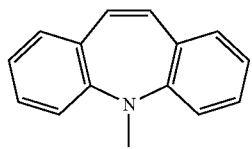

(In the formulas, an arbitrary —CH= may be independently substituted with —N=, each —CH$_2$— may be independently substituted with —O—, —S—, —NR$^T$— (where R$^T$ represents a hydrogen atom or an alkyl group having 1 to 20 carbon atoms), —CS—, or —CO—, provided that an —O—O— bond is not included. These groups may be unsubstituted or substituted with one or more of the substituents L$^W$'s above.)

The group represented by Formula (W-19) preferably represents groups selected from Formulas (W-19-1) to (W-19-3) which may be unsubstituted or substituted with one or more of the substituents LW's above.

[Chem. 37]

(W-19-1)
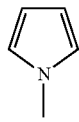

(W-19-2)
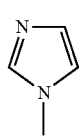

(W-19-3)
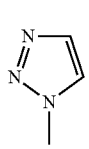

The group represented by Formula (W-20) preferably represents groups selected from Formulas (W-20-1) to (W-20-4) which may be unsubstituted or substituted with one or more of the substituents L$^W$'s above.

[Chem. 38]

(W-20-1)
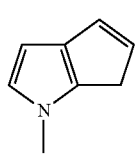

(W-20-2)
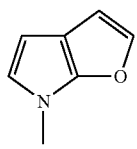

(W-20-3)
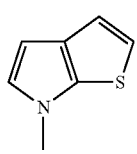

(W-20-4)
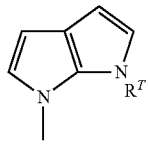

(In the formulas, $R^T$ represents a hydrogen atom or an alkyl group having 1 to 8 carbon atoms.)

The group represented by Formula (W-21) preferably represents groups selected from Formulas (W-21-1) to (W-21-4) which may be unsubstituted or substituted with one or more of the substituents $L^W$'s above.

[Chem. 39]

(W-21-1)
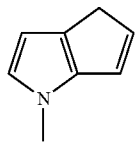

(W-21-2)
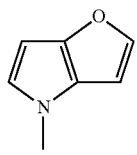

(W-21-3)
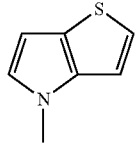

(W-21-4)
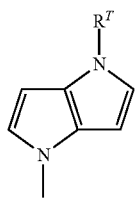

(In the formulas, $R^T$ represents a hydrogen atom or an alkyl group having 1 to 8 carbon atoms.)

The group represented by Formula (W-22) preferably represents groups selected from Formulas (W-22-1) to (W-22-4) which may be unsubstituted or substituted with one or more of the substituents $L^W$'s above.

[Chem. 40]

(W-22-1)
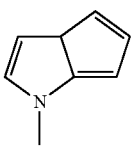

(W-22-2)
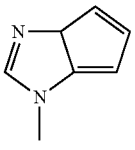

(W-22-3)
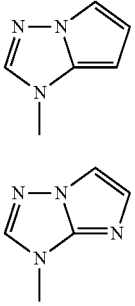

(W-22-4)

The group represented by Formula (W-23) preferably represents groups selected from Formulas (W-23-1) to (W-23-3) which may be unsubstituted or substituted with one or more of the substituents $L^W$'s above.

[Chem. 41]

(W-23-1)

(W-23-2)
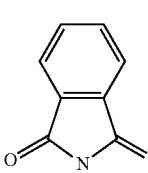

(W-23-3)
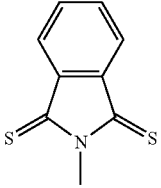

The group represented by Formula (W-24) preferably represents groups selected from Formulas (W-24-1) to (W-24-4) which may be unsubstituted or substituted with one or more of the substituents $L^W$'s above.

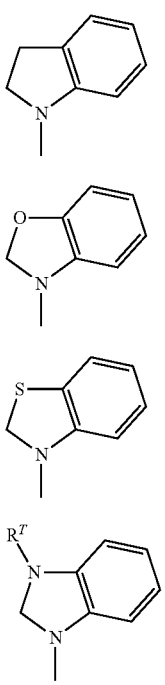

(W-24-1)

(W-24-2)

(W-24-3)

(W-24-4)

(In the formulas, $R^T$ represents a hydrogen atom or an alkyl group having 1 to 8 carbon atoms.)

The group represented by Formula (W-25) preferably represents groups selected from Formulas (W-25-1) to (W-25-3) which may be unsubstituted or substituted with one or more of the substituents $L^W$'s above.

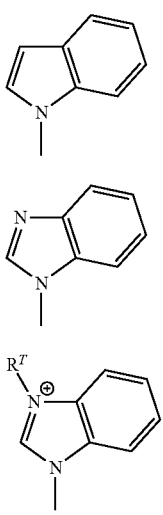

(W-25-1)

(W-25-2)

(W-25-3)

(In the formulas, $R^T$ represents a hydrogen atom or an alkyl group having 1 to 8 carbon atoms.)

The group represented by Formula (W-26) preferably represents groups selected from Formulas (W-26-1) to (W-26-7) which may be unsubstituted or substituted with one or more of the substituents $L^W$'s above.

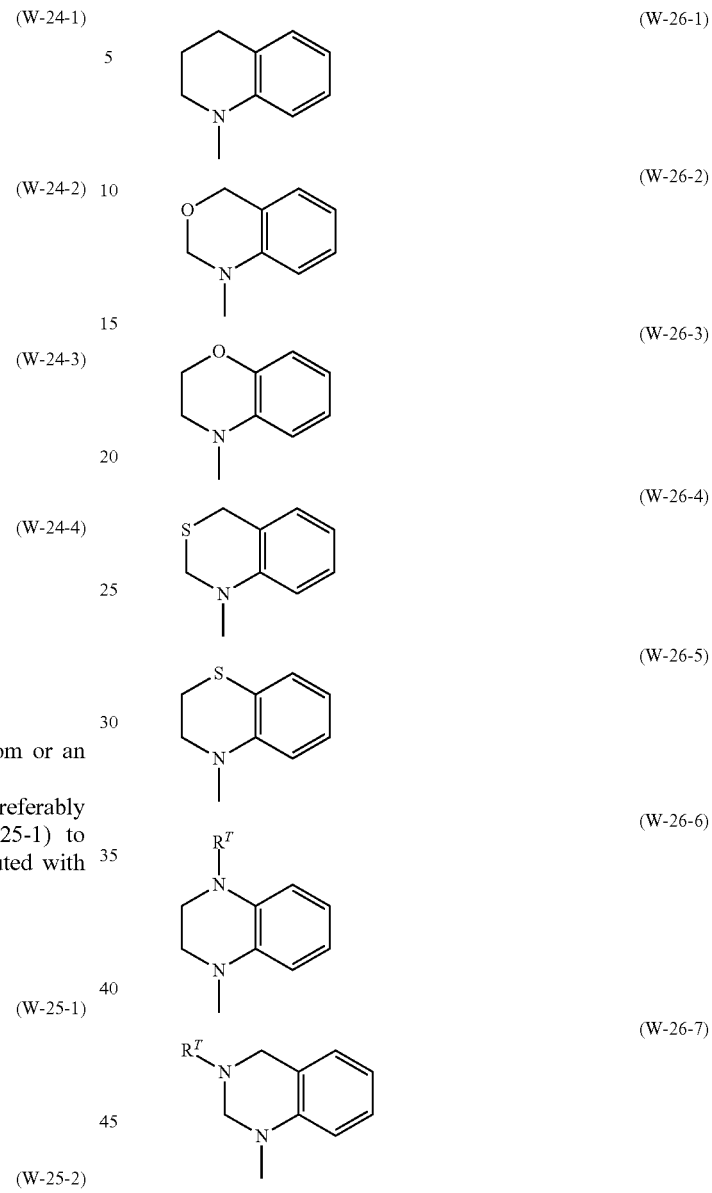

(W-26-1)

(W-26-2)

(W-26-3)

(W-26-4)

(W-26-5)

(W-26-6)

(W-26-7)

(In the formulas, $R^T$ represents a hydrogen atom or an alkyl group having 1 to 8 carbon atoms.)

The group represented by Formula (W-27) preferably represents groups selected from Formulas (W-27-1) to (W-27-4) which may be unsubstituted or substituted with one or more of the substituents $L^W$'s above.

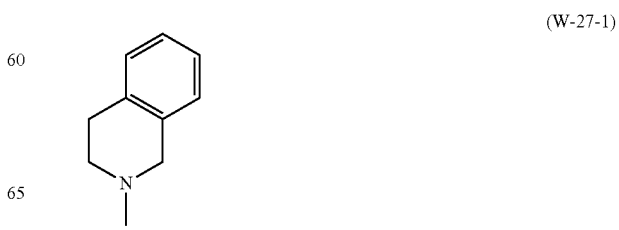

(W-27-1)

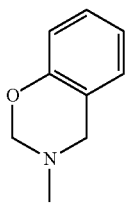
(W-27-2)

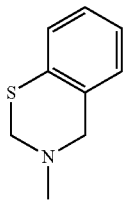
(W-27-3)

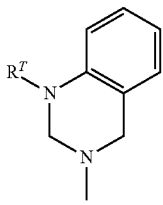
(W-27-4)

(In the formulas, $R^T$ represents a hydrogen atom or an alkyl group having 1 to 8 carbon atoms.)

The group represented by Formula (W-28) preferably represents groups selected from Formulas (W-28-1) to (W-28-6) which may be unsubstituted or substituted with one or more of the substituents $L^W$'s above.

[Chem. 46]

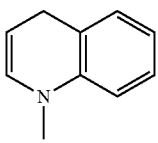
(W-28-1)

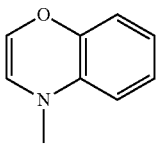
(W-28-2)

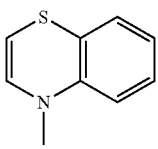
(W-28-3)

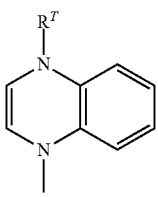
(W-28-4)

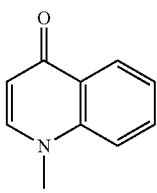
(W-28-5)

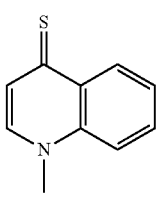
(W-28-6)

(In the formulas, $R^T$ represents a hydrogen atom or an alkyl group having 1 to 8 carbon atoms.)

The group represented by Formula (W-29) preferably represents groups selected from Formulas (W-29-1) to (W-29-3) which may be unsubstituted or substituted with one or more of the substituents $L^W$'s above.

[Chem. 47]

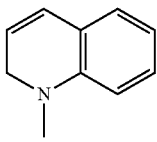
(W-29-1)

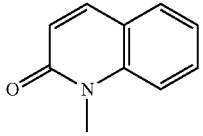
(W-29-2)

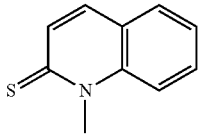
(W-29-3)

The group represented by Formula (W-30) preferably represents groups selected from Formulas (W-30-1) to (W-30-3) which may be unsubstituted or substituted with one or more of the substituents $L^W$'s above.

[Chem. 48]

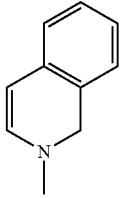
(W-30-1)

(W-30-2)

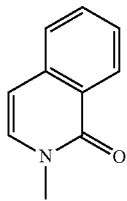

(W-30-3)

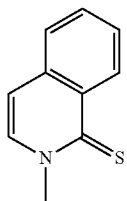

The group represented by Formula (W-31) preferably represents groups selected from Formulas (W-31-1) to (W-31-4) which may be unsubstituted or substituted with one or more of the substituents $L^W$'s above.

[Chem. 49]

(W-31-1)

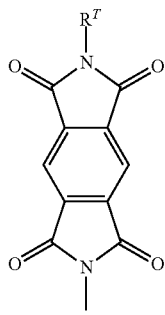

(W-31-2)

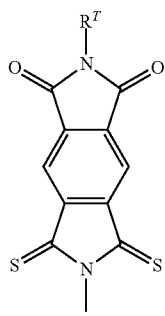

(W-31-3)

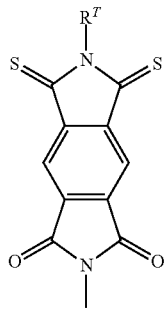

(W-31-4)

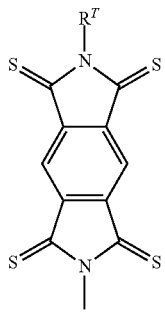

(In the formulas, $R^T$ represents a hydrogen atom or an alkyl group having 1 to 8 carbon atoms.)

The group represented by Formula (W-32) preferably represents groups selected from Formulas (W-32-1) to (W-32-5) which may be unsubstituted or substituted with one or more of the substituents $L^W$'s above.

[Chem. 50]

(W-32-1)

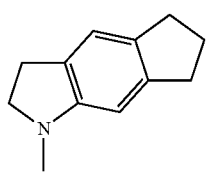

(W-32-2)

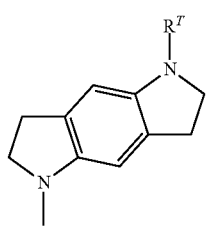

(W-32-3)

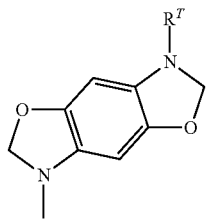

(W-32-4)

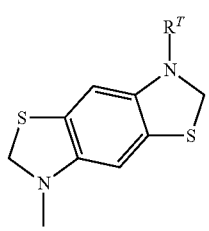

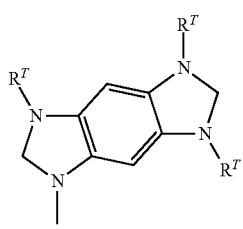

(W-32-5)

(In the formulas, $R^T$ represents a hydrogen atom or an alkyl group having 1 to 8 carbon atoms.)

The group represented by Formula (W-33) preferably represents groups selected from Formulas (W-33-1) to (W-33-3) which may be unsubstituted or substituted with one or more of the substituents $L^W$'s above.

[Chem. 51]

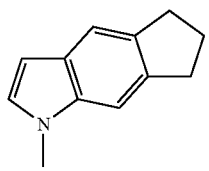

(W-33-1)

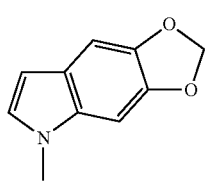

(W-33-2)

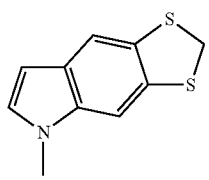

(W-33-3)

The group represented by Formula (W-34) preferably represents groups selected from Formulas (W-34-1) to (W-34-5) which may be unsubstituted or substituted with one or more of the substituents $L^W$'s above.

[Chem. 52]

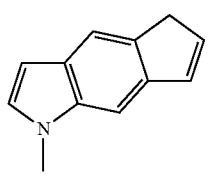

(W-34-1)

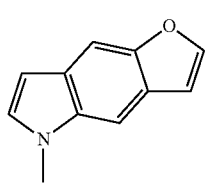

(W-34-2)

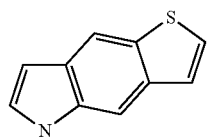

(W-34-3)

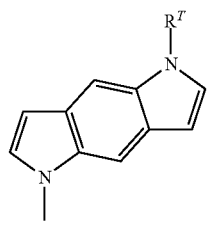

(W-34-4)

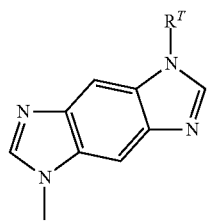

(W-34-5)

(In the formulas, $R^T$ represents a hydrogen atom or an alkyl group having 1 to 8 carbon atoms.)

The group represented by Formula (W-35) preferably represents Formula (W-35-1) which may be unsubstituted or substituted with one or more of the substituents $L^W$'s above.

[Chem. 53]

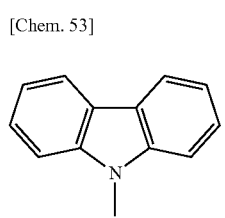

(W-35-1)

The group represented by Formula (W-36) preferably represents groups selected from Formulas (W-36-1) to (W-36-6) which may be unsubstituted or substituted with one or more of the substituents $L^W$'s above.

[Chem. 54]

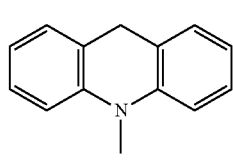

(W-36-1)

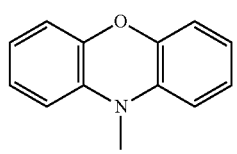

(W-36-2)

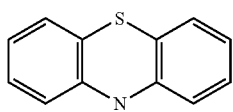
(W-36-3)

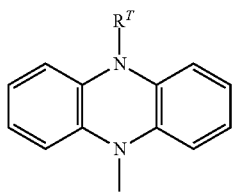
(W-36-4)

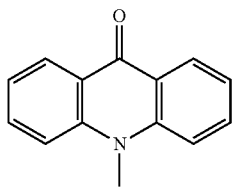
(W-36-5)

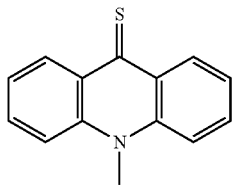
(W-36-6)

(In the formulas, $R^T$ represents a hydrogen atom or an alkyl group having 1 to 8 carbon atoms.)

The group represented by Formula (W-37) preferably represents groups selected from Formulas (W-37-1) to (W-37-3) which may be unsubstituted or substituted with one or more of the substituents $L^W$'s above.

[Chem. 55]

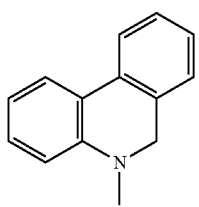
(W-37-1)

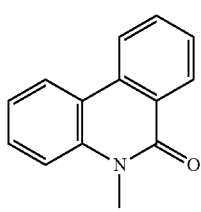
(W-37-2)

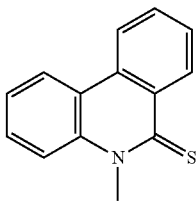
(W-37-3)

The group represented by Formula (W-38) preferably represents groups selected from Formulas (W-38-1) to (W-38-4) which may be unsubstituted or substituted with one or more of the substituents $L^W$'s above.

[Chem. 56]

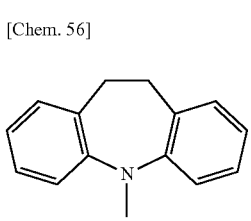
(W-38-1)

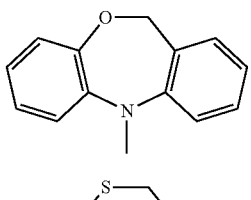
(W-38-2)

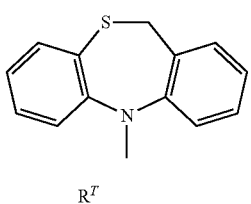
(W-38-3)

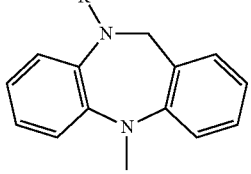
(W-38-4)

(In the formulas, $R^T$ represents a hydrogen atom or an alkyl group having 1 to 8 carbon atoms.)

The group represented by Formula (W-39) preferably represents groups selected from Formulas (W-39-1) to (W-39-4) which may be unsubstituted or substituted with one or more of the substituents $L^W$'s above.

[Chem. 57]

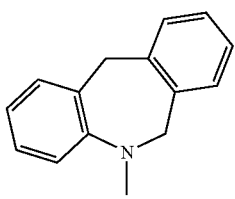
(W-39-1)

(W-39-2)
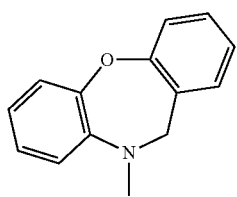

(W-39-3)
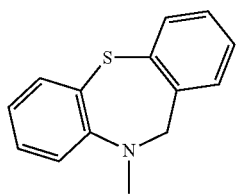

(W-39-4)
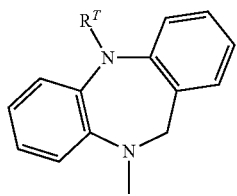

(In the formulas, $R^T$ represents a hydrogen atom or an alkyl group having 1 to 8 carbon atoms.)

The group represented by Formula (W-40) preferably represents Formula (W-40-1) which may be unsubstituted or substituted with one or more of the substituents L's above.

[Chem. 58]

(W-40-1)
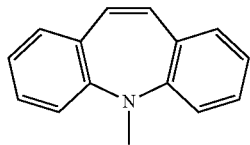

From the viewpoints of easy availability of raw materials and ease of synthesis, the cyclic group represented by —NW¹W² more preferably represents groups selected from Formulas (W-19-1), (W-21-2), (W-21-3), (W-21-4), (W-23-2), (W-23-3), (W-25-1), (W-25-2), (W-25-3), (W-30-2), (W-30-3), (W-35-1), (W-36-2), (W-36-3), (W-36-4), and (W-40-1) which may be unsubstituted or substituted with one or more of the substituents $L^W$'s above.

$W^1$ and $W^2$ may form a ring structure together, and in this case, a cyclic group represented by =CW¹W² preferably represents groups selected from Formulas (W-41) to (W-62) which may be unsubstituted or substituted with one or more of the substituents $L^W$'s above.

[Chem. 59]

(W-41)
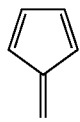

(W-42)
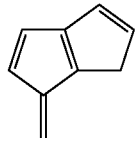

(W-43)
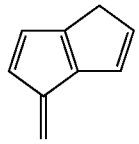

(W-44)
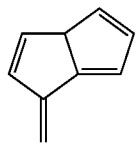

(W-45)

(W-46)
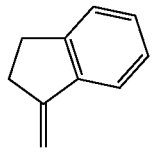

(W-47)
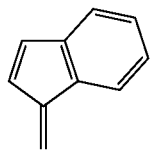

(W-48)
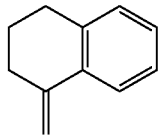

(W-49)
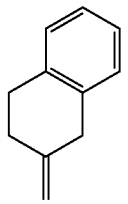

(W-50)
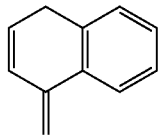

(W-51) 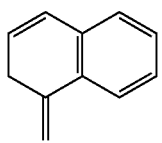

(W-52) 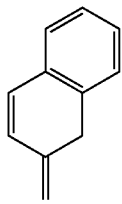

(W-53) 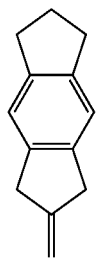

(W-54) 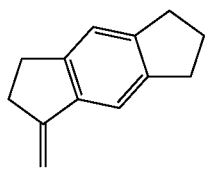

(W-55) 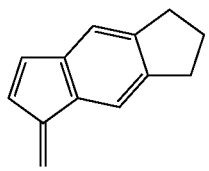

(W-56) 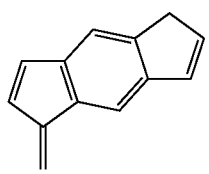

(W-57) 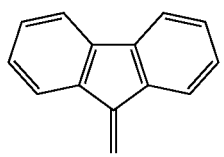

(W-58) 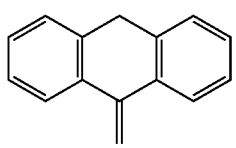

(W-59) 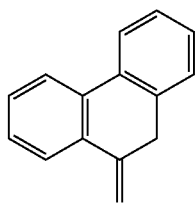

(W-60) 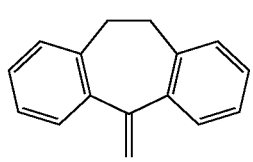

(W-61) 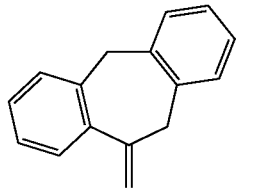

(W-62) 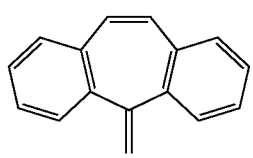

(In the formulas, an arbitrary —CH═ may be independently substituted with —N═, each —CH$_2$— may be independently substituted with —O—, —S—, —NR$^T$— (where R$^T$ represents a hydrogen atom or an alkyl group having 1 to 20 carbon atoms), —CS—, or —CO—, provided that an —O—O— bond is not included. These groups may be unsubstituted or substituted with one or more of the substituents L$^W$'s above.)

The group represented by Formula (W-41) preferably represents groups selected from Formulas (W-41-1) to (W-41-3) which may be unsubstituted or substituted with one or more of the substituents L$^W$'s above.

[Chem. 60]

(W-41-1) 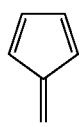

(W-41-2) 

(W-41-3) 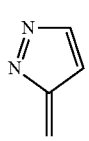

The group represented by Formula (W-42) preferably represents groups selected from Formulas (W-42-1) to (W-42-4) which may be unsubstituted or substituted with one or more of the substituents $L^W$'s above.

[Chem. 61]

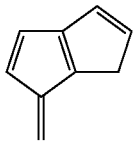

(W-42-1)

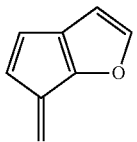

(W-42-2)

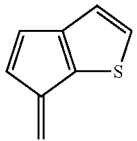

(W-42-3)

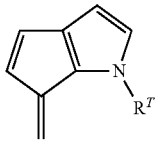

(W-42-4)

(In the formulas, $R^T$ represents a hydrogen atom or an alkyl group having 1 to 8 carbon atoms.)

The group represented by Formula (W-43) preferably represents groups selected from Formulas (W-43-1) to (W-43-4) which may be unsubstituted or substituted with one or more of the substituents $L^W$'s above.

[Chem. 62]

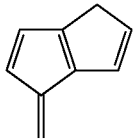

(W-43-1)

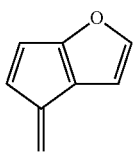

(W-43-2)

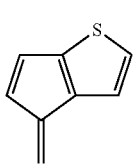

(W-43-3)

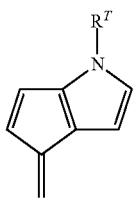

(W-43-4)

(In the formulas, $R^T$ represents a hydrogen atom or an alkyl group having 1 to 8 carbon atoms.)

The group represented by Formula (W-44) preferably represents groups selected from Formulas (W-44-1) to (W-44-4) which may be unsubstituted or substituted with one or more of the substituents $L^W$'s above.

[Chem. 63]

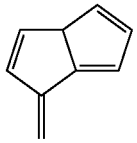

(W-44-1)

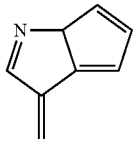

(W-44-2)

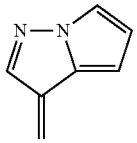

(W-44-3)

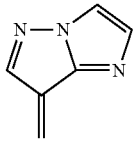

(W-44-4)

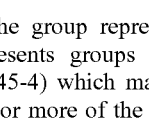

The group represented by Formula (W-45) preferably represents groups selected from Formulas (W-45-1) to (W-45-4) which may be unsubstituted or substituted with one or more of the substituents $L^W$'s above.

[Chem. 64]

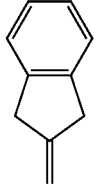

(W-45-1)

(W-45-2)

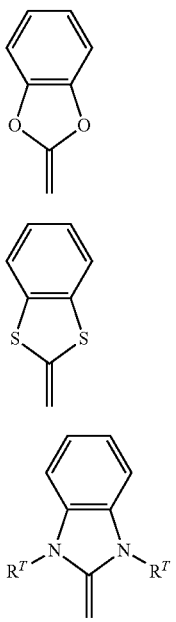

(W-45-3)

(W-45-4)

(In the formulas, $R^T$ represents a hydrogen atom or an alkyl group having 1 to 8 carbon atoms.)

The group represented by Formula (W-46) preferably represents groups selected from Formulas (W-46-1) to (W-46-4) which may be unsubstituted or substituted with one or more of the substituents $L^W$'s above.

[Chem. 65]

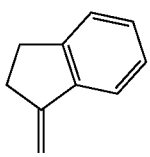 (W-46-1)

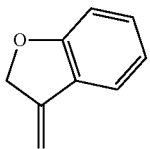 (W-46-2)

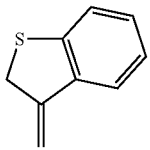 (W-46-3)

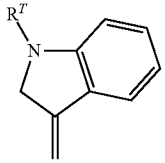 (W-46-4)

(In the formulas, $R^T$ represents a hydrogen atom or an alkyl group having 1 to 8 carbon atoms.)

The group represented by Formula (W-47) preferably represents groups selected from Formulas (W-47-1) to (W-47-3) which may be unsubstituted or substituted with one or more of the substituents $L^W$'s above.

[Chem. 66]

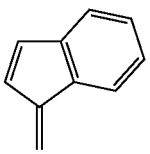 (W-47-1)

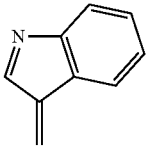 (W-47-2)

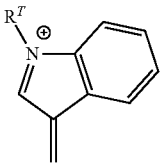 (W-47-3)

(In the formulas, $R^T$ represents a hydrogen atom or an alkyl group having 1 to 8 carbon atoms.)

The group represented by Formula (W-48) preferably represents groups selected from Formulas (W-48-1) to (W-48-7) which may be unsubstituted or substituted with one or more of the substituents $L^W$'s above.

[Chem. 67]

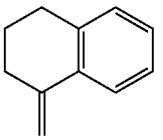 (W-48-1)

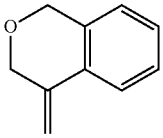 (W-48-2)

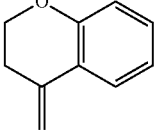 (W-48-3)

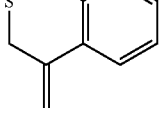 (W-48-4)

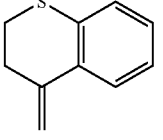 (W-48-5)

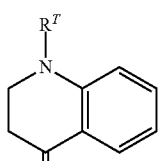
(W-48-6)

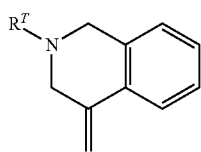
(W-48-7)

(In the formulas, $R^T$ represents a hydrogen atom or an alkyl group having 1 to 8 carbon atoms.)

The group represented by Formula (W-49) preferably represents groups selected from Formulas (W-49-1) to (W-49-4) which may be unsubstituted or substituted with one or more of the substituents $L^W$'s above.

[Chem. 68]

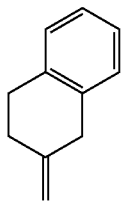
(W-49-1)

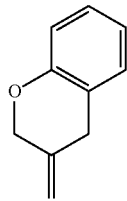
(W-49-2)

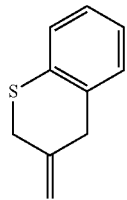
(W-49-3)

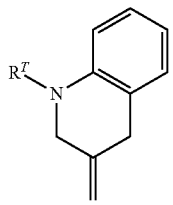
(W-49-4)

(In the formulas, $R^T$ represents a hydrogen atom or an alkyl group having 1 to 8 carbon atoms.)

The group represented by Formula (W-50) preferably represents groups selected from Formulas (W-50-1) to (W-50-6) which may be unsubstituted or substituted with one or more of the substituents $L^W$'s above.

[Chem. 69]

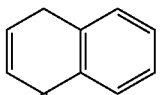
(W-50-1)

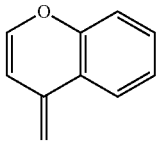
(W-50-2)

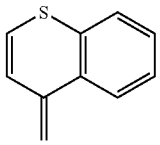
(W-50-3)

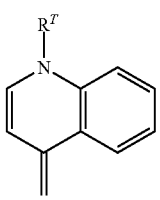
(W-50-4)

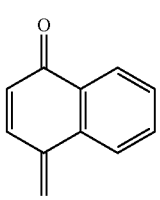
(W-50-5)

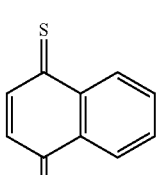
(W-50-6)

(In the formulas, $R^T$ represents a hydrogen atom or an alkyl group having 1 to 8 carbon atoms.)

The group represented by Formula (W-51) preferably represents groups selected from Formulas (W-51-1) to (W-51-3) which may be unsubstituted or substituted with one or more of the substituents $L^W$'s above.

[Chem. 70]

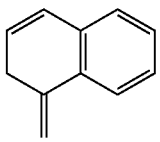
(W-51-1)

(W-51-2)

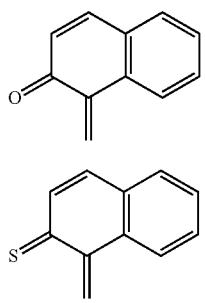

(W-51-3)

(W-53-2)

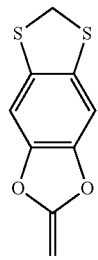

The group represented by Formula (W-52) preferably represents groups selected from Formulas (W-52-1) to (W-52-3) which may be unsubstituted or substituted with one or more of the substituents $L^W$'s above.

[Chem. 71]

(W-52-1)

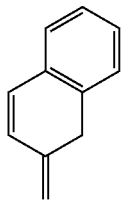

(W-53-3)

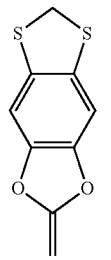

(W-52-2)

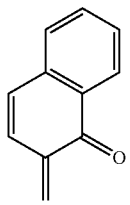

(W-53-4)

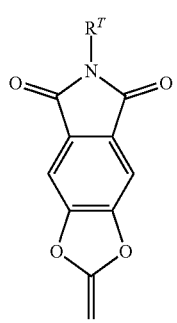

(W-52-3)

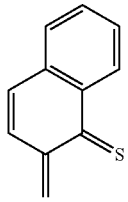

(W-53-5)

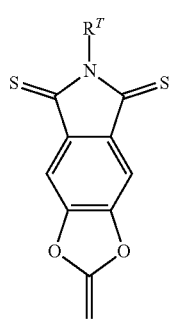

The group represented by Formula (W-53) preferably represents groups selected from Formulas (W-53-1) to (W-53-8) which may be unsubstituted or substituted with one or more of the substituents $L^W$'s above.

[Chem. 72]

(W-53-1)

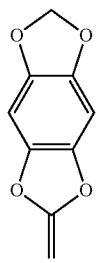

(W-53-6)

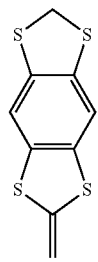

(W-53-7)

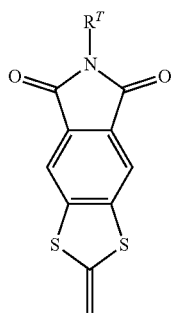

(W-53-8)

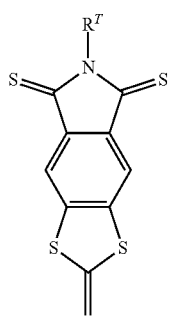

(In the formulas, $R^T$ represents a hydrogen atom or an alkyl group having 1 to 8 carbon atoms.)

The group represented by Formula (W-54) preferably represents groups selected from Formulas (W-54-1) to (W-54-5) which may be unsubstituted or substituted with one or more of the substituents $L^W$'s above.

[Chem. 73]

(W-54-1)

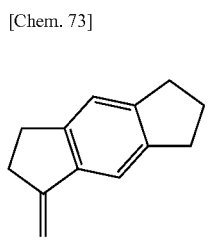

(W-54-2)

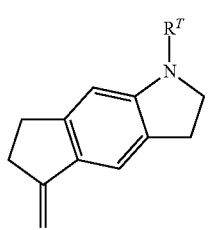

(W-54-3)

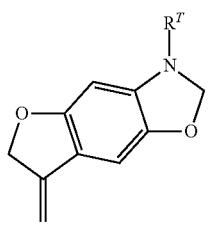

(W-54-4)

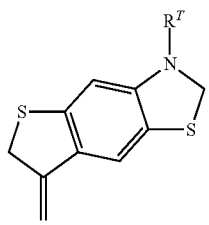

(W-54-5)

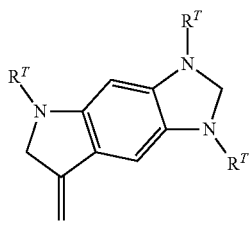

(In the formulas, $R^T$ represents a hydrogen atom or an alkyl group having 1 to 8 carbon atoms.)

The group represented by Formula (W-55) preferably represents groups selected from Formulas (W-55-1) to (W-55-3) which may be unsubstituted or substituted with one or more of the substituents $L^W$'s above.

[Chem. 74]

(W-55-1)

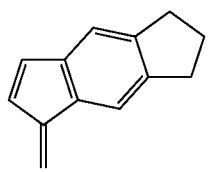

(W-55-2)

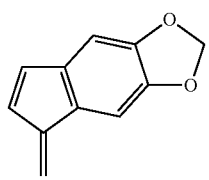

(W-55-3)

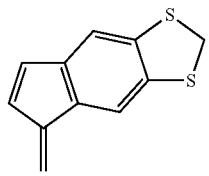

The group represented by Formula (W-56) preferably represents groups selected from Formulas (W-56-1) to (W-56-5) which may be unsubstituted or substituted with one or more of the substituents $L^W$'s above.

[Chem. 75]

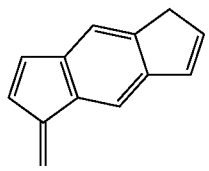 (W-56-1)

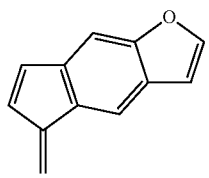 (W-56-2)

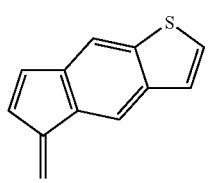 (W-56-3)

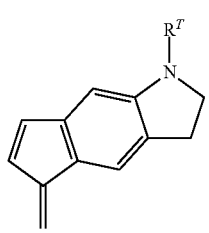 (W-56-4)

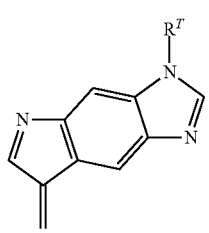 (W-56-5)

(In the formulas, $R^T$ represents a hydrogen atom or an alkyl group having 1 to 8 carbon atoms.)

The group represented by Formula (W-57) preferably represents Formula (W-57-1) which may be unsubstituted or substituted with one or more of the substituents $L^W$'s above.

[Chem. 76]

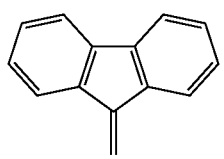 (W-57-1)

The group represented by Formula (W-58) preferably represents groups selected from Formulas (W-58-1) to (W-58-6) which may be unsubstituted or substituted with one or more of the substituents $L^W$'s above.

[Chem. 77]

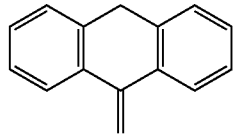 (W-58-1)

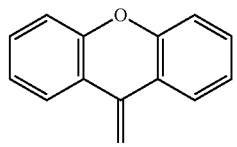 (W-58-2)

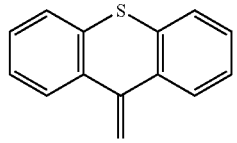 (W-58-3)

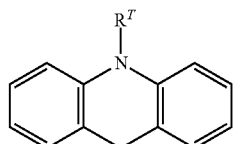 (W-58-4)

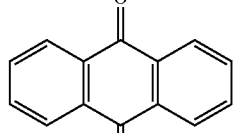 (W-58-5)

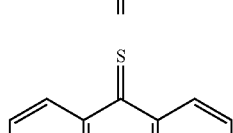 (W-58-6)

(In the formulas, $R^T$ represents a hydrogen atom or an alkyl group having 1 to 8 carbon atoms.)

The group represented by Formula (W-59) preferably represents groups selected from Formulas (W-59-1) to (W-59-3) which may be unsubstituted or substituted with one or more of the substituents $L^W$'s above.

[Chem. 78]

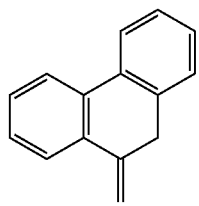 (W-59-1)

-continued

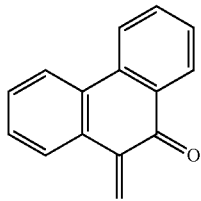
(W-59-2)

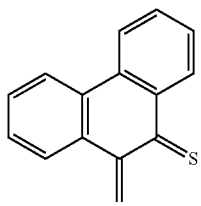
(W-59-3)

The group represented by Formula (W-60) preferably represents groups selected from Formulas (W-60-1) to (W-60-4) which may be unsubstituted or substituted with one or more of the substituents $L^{W}$'s above.

[Chem. 79]

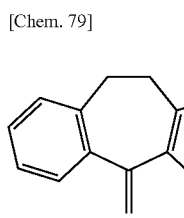
(W-60-1)

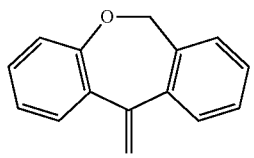
(W-60-2)

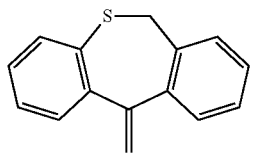
(W-60-3)

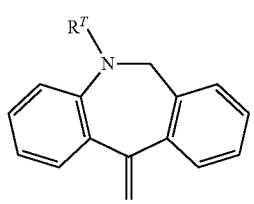
(W-60-4)

(In the formulas, $R^T$ represents a hydrogen atom or an alkyl group having 1 to 8 carbon atoms.)

The group represented by Formula (W-61) preferably represents groups selected from Formulas (W-61-1) to (W-61-4) which may be unsubstituted or substituted with one or more of the substituents $L^{W}$'s above.

[Chem. 80]

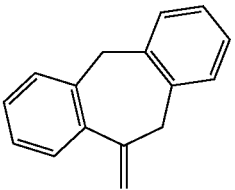
(W-61-1)

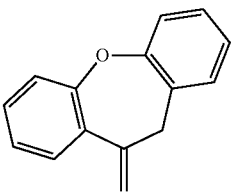
(W-61-2)

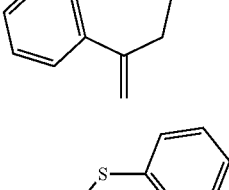
(W-61-3)

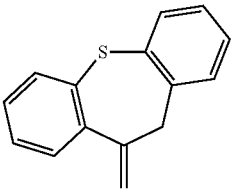
(W-61-4)

(In the formulas, $R^T$ represents a hydrogen atom or an alkyl group having 1 to 8 carbon atoms.)

As the group represented by Formula (W-62), Formula (W-62-1) which may be unsubstituted or substituted with one or more of the substituents $L^{W}$'s above:

[Chem. 81]

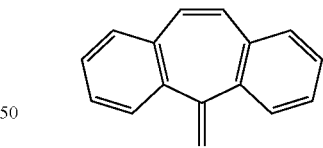
(W-62-1)

is preferable.

From the viewpoints of easy availability of raw materials and ease of synthesis, the cyclic group represented by $=CW^1W^2$ more preferable represents groups selected from Formulas (W-42-2), (W-42-3), (W-43-2), (W-43-3), (W-45-3), (W-45-4), (W-57-1), (W-58-2), (W-58-3), (W-58-4), and (W-62-1) which may be unsubstituted or substituted with one or more of the substituents $L^{W}$'s above, still more preferable represents groups selected from Formulas (W-57-1) and (W-62-1) which may be unsubstituted or substituted with one or more of the substituents $L^{W}$'s above, and still more preferable represents a group represented by Formula (W-57-1) which may be unsubstituted or substituted with one or more of the substituents $L^{W}$'s above.

The total number of π electrons contained in $W^1$ and $W^2$ is preferably 4 to 24 from the viewpoints of wavelength dispersion characteristics, storage stability, liquid crystallinity, and ease of synthesis.

From the viewpoints of liquid crystallinity and ease of synthesis, $L^W$ preferably represents a fluorine atom, a chlorine atom, a pentafluorosulfuranyl group, a nitro group, a methylamino group, a dimethylamino group, a diethylamino group, a diisopropylamino group, or a linear or branched alkyl group having 1 to 20 carbon atoms in which an arbitrary hydrogen atom may be substituted with a fluorine atom and one —CH$_2$— or two or more non-adjacent —CH$_2$—'s may be independently substituted with a group selected from —O—, —S—, —CO—, —COO—, —OCO—, —O—CO—O—, —CH=CH—, —CF=CF—, or —C≡C—, more preferably represents a fluorine atom, a chlorine atom, or a linear or branched alkyl group having 1 to 12 carbon atoms in which an arbitrary hydrogen atom may be substituted with a fluorine atom and one —CH$_2$— or two or more non-adjacent —CH$_2$—'s may be independently substituted with a group selected from —O—, —COO—, or —OCO—, still more preferably represents a fluorine atom, a chlorine atom, or a linear or branched alkyl group or alkoxy group having 1 to 12 carbon atoms in which an arbitrary hydrogen atom may be substituted with a fluorine atom, and particularly preferably represents a fluorine atom, a chlorine atom, or a linear alkyl group or a linear alkoxy group which has 1 to 8 carbon atoms.

In General Formula (I), $G^1$ more preferably represents groups selected from Formulas (G-1) to (G-22).

[Chem. 82]

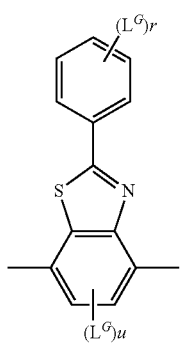

(G-1)

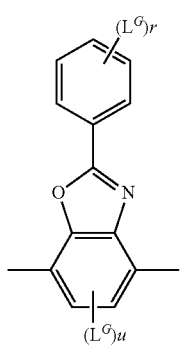

(G-2)

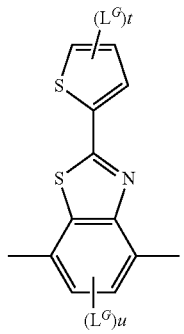

(G-3)

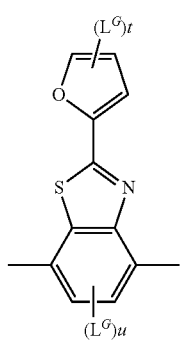

(G-4)

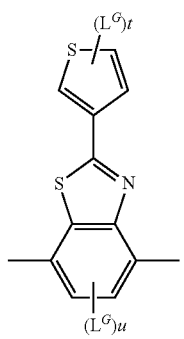

(G-5)

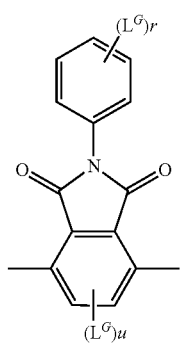

(G-6)

(G-7)
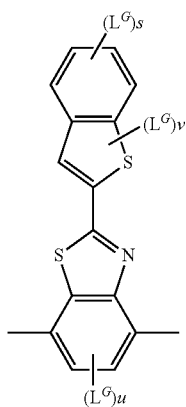
(G-8)
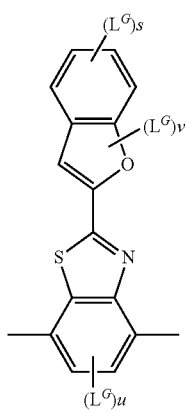
(G-9)
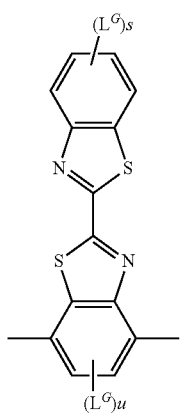
(G-10)
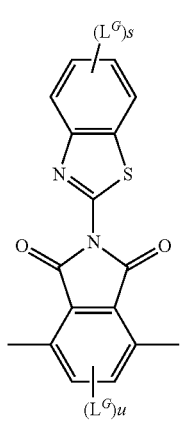
[Chem. 83]
(G-11)
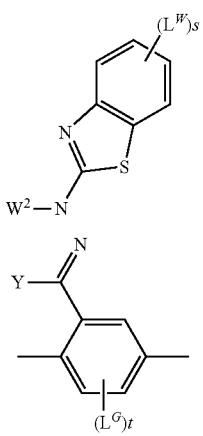
(G-12)
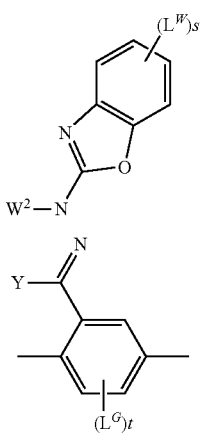
(G-13)

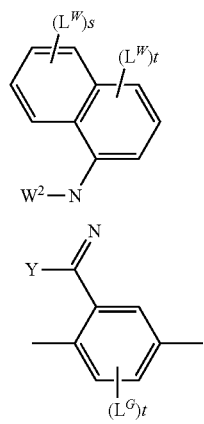 (G-14)
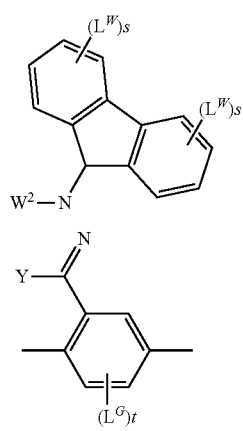 (G-15)
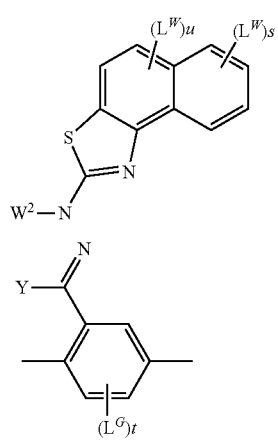 (G-16)
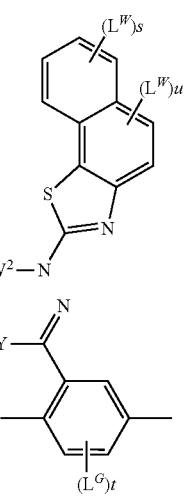 (G-17)
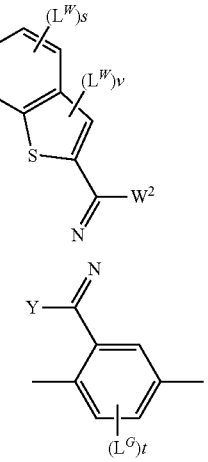 (G-18)
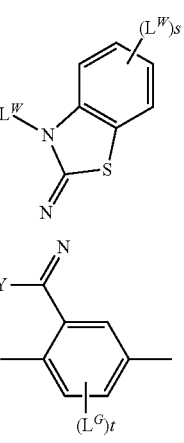 (G-19)

(G-20)

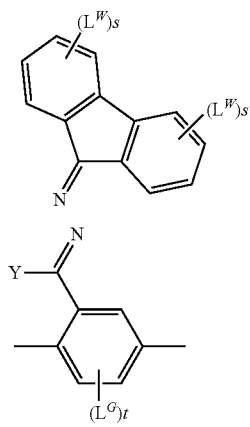

(G-21)

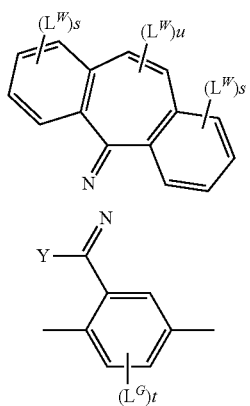

(G-22)

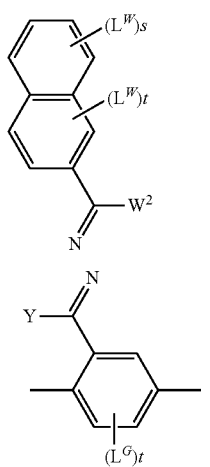

(In the formulas, $L^G$, $L^W$, Y, and $W^2$ represent the same meaning as described above, r represents an integer of 0 to 5, s represents an integer of 0 to 4, t represents an integer of 0 to 3, u represents an integer of 0 to 2, and v represents 0 or 1. These groups may be inverted in left and right.)

In Formulas (G-1) to (G-10), groups selected from Formulas (G-1), (G-3), (G-5), (G-6), (G-7), (G-8), and (G-10) are more preferable, the case where u is 0 is still more preferable, and groups selected from Formulas (G-1-1) to (G-10-1) are particularly preferable.

[Chem. 84]

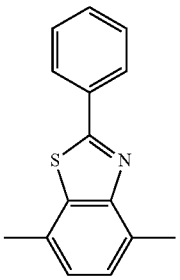
(G-1-1)

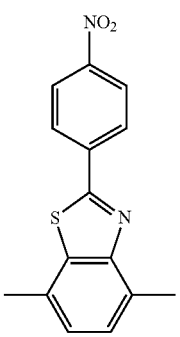
(G-1-2)

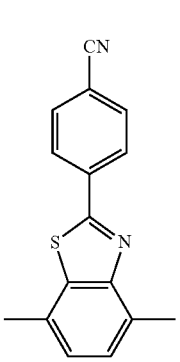
(G-1-3)

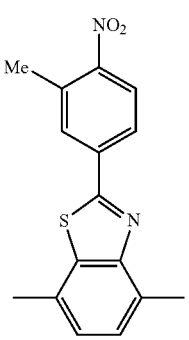
(G-1-4)

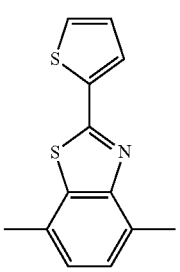
(G-3-1)

(G-5-1)
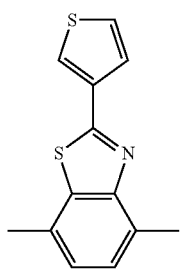
(G-6-1)
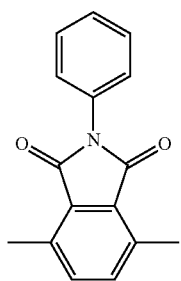
(G-7-1)
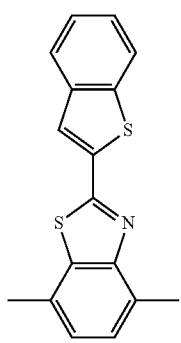
(G-8-1)
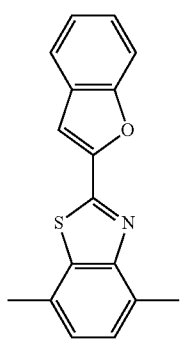
(G-8-2)
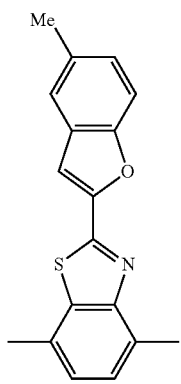
(G-8-2)
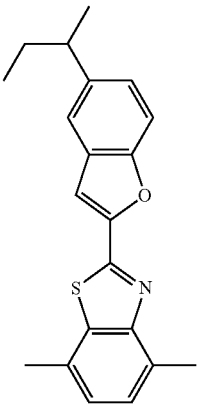
(G-8-3)
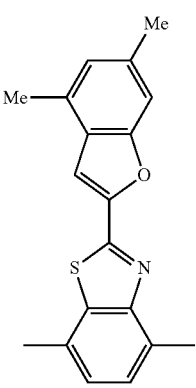
(G-8-4)
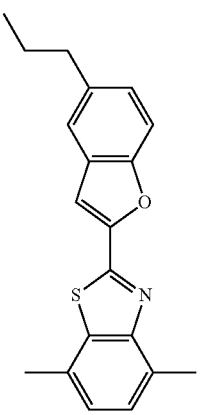
(G-10-1)
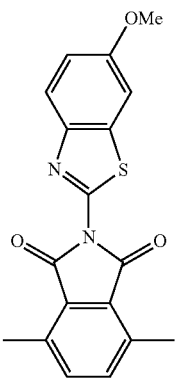
(In the formulas, these groups may be inverted in left and right.)

In Formulas (G-11) to (G-22), it is more preferable that Y represents a hydrogen atom, it is still more preferable that s, t, u, and v represent 0, and the groups selected from Formulas (G-11-1) to (G-20-1) are particularly preferable.
[Chem. 85]
(G-11-1)
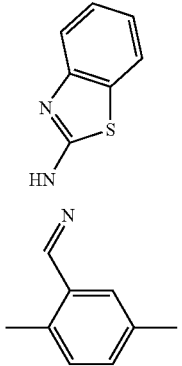
(G-11-2)
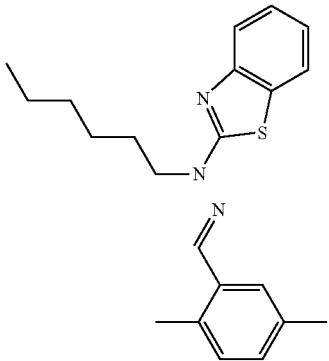
(G-11-3)
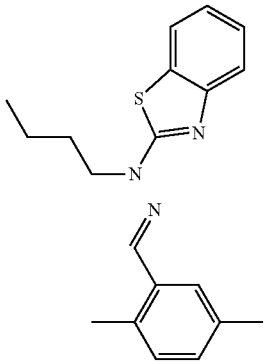
(G-11-4)
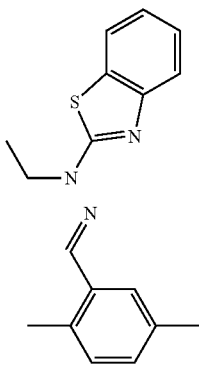
(G-11-5)
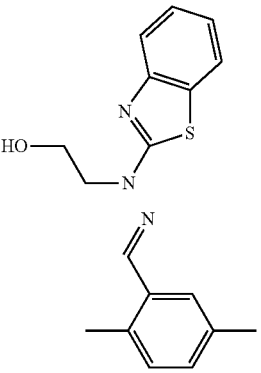
(G-11-6)
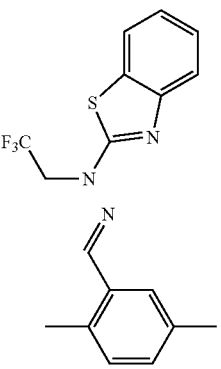
(G-11-7)
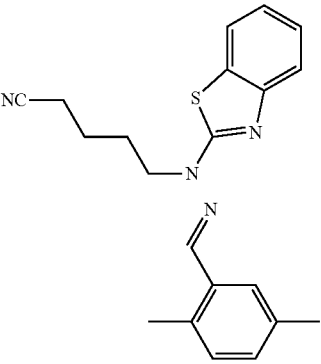
(G-11-8)
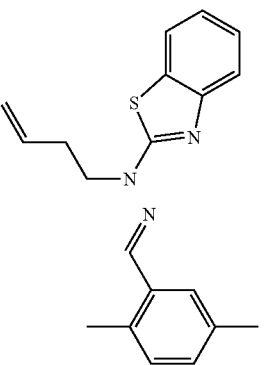

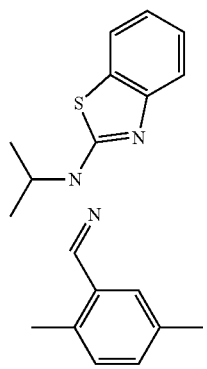
(G-11-9)
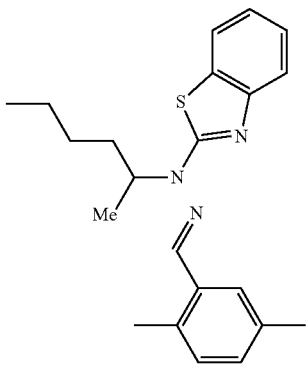
(G-11-13)
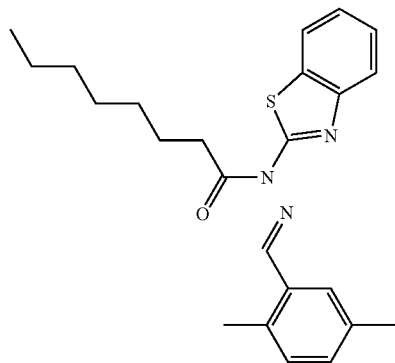
(G-11-10)
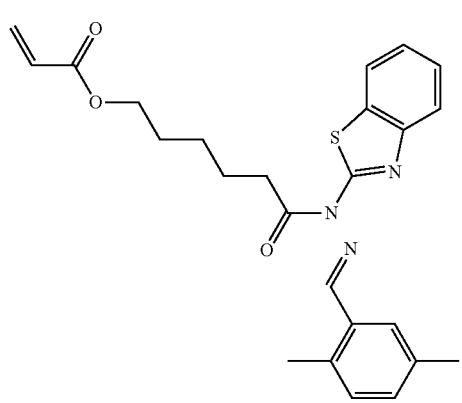
(G-11-11)
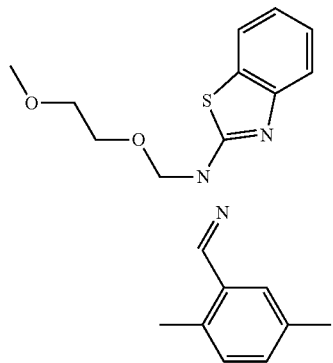
(G-11-12)
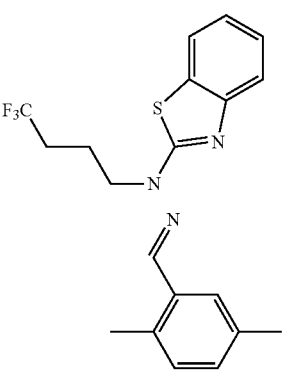
(G-11-14)
(G-11-15)
(G-11-16)

[Chem. 86]
(G-11-17)
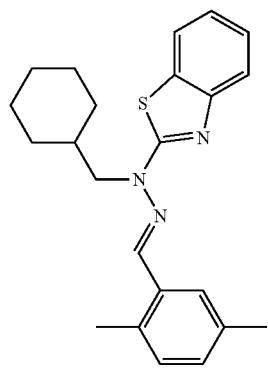
(G-11-18)
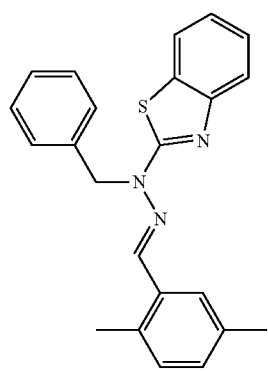
(G-11-19)
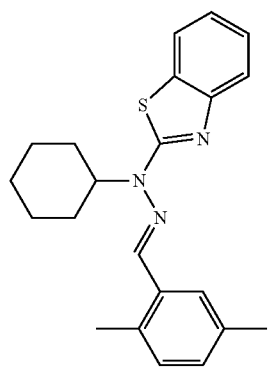
(G-11-20)
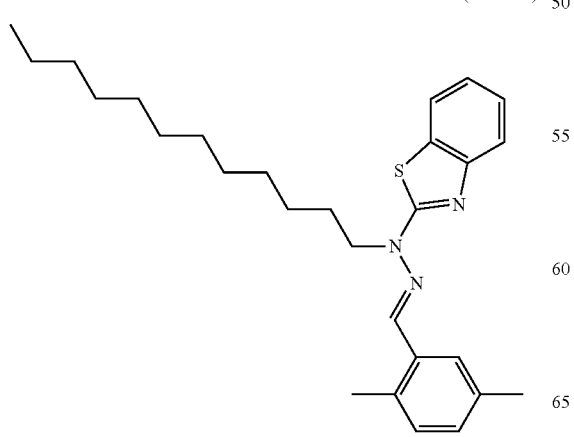
(G-11-21)
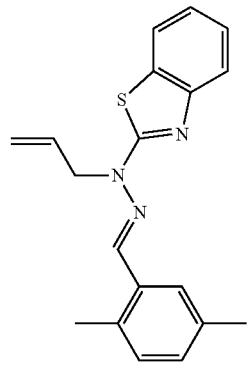
(G-11-22)
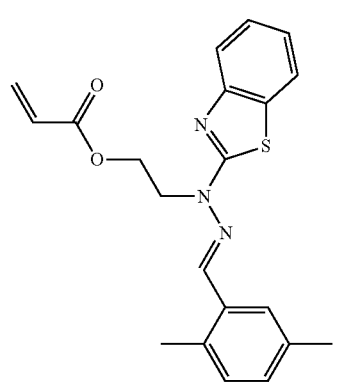
(G-11-23)
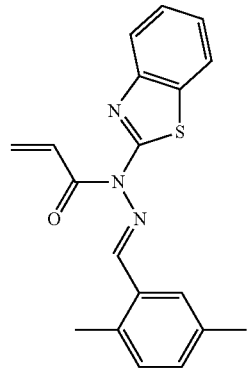
(G-11-24)
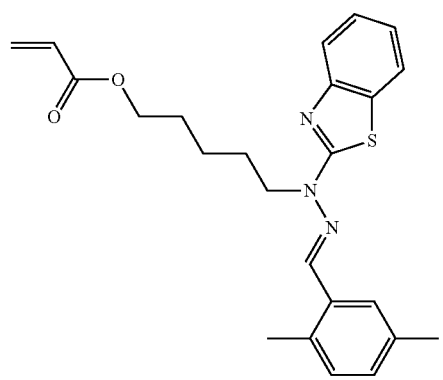

-continued (G-11-25)

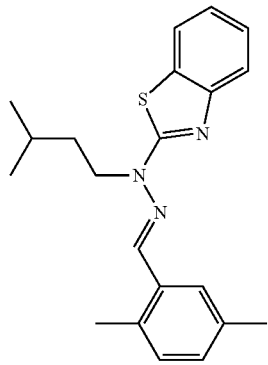

(G-11-26)

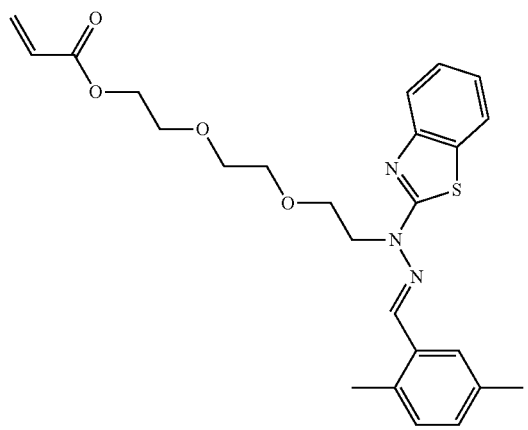

(G-15-1)

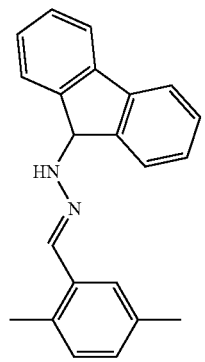

(G-16-1)

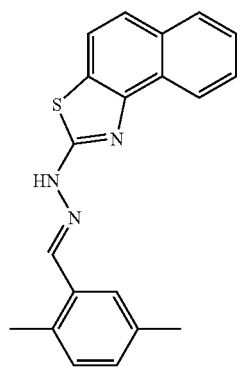

-continued (G-17-1)

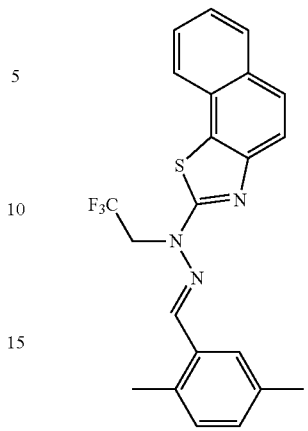

(G-20-1)

(In the formulas, these groups may be inverted in left and right.)

In the compound represented by General Formula (I), from the viewpoints of reverse dispersibility and liquid crystallinity, the compound is preferably a compound represented by General Formula (IA).

[Chem. 87]

$$R^1\text{-}A^{11}\text{-}Z^{11}\text{-}A^{12}\text{-}Z^{12}\text{-}G^1\text{-}Z^{21}\text{-}A^{21}\text{-}Z^{22}\text{-}A^{22}\text{-}R^2 \quad \text{(IA)}$$

(In the formulas, $R^1$, $R^2$, and $G^1$ represent the same meanings as in General Formula (I), $A^{11}$, $A^{12}$, $A^{21}$, and $A^{22}$ represent the same meanings as $A^1$ and $A^2$ in General Formula (I), $Z^{11}$ and $Z^{12}$ represent the same as $Z^1$ in General Formula (I), and $Z^{21}$ and $Z^{22}$ represent the same meaning as $Z^2$ in General Formula (I), provided that at least one of $Z^{11}$, $Z^{12}$, $Z^{21}$ and $Z^{22}$ represents a group selected from —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —NH—O—, —O—NH—, —SCH$_2$—, —CH$_2$S—, —CF$_2$O—, —OCF$_2$—, —CF$_2$S—, —SCF$_2$—, —CH═CH—, —N═N—, —CH═N—, —N═CH—, —CF═CF—, —C≡C—, or a single bond.)

Preferred forms of each group are the same as those in General Formula (I).

In the compound represented by Formula (IA), from the viewpoints of reverse dispersibility and liquid crystallinity, it is more preferable that $A^{11}$, $A^{12}$, $A^{21}$, and $A^{22}$ each independently represent a 1,4-phenylene group, a 1,4-cyclohexylene group, or a naphthalene-2,6-diyl group which may be unsubstituted or substituted with one or more of the substituents L's. It is still more preferable that $A^{11}$, $A^{12}$, $A^{21}$, and $A^{22}$ each independently represent groups selected from Formulas (A-1) to (A-11).

[Chem. 88]

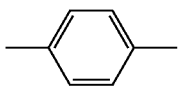
(A-1)

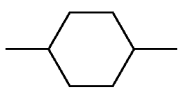
(A-2)

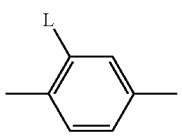
(A-3)

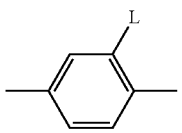
(A-4)

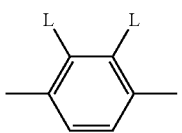
(A-5)

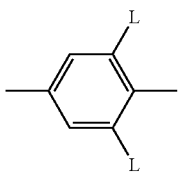
(A-6)

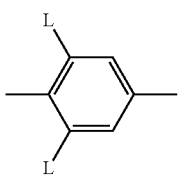
(A-7)

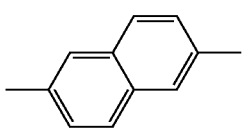
(A-8)

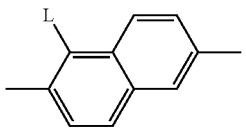
(A-9)

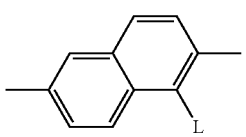
(A-10)

-continued

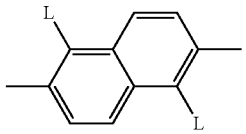
(A-11)

It is still more preferable that $A^{11}$, $A^{12}$, $A^{21}$, and $A^{22}$ each independently represent groups selected from Formulas (A-1) to (A-8), and it is particularly preferable that $A^{11}$, $A^{12}$, $A^{21}$, and $A^{22}$ each independently represent groups selected from Formulas (A-1) to (A-4). From the viewpoint of reverse dispersibility, it is preferable that $A^{12}$ and $A^{21}$ each independently represent a 1,4-cyclohexylene group which may be unsubstituted or substituted with one or more of the substituents L's. It is more preferable that $A^{12}$ and $A^{21}$ each independently represent a group represented by Formula (A-2). From the viewpoints of refractive index anisotropy, ease of synthesis, and solubility in a solvent, it is preferable that $A^{11}$ and $A^{22}$ each independently represent a 1,4-phenylene group or a naphthalene-2,6-diyl group which may be unsubstituted or substituted with one or more of the substituents L's. It is more preferable that $A^{11}$ and $A^{22}$ each independently represent groups selected from Formulas (A-1), and (A-3) to (A-11). It is still more preferable that $A^{11}$ and $A^{22}$ each independently represent groups selected from Formulas (A-1), and (A-3) to (A-8). It is still more preferable that $A^{11}$ and $A^{22}$ each independently represent groups selected from Formulas (A-1), (A-3), and (A-4). It is particularly preferable that $A^{11}$ and $A^{22}$ each independently represent a group represented by Formula (A-1).

In the compound represented by Formula (IA), from the viewpoints of liquid crystallinity, easy availability of raw materials, and ease of synthesis, $Z^{11}$, $Z^{12}$, $Z^{21}$ and $Z^{22}$ each preferably represent —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —CH=CH—, —CF=CF—, —C≡C—, or a single bond, more preferably represent —OCH$_2$—, —CH$_2$O—, —COO—, —OCO—, —CF$_2$O—, —OCF$_2$—, —CH$_2$CH$_2$—, —COO—CH$_2$CH$_2$—, —OCO—CH$_2$CH$_2$—, —CH$_2$CH$_2$—COO—, —CH$_2$CH$_2$—OCO—, —CH=CH—, —C≡C—, or a single bond, still more preferably represent —OCH$_2$—, —CH$_2$O—, —COO—, —OCO—, —CF$_2$O—, —OCF$_2$—, or a single bond, and still more preferably represent —OCH$_2$—, —CH$_2$O—, —COO—, —OCO—, or a single bond. From the viewpoints of reverse dispersibility and liquid crystallinity, it is particularly preferable that $Z^{11}$ and $Z^{22}$ each independently represent —COO—, —OCO—, or a single bond, and it is particularly preferable that $Z^{12}$ and $Z^{21}$ each independently represent —OCH$_2$—, —CH$_2$O—, —COO—, or —OCO—.

From the viewpoint of liquid crystallinity, a 1,4-cyclohexylene group, a tetrahydropyran-2,5-diyl group, a 1,3-dioxane-2,5-diyl group, and a decahydronaphthalene-2,6-diyl group contained in the compound represented by General Formula (I) may be in either a cis form or a trans form, or may be a mixture thereof, but from the viewpoint of liquid crystallinity, it is preferable that the trans form is the main component, and it is particularly preferable that only the trans form is used.

The compound of the present invention is preferably used in a nematic liquid crystal composition, a smectic liquid crystal composition, a chiral smectic liquid crystal composition, and a cholesteric liquid crystal composition. A compound other than that of the invention of the present application may be added to the liquid crystal composition using the compound of the invention of the present application.

Examples of other polymerizable compounds to be mixed with the compound of the invention of the present application so as to be used include a rod-like polymerizable liquid crystal compound which has a rigid site which is a mesogenic group in which a plurality of structures such as a 1,4-phenylene group and a 1,4-cyclohexylene group are linked and has a polymerizable functional group such as a vinyl group, an acryloyl group, and a (meth)acryloyl group, as described in Handbook of Liquid Crystals (D. Demus, J. W. Goodby, G. W. Gray, H. W. Spiess, V. Vill Editor, Published by Wiley-VCH Company, 1998), Quarterly Chemical Review No. 22, Chemistry of Liquid Crystals (edited by The Chemical Society of Japan, 1994), or JP-A-7-294735, JP-A-8-3111, JP-A-8-29618, JP-A-11-80090, JP-A-11-116538, and JP-A-11-148079, and the like, or a rod-like polymerizable liquid crystal compound having a maleimide group as described in JP-A-2004-2373 and JP-A-2004-99446.

As specific examples of the other polymerizable compounds to be used by mixing with the mixture of the invention of the present application, compounds represented by General Formula (X-11) and/or General Formula (X-12) are preferable.

[Chem. 89]

(X-11)

[Chem. 90]

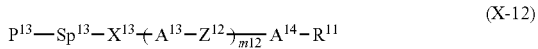
(X-12)

(In the formulas, $P^{11}$, $P^{12}$, and $P^{13}$ each independently represent a polymerizable group, $Sp^{11}$, $Sp^{12}$, and $Sp^{13}$ each independently represent a single bond or an alkylene group having 1 to 20 carbon atoms, but one —$CH_2$— or two or more non-adjacent —$CH_2$—'s may be independently substituted with —O—, —COO—, —OCO—, or —OCOO—, $X^{11}$, $X^{12}$, and $X^{13}$ each independently represent —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —CF=CF—, —C≡C—, or a single bond, $Z^{11}$ and $Z^{12}$ each independently represent —O—, —S—, —$OCH_2$—, —$CH_2O$—, —COO—, —OCO—, —CO—, —CO—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —$CH_2CH_2$—, —$CH_2CF_2$—, —$CF_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —CF=CF—, —C≡C—, or a single bond, and in the case where a plurality of $Z^{11}$'s are present, these may be the same as or different from each other, and in the case where a plurality of $Z^{12}$'s are present, these may be the same as or different from each other, $A^{11}$, $A^{12}$, $A^{13}$, and $A^{14}$ each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, or a 1,3-dioxane-2,5-diyl group, in which $A^{11}$, $A^{12}$, $A^{13}$, and $A^{14}$ each may be independently unsubstituted or substituted with a substituent $L^{11}$, in the case where a plurality of $A^{11}$ are present, these are the same as or different from each other, and in the case where a plurality of $A^{13}$ are present, these are the same as or different from each other, $L^{11}$ represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which an arbitrary hydrogen atom in the alkyl group may be substituted with a fluorine atom and one —$CH_2$— or two or more non-adjacent —$CH_2$—'s may be independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, or $L^{11}$ may represent a group represented by $P^{L11}$-$(Sp^{L11}$-$X^{L11})_{kL11}$— in which $P^{L11}$ represents a polymerizable group and a preferable polymerizable group is the same as that in the case of $P^0$, $Sp^{L11}$ represents a spacer group or a single bond and a preferable spacer group is the same as that in the case of $Sp^0$, in the case where a plurality of $Sp^{L11}$'s are present, these may be the same as or different from each other, $X^{L11}$ represents —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—N=CH—, —CF=CF—, —C≡C—, or a single bond, and in the case where a plurality of $X^{L11}$'s are present, these may be the same as or different from each other, with the proviso that $P^{L11}$-$(Sp^{L11}$-$X^{L11})_{kL11}$— does not contain an —O—O— bond, kL11 represents an integer of 0 to 10, but in the case where a plurality of $L^{11}$'s are present in the compound, these may be the same as or different from each other, $R^{11}$ represents a hydrogen atom, a fluorine atom, a chlorine atom, a bromine atom, an iodine atom, a pentafluorosulfuranyl group, a cyano group, a nitro group, an isocyano group, a thioisocyano group, or a linear or branched alkyl group having 1 to 20 carbon atoms in which one —$CH_2$— or two or more non-adjacent —$CH_2$—'s may be independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and m11 and m12 each independently represent an integer of 0 to 3.)

The case where $P^{11}$, $P^{12}$, and $P^{13}$ are an acryl group or a methacrylic group is particularly preferable. Specific examples of the compound represented by General Formula (X-11) include compounds represented by Formulas (X-11-A) to (X-11-F).

[Chem. 91]

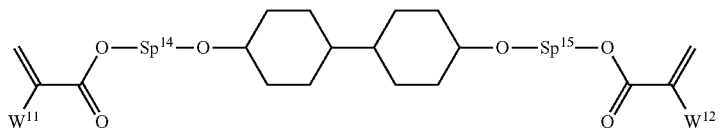
(X-11-A)

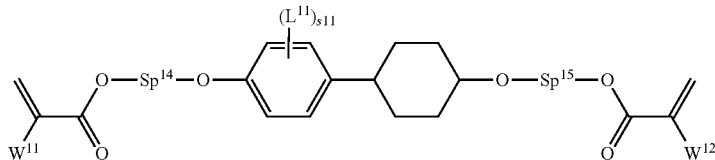
(X-11-B)

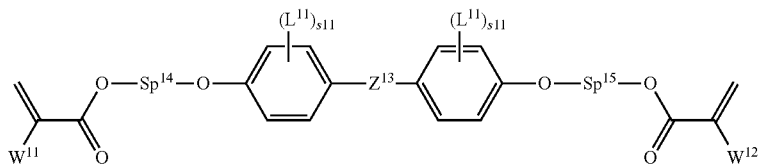
(X-11-C)

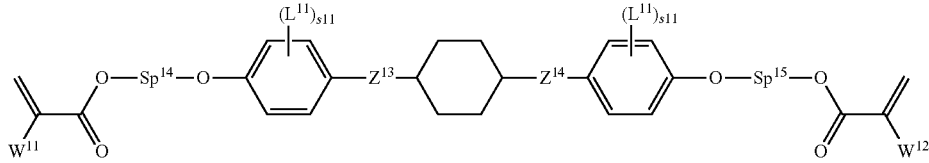
(X-11-D)

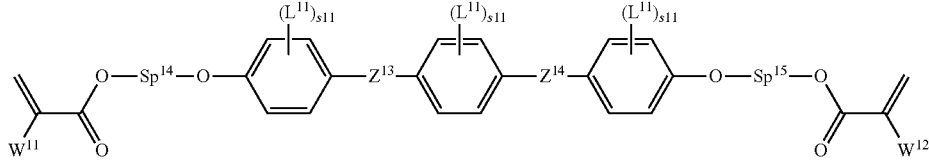
(X-11-E)

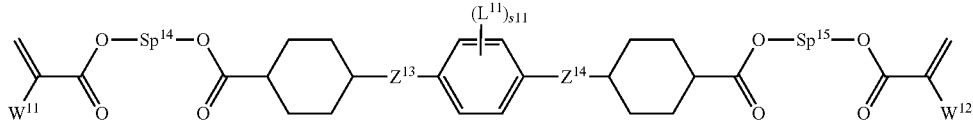
(X-11-F)

(In the formulas, $W^{11}$ and $W^{12}$ each independently represent a hydrogen atom, a fluorine atom, a methyl group, or a trifluoromethyl group, $Sp^{14}$ and $Sp^{15}$ each independently represent an alkylene group having 2 to 18 carbon atoms, $Z^{13}$ and $Z^{14}$ each independently represent —OCH$_2$—, —CH$_2$O—, —COO—, —OCO—, —COO—CH$_2$CH$_2$—, —OCO—CH$_2$CH$_2$—, —CH$_2$CH$_2$—COO—, —CH$_2$CH$_2$—OCO—, —C≡C—, or a single bond, $L^{11}$ represents the same meaning as described above, and s11 represents an integer of 0 to 4.)

In Formulas (X-11-A) to (X-11-F), it is more preferable that $W^{11}$ and $W^{12}$ each independently represent a hydrogen atom or a methyl group, it is more preferable that $Z^{13}$ and $Z^{14}$ each independently represent —COO—, —OCO—, —COO—CH$_2$CH$_2$—, or —CH$_2$CH$_2$—OCO—, it is still more preferable that $Z^{13}$ and $Z^{14}$ each independently represent —COO— or —OCO—, and it is more preferable that $L^{11}$ each represents a fluorine atom, a chlorine atom, a methyl group, or a methoxy group.

More specific examples of the compound represented by Formula (X-11) include compounds represented by Formulas (X-11-B-1) to (X-11-F-2).

[Chem. 92]

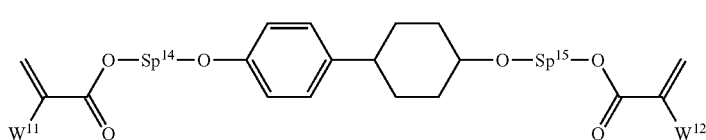
(X-11-B-1)

(X-11-C-1)
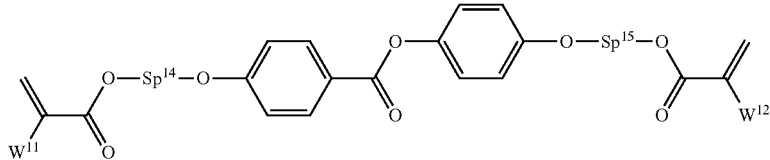
(X-11-D-1)
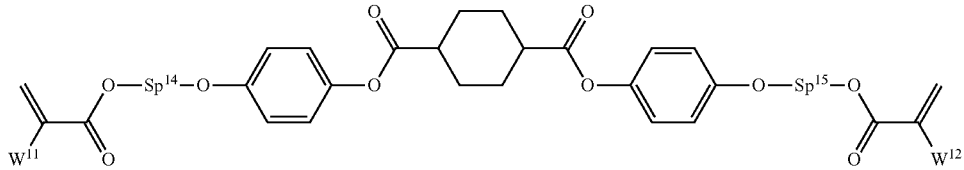
(X-11-D-2)
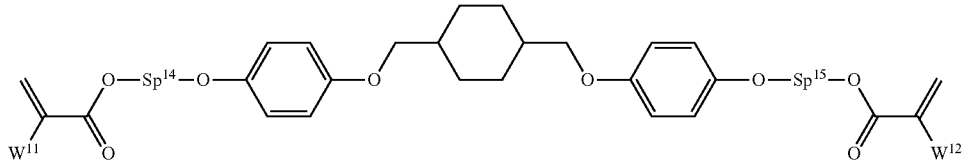
(X-11-D-3)
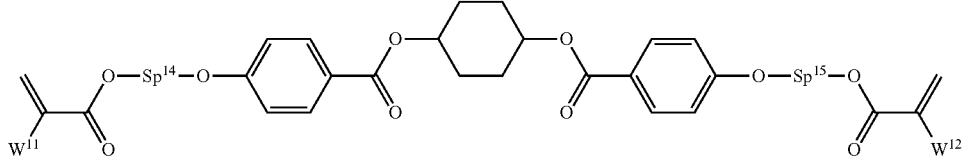
[Chem. 93]
(X-11-E-1)
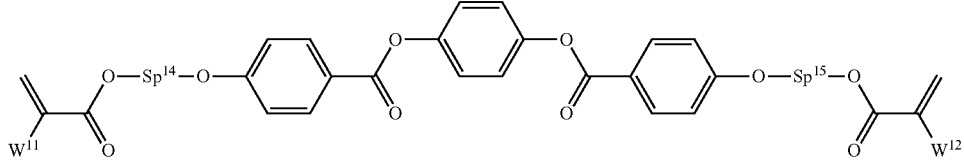
(X-11-E-2)
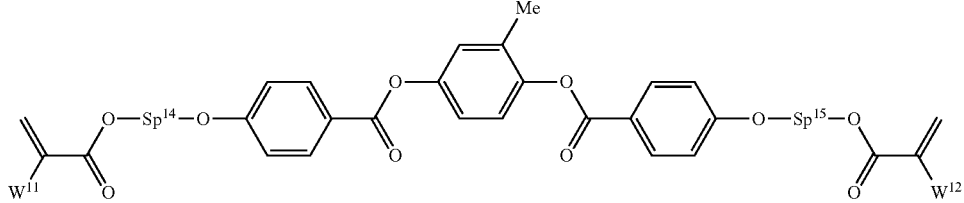
(X-11-E-3)
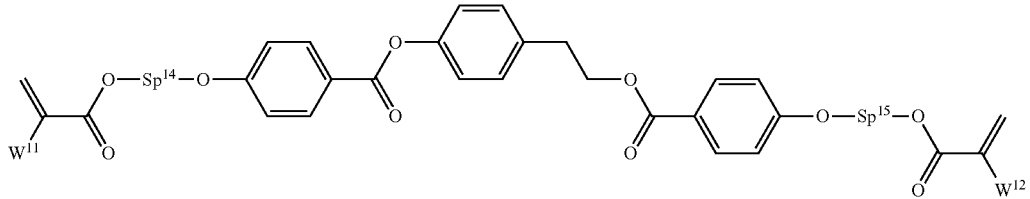
(X-11-F-1)
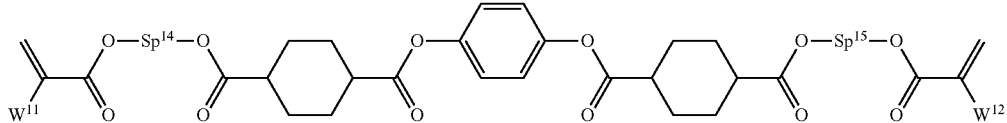

(X-11-F-2)

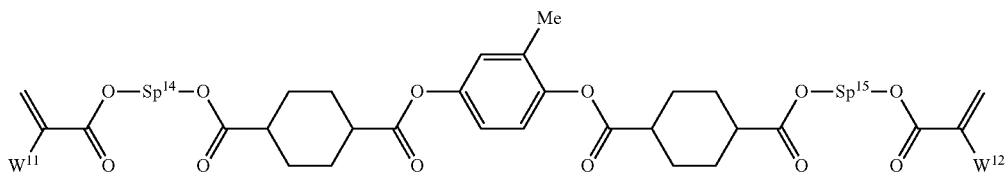

(In the formulas, $W^{11}$, $W^{12}$, $Sp^{14}$, and $Sp^{15}$ each independently represent the same meaning as described above.)

Specific examples of the compound represented by General Formula (X-12) include compounds represented by General Formulas (X-12-A) to (X-12-E).

group, an alkyl group having 1 to 10 carbon atoms, or an alkoxy group having 1 to 10 carbon atoms.)

In Formulas (X-12-A) to (X-12-E), it is more preferable that $W^{13}$ each independently represent a hydrogen atom or a methyl group, it is more preferable that $Z^{15}$ and $Z^{16}$ each

[Chem. 94]

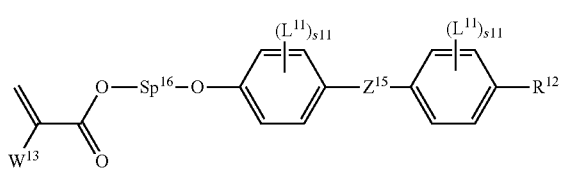
(X-12-A)

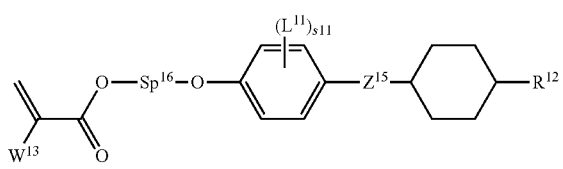
(X-12-B)

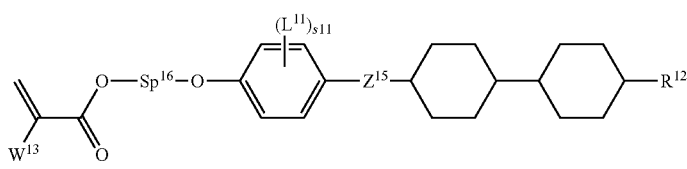
(X-12-C)

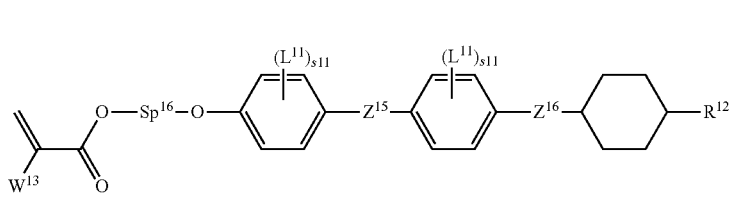
(X-12-D)

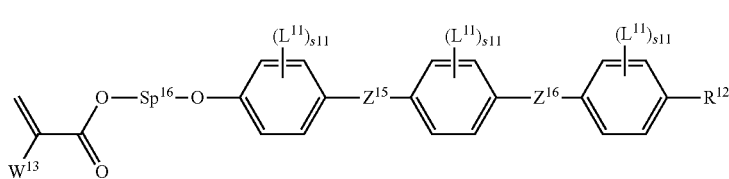
(X-12-E)

(In the formulas, $W^{13}$ each independently represent a hydrogen atom, a fluorine atom, a methyl group, or a trifluoromethyl group, $Sp^{16}$ each independently represent an alkylene group having 2 to 18 carbon atoms, $Z^{15}$ and $Z^{16}$ each independently represent —OCH$_2$—, —CH$_2$O—, —COO—, —OCO—, —COO—CH$_2$CH$_2$—, —OCO—CH$_2$CH$_2$—, —CH$_2$CH$_2$—COO—, —CH$_2$CH$_2$—OCO—, —C≡C—, or a single bond, $L^1$ represents the same meaning as described above, s11 represents an integer of 0 to 4, and $R^{12}$ represents a hydrogen atom, a fluorine atom, a cyano independently represent —COO—, —OCO—, —C≡C—, or a single bond, it is still more preferable that $Z^{15}$ and $Z^{16}$ each independently represent —COO—, —OCO—, or a single bond, and it is more preferable that $L^{11}$ each represent a fluorine atom, a chlorine atom, a methyl group, or a methoxy group.

More specific examples of the compound represented by Formula (X-12) include compounds represented by Formulas (X-12-A-1) to (X-12-E-6).

[Chem. 95]
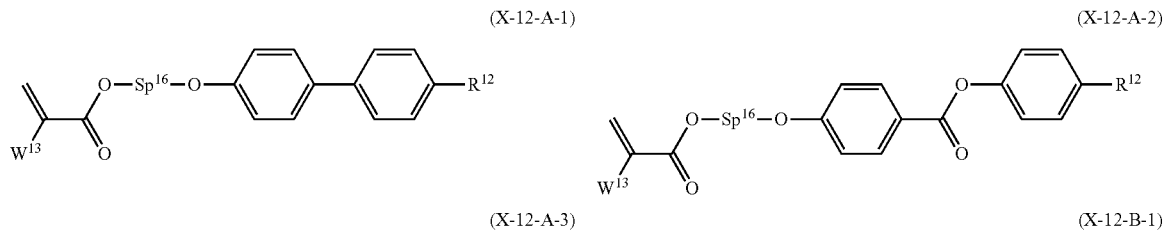
[Chem. 96]
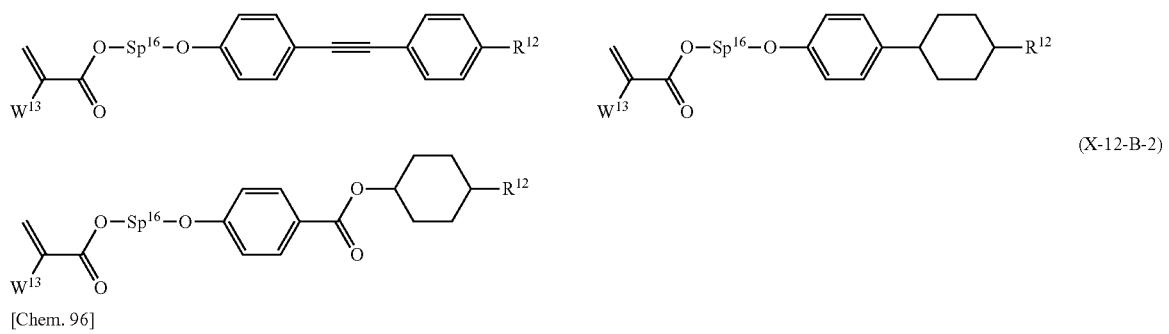
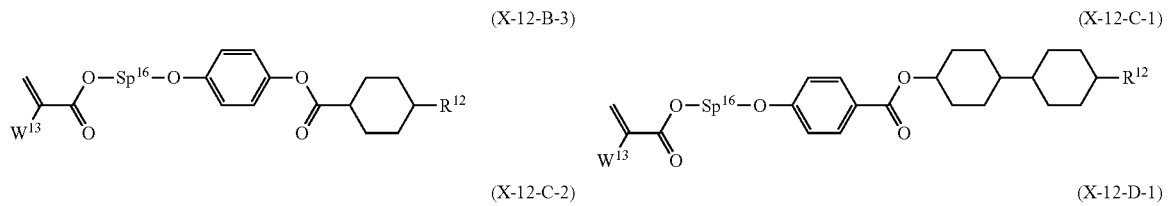
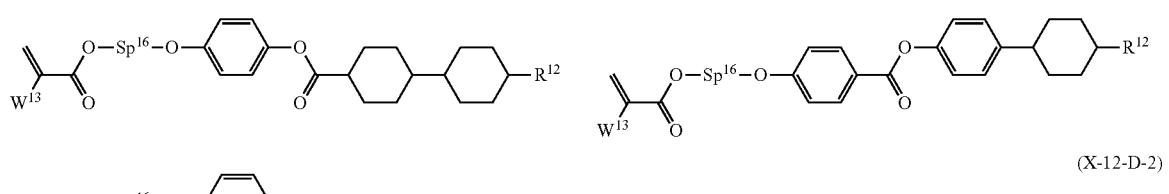
[Chem. 97]
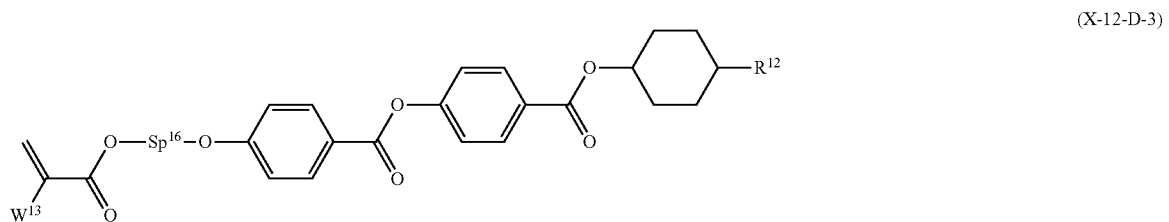
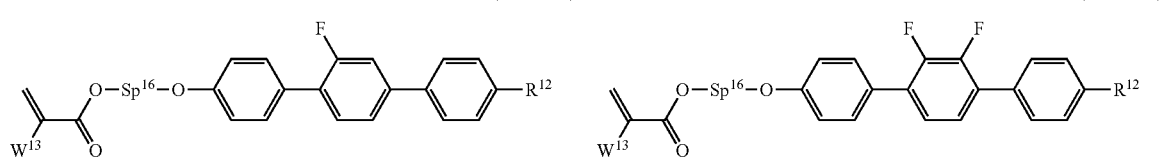
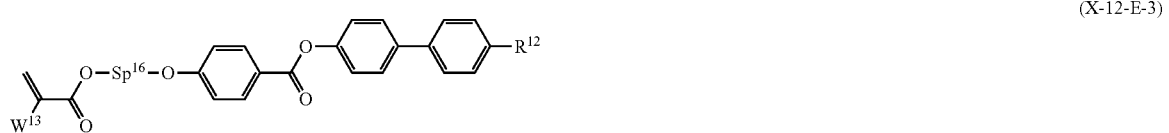

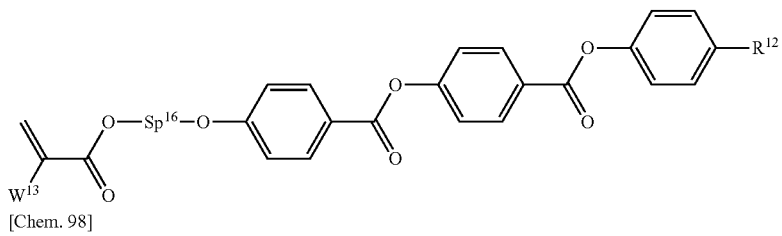
(X-12-E-4)

[Chem. 98]

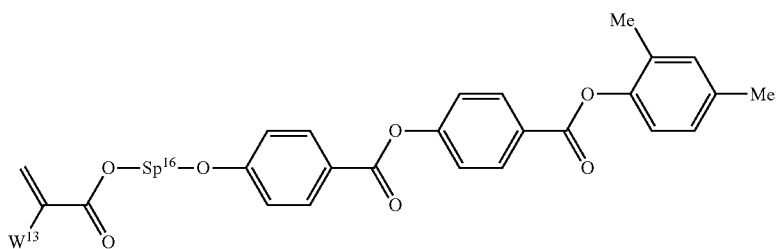
(X-12-E-5)

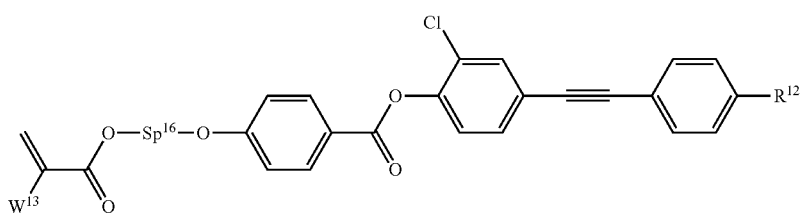
(X-12-E-6)

(In the formulas, $W^{13}$, $Sp^{16}$, and $R^{12}$ each independently represent the same meaning as described above.)

To the liquid crystal composition of the present invention, a compound containing a mesogenic group not having a polymerizable group may be added, and examples thereof include a compound used for a general liquid crystal device, for example, a TFT liquid crystal or the like. As the compound containing a mesogenic group not having a polymerizable group, a compound represented by General Formula (X-21) is preferable.

[Chem. 99]

$$R^{21} + (A^{21} - Z^{21})_{\overline{m21}} A^{22} - R^{22}$$ (X-21)

(In the formula, $R^{21}$ and $R^{22}$ each independently represent a hydrogen atom, a fluorine atom, a chlorine atom, a cyano group, or a linear alkyl group or a branched alkyl group having 1 to 20 carbon atoms in which an arbitrary hydrogen atom in the alkyl group may be substituted with a fluorine atom and one —$CH_2$— or two or more non-adjacent —$CH_2$—'s may be independently substituted with —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —$CH_2$—COO—$CH_2$—, —OCO—$CH_2$—, —$CH_2$—COO—, —$CH_2$—OCO—, —CH=CH—, —N=N—, —CH=N—N=CH—, —CF=CF—, or C≡C—, $A^{21}$ and $A^{22}$ each independently represent a 1,4-phenylene group, 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, these groups may be unsubstituted or substituted with one or more of substituents $L^{21}$'s, in the case where a plurality of $A^{21}$'s are present, these may be the same as or different from each other, $L^{21}$ represents a fluorine atom, a chlorine atom, a cyano group, or a linear or branched alkyl group having 1 to 20 carbon atoms in which an arbitrary hydrogen atom in the alkyl group may be substituted with a fluorine atom and one —$CH_2$— or two or more non-adjacent —$CH_2$—'s may be independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF, or —C≡C—, $Z^{21}$ represents a group represented by —$OCH_2$—, —$CH_2O$—, —$CH_2CH_2$—, —COO—, —OCO—, —CO—S—, —S—CO—, —CO—NH—, —NH—CO—, —NH—O—, —O—NH—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —CH=CH—, —N=N—, —CH=N—, —N=CH—, —CH=N—N=CH—, —CF=CF—, —C≡C, or a single bond, and in the case where a plurality of $Z^{21}$'s are present, these may be the same as or different from each other, and m21 represents an integer of 0 to 6.)

As specific examples of the compound represented by General Formula (X-21), compounds selected from Formulas (X-21-1) to (X-21-8) are more preferable.

[Chem. 100]

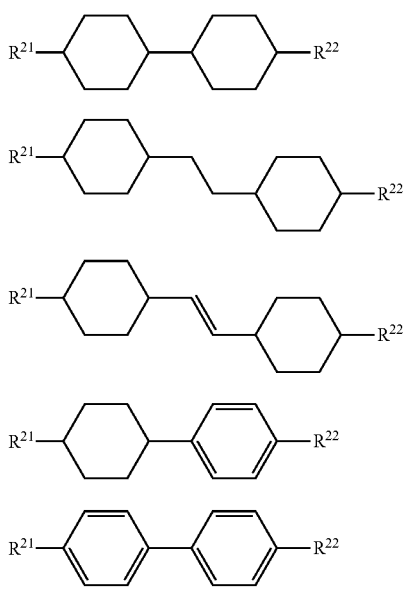

(X-21-1)
(X-21-2)
(X-21-3)
(X-21-4)
(X-21-5)

[Chem. 101]

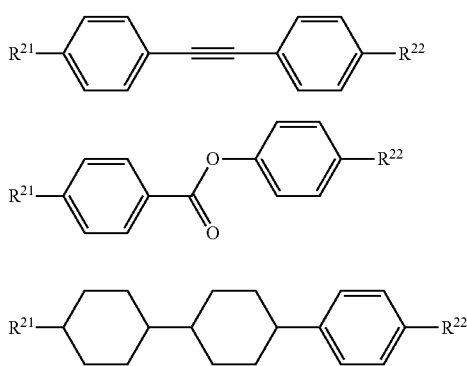

(X-21-6)
(X-21-7)
(X-21-8)

(In the formulas, $R^{21}$ and $R^{22}$ each independently represent the same meaning as described above, but it is preferable that $R^{21}$ and $R^{22}$ each independently represent a fluorine atom, a cyano group, or a linear alkyl group having 1 to 8 carbon atoms in which one —CH$_2$— may be substituted with —O— or —CH=CH—.)

The total content of the compound represented by General Formula (X-12) is preferably 5.0% by mass or higher, preferably 10.0% by mass or higher, and preferably 15.0% by mass or higher, or preferably 90.0% by mass or lower and preferably 85.0% by mass or lower with respect to the total content of the polymerizable composition.

In the polymerizable composition of the present invention, a chiral compound may be blended with a chiral compound for the purpose of obtaining a chiral nematic phase or a chiral smectic phase. Among chiral compounds, compounds having a polymerizable functional group in the molecule are particularly preferable. The chiral compound of the present invention may be liquid crystalline, and may exhibit non-liquid crystallinity.

The chiral compound used in the present invention preferably has at least one polymerizable functional group. Examples of such compounds include a polymerizable chiral compound which contains chiral sugars such as isosorbide, isomannide, and glucoside, has a rigid site such as a 1,4-phenylene group and 1,4-cyclohexylene group, and has a polymerizable functional group such as a vinyl group, an acryloyl group, a (meth)acryloyl group, or a maleimide group, as described in JP-A-11-193287, JP-A-2001-158788, JP-T-2006-52669, JP-A-2007-269639, JP-A-2007-269640, JP-A-2009-84178, and the like, a polymerizable chiral compound consisting of a terpenoid derivative as described in JP-A-8-239666, a polymerizable chiral compound consisting of a spacer having a mesogenic group and a chiral moiety as described in NATURE VOL. 35, pp. 467 to 469 (published on Nov. 30, 1995), NATURE VOL. 392, pp. 476 to 479 (published on Apr. 2, 1998), or polymerizable chiral compound containing a binaphthyl group as described in JP-T-2004-504285 and JP-A-2007-248945. Among these, a chiral compound having large helical twisting power (HTP) is preferable for the polymerizable composition of the present invention.

It is required that a blending amount of the chiral compound is appropriately adjusted according to helical inducting power of the compound, and in the polymerizable composition, the compound is preferably contained by 0% to 25% by mass, more preferably contained by 0% to 20% by mass, and particularly preferably contained by 0% to 15% by mass.

Specific examples of the chiral compound are preferably selected from Formulas (X-31) to (X-34).

[Chem. 102]

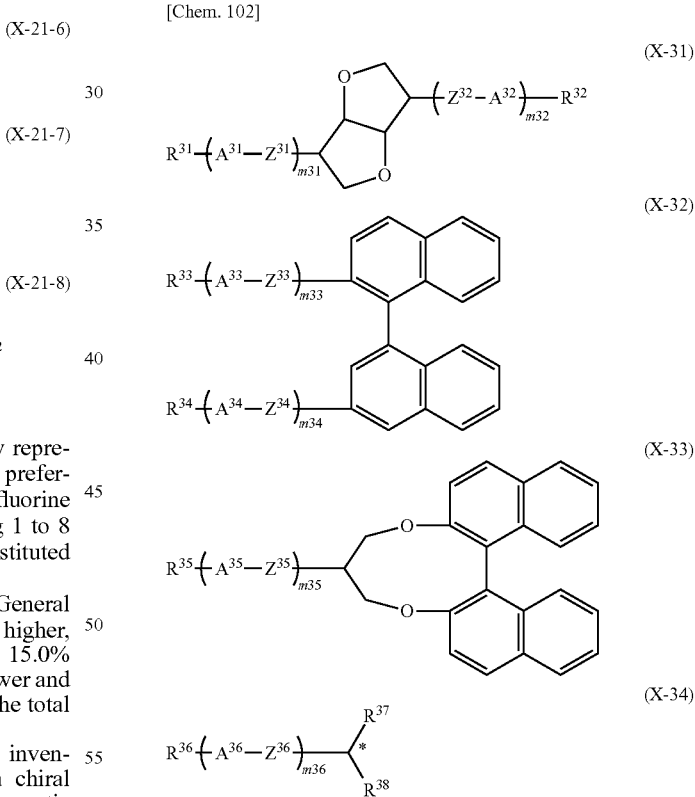

(X-31)
(X-32)
(X-33)
(X-34)

In the formulas, $R^{31}$, $R^{32}$, $R^{33}$, $R^{34}$, $R^{35}$, $R^{36}$, $R^{37}$ and $R^{38}$ each independently represent a hydrogen atom, a fluorine atom, a chlorine atom, a bromine atom, an iodine atom, a pentafluorosulfuranyl group, a cyano group, a nitro group, an isocyano group, a thioisocyano group, or a linear or branched alkyl group having 1 to 20 carbon atoms in which one —CH$_2$— or two or more non-adjacent —CH$_2$—'s may be independently substituted with —O—, —S—, —CO—, —COO—, —OCO—, —CO—S—, —S—CO—, —O—CO—O—, —CO—NH—, —NH—CO—, —CH=CH—

—COO—, —CH=CH—OCO—, —COO—CH=CH—, —OCO—CH=CH—, —CH=CH—, —CF=CF—, or —C≡C—), or $R^{31}$, $R^{32}$, $R^{33}$, $R^{34}$, $R^{35}$, $R^{36}$, $R^{37}$, and $R^{38}$ each independently represent a group represented by Formula (X-30-R).

[Chem. 103]

(X-30-R)

(In the formula, $P^{31}$ represents a polymerizable group and a preferable polymerizable group represents the same as in the case of $P^0$, $Sp^{31}$ represents a spacer group or a single bond and a preferable spacer group is the same as that in the case of $Sp^0$, in the case where a plurality of $Sp^{31}$'s are present, these may be the same as or different from each other, $X^{31}$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —COO—CH=CH—, —OCO—CH=CH—, —CH=CH—OCO—, —COO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond, and in the case where a plurality of $X^{31}$'s are present, these may be the same as or different from each other, with the proviso that $P^{31}$-(Sp$^{31}$-X$^{31}$)$_{K31}$— does not contain an —O—O— bond, and k31 represents an integer of 0 to 10.)

$R^{37}$ and $R^{38}$ represent a different group from each other, which is other than a hydrogen atom, $A^{31}$, $A^{32}$, $A^{33}$, $A^{34}$, $A^{35}$, and $A^{36}$ each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, these groups may be unsubstituted or substituted with one or more substituents $L^{31}$'s, and in the case where a plurality of $A^{31}$, $A^{32}$, $A^{33}$, $A^{34}$, $A^{35}$, and $A^{36}$ are present, these may be the same as or different from each other, $L^{31}$ represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which an arbitrary hydrogen atom in the alkyl group may be substituted with a fluorine atom and one —CH$_2$— or two or more non-adjacent —CH$_2$—'s may be independently substituted with —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, or $L^{31}$ may represent a group represented by $P^{L3}$-(Sp$^{L31}$-X$^{L3}$)$_{kL31}$—, in which $P^{L31}$ represents a polymerizable group and a preferable polymerizable group is the same as the case of $P^0$, $Sp^{L31}$ represents a spacer group or a single bond and a preferred spacer group therefor is the same as the case of $Sp^0$, and in the case where a plurality of $Sp^{L31}$'s are present, these may be the same as or different from each other, $X^{L31}$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, —C≡C—, or a single bond, and in the case where a plurality of $X^{L31}$'s are present, these are the same as or different from each other, with the proviso that $P^{L31}$-(Sp$^{L31}$-X$^{L31}$)$_{kL31}$— does not contain an —O—O— bond, kL31 represents an integer of 0 to 10 and in the case where a plurality of $L^{31}$'s are present in the compound, these may be the same as or different from each other, $Z^{31}$, $Z^{32}$, $Z^{33}$, $Z^{34}$, $Z^{35}$, and $Z^{36}$ each independently represent a group represented by —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_1$CH$_2$—OCO—, —COO—CH$_2$—, —OCO—CH$_2$—, —CH$_2$—COO—, —CH$_2$—OCO—, —CH=CH—, —N=N—, —CH=N—, —N=CH—, —CH=N—N=CH—, —CF=CF—, —C≡C—, or a single bond, and in the case where a plurality of $Z^{31}$, $Z^{32}$, $Z^{33}$, $Z^{34}$, $Z^{35}$, and $Z^{36}$ are present, these may be the same as or different from each other, and m31, m32, m33, m34, m35, and m36 each independently represent an integer of 0 to 6.

As more specific examples of the chiral compound, compounds represented by Formulas (X-31-1) to (X-34-6) are more preferable.

[Chem. 104]

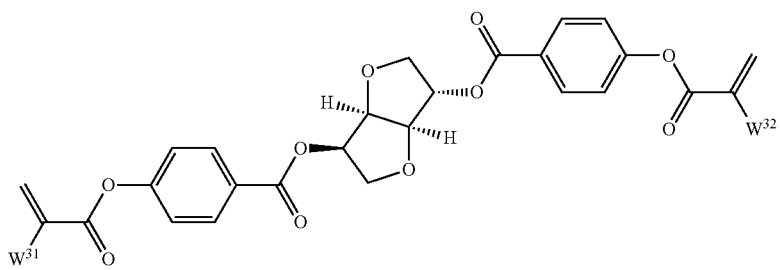

(X-31-1)

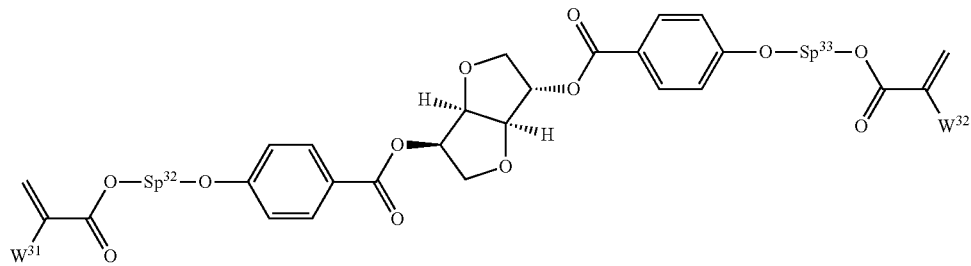
(X-31-2)
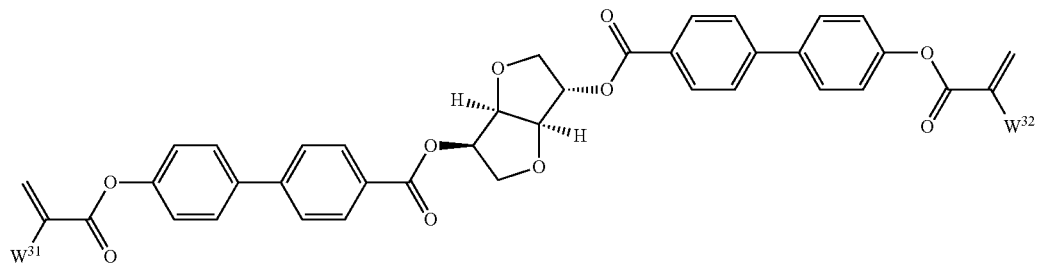
(X-31-3)
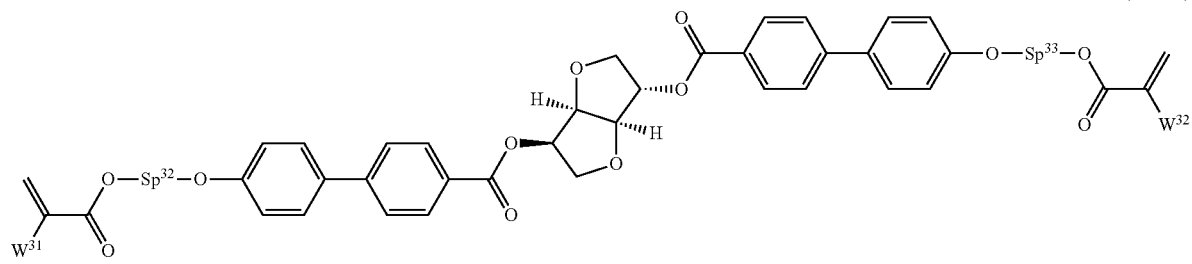
(X-31-4)
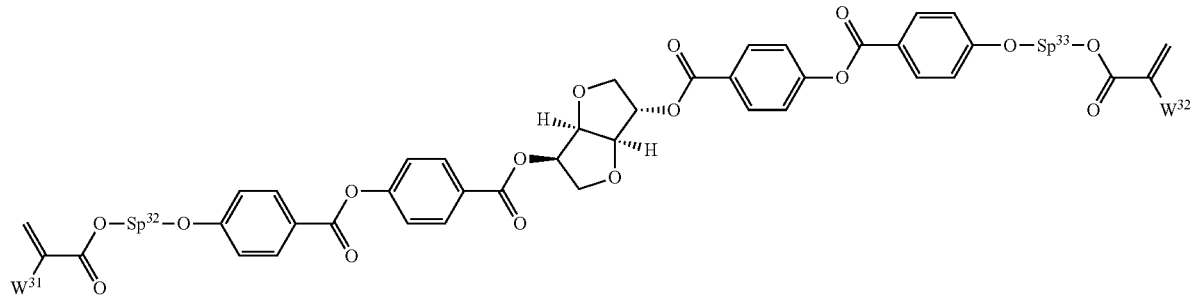
(X-31-5)
[Chem. 105]
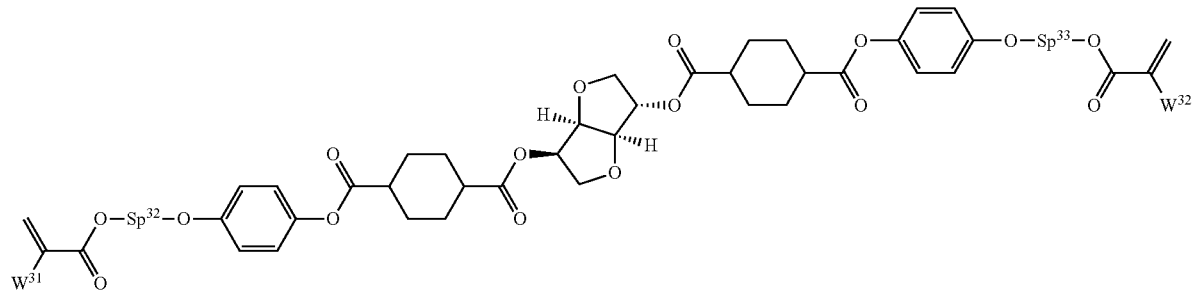
(X-31-6)

-continued
(X-31-7)
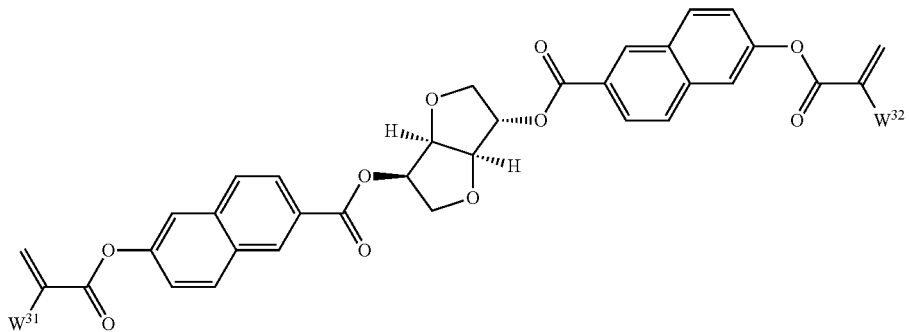
(X-31-8)
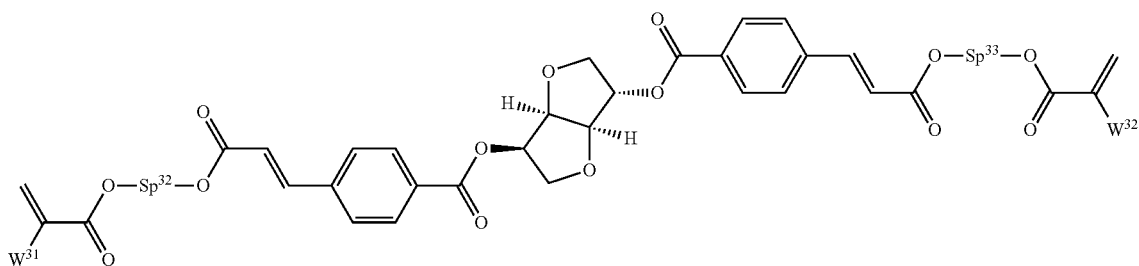
(X-31-9)
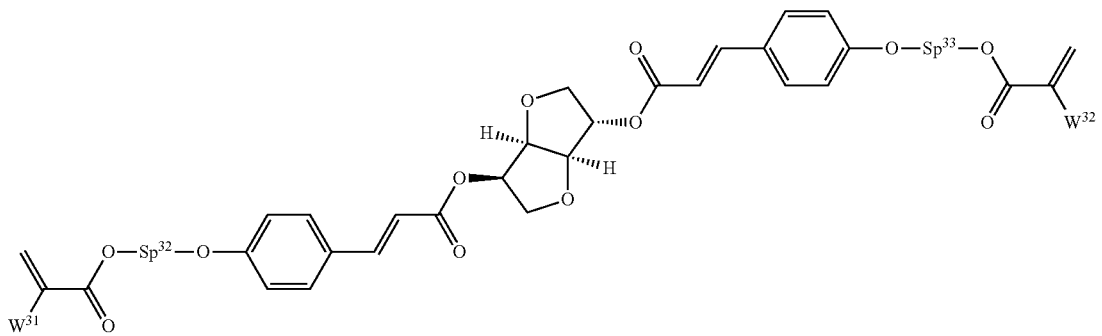
(X-31-10)
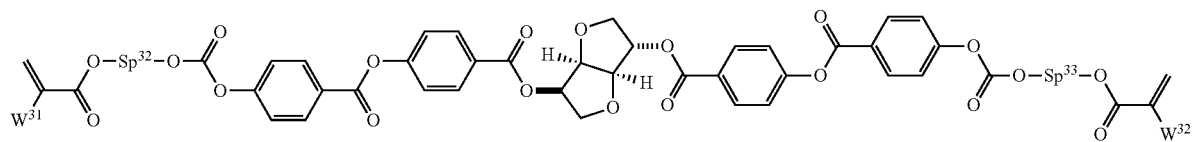
[Chem. 106]
(X-32-1)
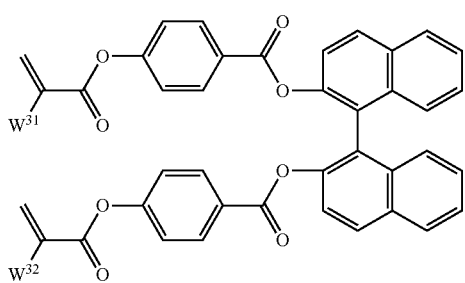
(X-32-2)
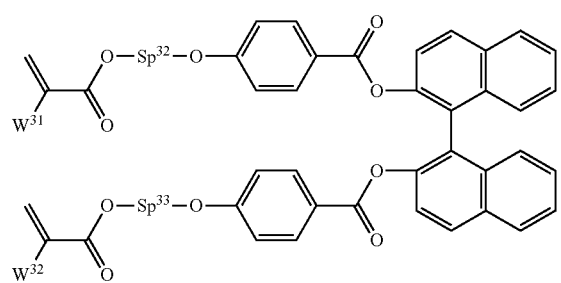

-continued
(X-32-3)
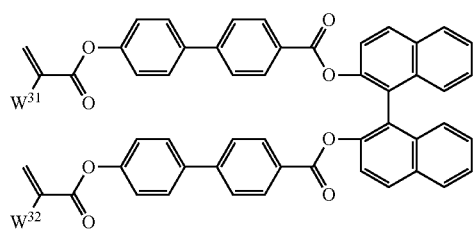
(X-32-4)
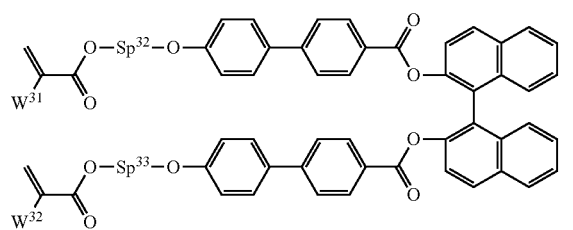
(X-32-5)
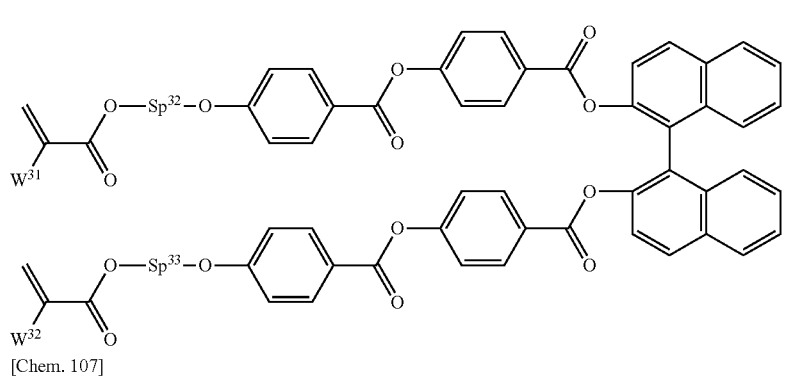
[Chem. 107]
(X-32-6)
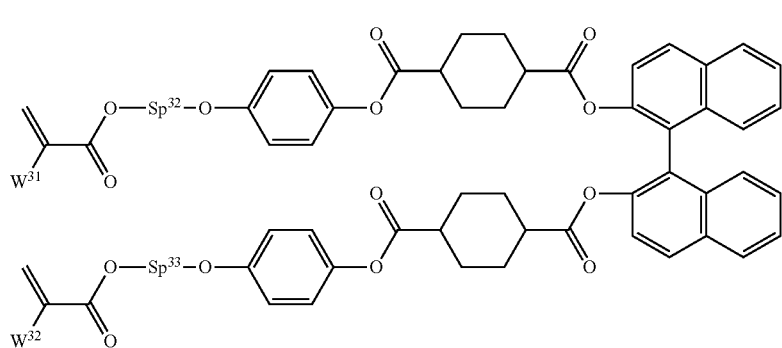
(X-32-7)
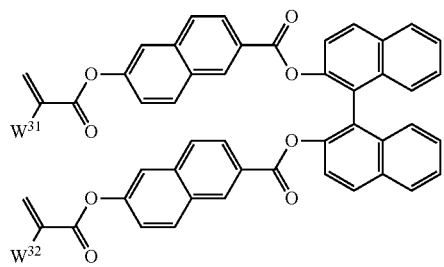
(X-33-1)
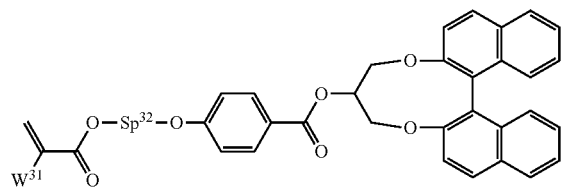
(X-33-2)
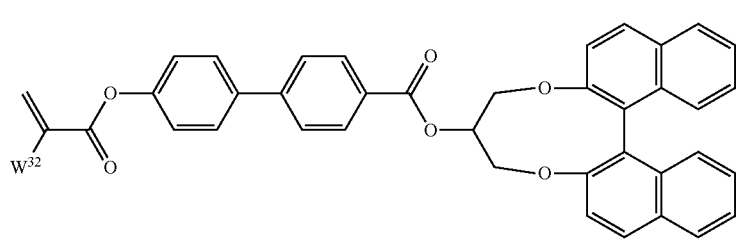

-continued
(X-33-3)
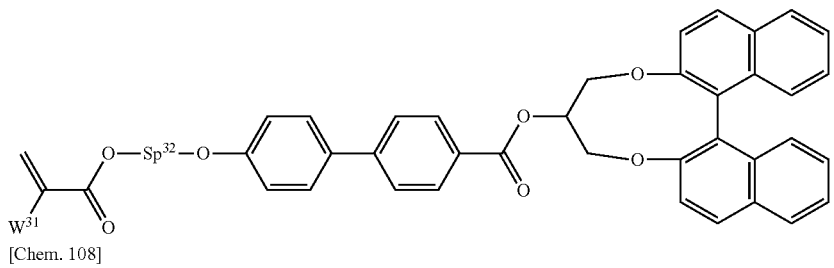
[Chem. 108]
(X-34-1)
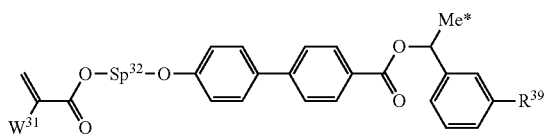
(X-34-2)
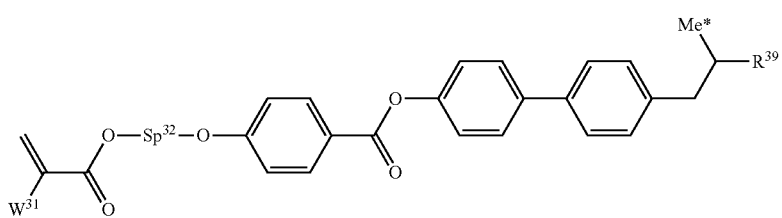
(X-34-3)
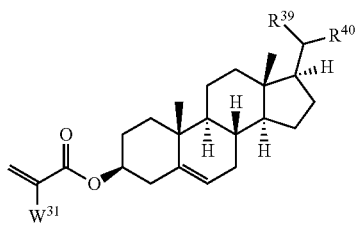
(X-34-4)
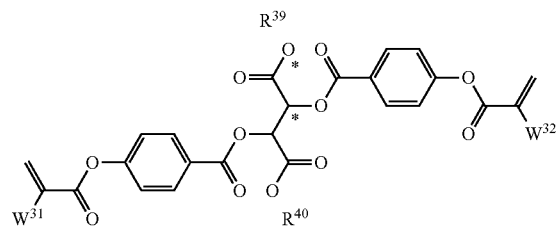
(X-34-5)
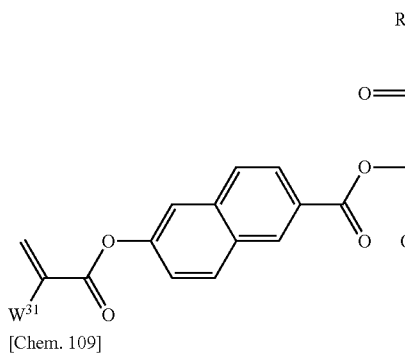
[Chem. 109]
(X-34-6)
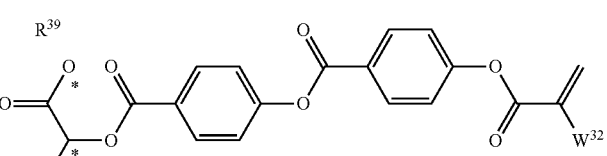
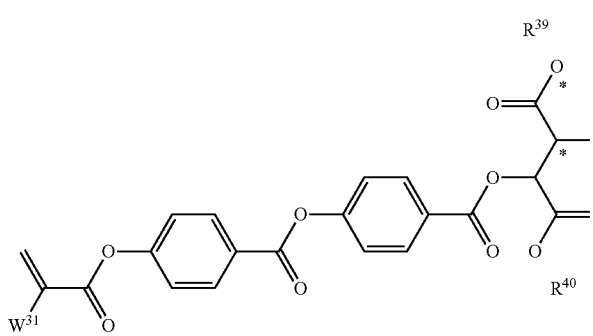

(In the formulas, $W^{31}$ and $W^{32}$ each independently represent a hydrogen atom, a fluorine atom, a methyl group, or a trifluoromethyl group, $Sp^{32}$ and $Sp^{33}$ each independently represent an alkylene group having 2 to 18 carbon atoms, and $R^{39}$ and $R^{40}$ each represent a hydrogen atom, an alkyl group having 1 to 10 carbon atoms, or an alkoxy group having 1 to 10 carbon atoms.)

(Organic Solvent)

An organic solvent may be added to the composition of the present invention. The organic solvent to be used is not particularly limited, but an organic solvent by which the polymerizable compound exhibits good solubility is preferable, and an organic solvent which can be dried at a temperature of 100° C. or lower is preferable. Examples of such solvents include aromatic hydrocarbons such as toluene, xylene, cumene, mesitylene, and chlorobenzene, ester solvents such as methyl acetate, ethyl acetate, propyl acetate, and butyl acetate, ketone solvents such as methyl ethyl ketone, methyl isobutyl ketone, cyclohexanone, and cyclopentanone, ether solvents such as tetrahydrofuran, 1,2-dimethoxyethane, and anisole, amide solvents such as N,N-dimethylformamide and N-methyl-2-pyrrolidone, halogenated solvents such as chloroform, dichloromethane, and 1,2-dichloroethane, propylene glycol monomethyl ether acetate, diethylene glycol monomethyl ether acetate, γ-butyrolactone, and the like. These can be used alone or in combination of two or more kinds thereof, but it is preferable to use one or more of a ketone solvent, an ether solvent, an ester solvent, an aromatic hydrocarbon solvent, and a halogen solvent.

The composition used in the present invention can be applied to the substrate if the composition is used as a solution of an organic solvent. A ratio of the organic solvent used is not particularly limited as long as an applied state is not significantly damaged thereby. The total content of the organic solvent contained in the composition solution is preferably 1% to 60% by mass, more preferably 3% to 55% by mass, and still more preferably 5% to 50% by mass.

In the case where the composition is dissolved in the organic solvent, it is preferable to perform heating and stirring in order to dissolve the composition uniformly. A heating temperature at the time of heating and stirring may be appropriately adjusted in consideration of the solubility of the composition in the organic solvent. From the viewpoint of productivity, the temperature is preferably 15° C. to 110° C., more preferably 15° C. to 105° C., still more preferably 15° C. to 100° C., and particularly preferably 20° C. to 90° C.

In the case where a solvent is added, it is preferable to perform stirring and mixing by a dispersion stirrer. As specific examples of the dispersion stirrer, a disperser having DISPAR, a propeller, a stirring blade such as a turbine blade, or the like, a paint shaker, a planetary stirrer, a shaking apparatus, a shaker, a rotary evaporator, a stirrer, or the like can be used. Other ultrasonic irradiation apparatuses can be used.

It is preferable that a stirring rotational speed at the time of adding the solvent is appropriately adjusted by the stirrer to be used. In order to obtain a uniform solution of the polymerizable composition, the stirring rotational speed is preferably 10 rpm to 1000 rpm, more preferably 50 rpm to 800 rpm, and particularly preferably 150 rpm to 600 rpm.

(Polymerization Inhibitor)

It is preferable to add a polymerization inhibitor to the polymerizable composition in the present invention. Examples of the polymerization inhibitor include a phenolic compound, a quinone compound, an amine compound, a thioether compound, a nitroso compound, and the like.

Examples of the phenolic compound include p-methoxyphenol, cresol, tert-butylcatechol, 3,5-di-tert-butyl-4-hydroxytoluene, 2,2'-methylenebis(4-methyl-6-tert-butylphenol), 2,2'-methylenebis(4-ethyl-6-tert-butylphenol), 4,4'-thiobis(3-methyl-6-tert-butylphenol), 4-methoxy-1-naphthol, 4,4'-dialkoxy-2,2'-bi-1-naphthol, and the like.

Examples of the quinone compound include hydroquinone, methylhydroquinone, tert-butylhydroquinone, p-benzoquinone, methyl-p-benzoquinone, tert-butyl-p-benzoquinone, 2,5-diphenylbenzoquinone, 2-hydroxy-1,4-naphthoquinone, 1,4-naphthoquinone, 2,3-dichloro-1,4-naphthoquinone, anthraquinone, diphenoquinone, and the like.

Examples of the amine compound include p-phenylenediamine, 4-aminodiphenylamine, N,N'-diphenyl-p-phenylenediamine, N-isopropyl-N'-phenyl-p-phenylenediamine, N-(1,3-dimethylbutyl)-N'-phenyl-p-phenylenediamine, N,N'-di-2-naphthyl-p-phenylenediamine, diphenylamine, N-phenyl-β-naphthylamine, 4,4'-dicumyl-diphenylamine, 4,4'-dioctyldiphenylamine, and the like.

Examples of the thioether compound include phenothiazine, distearyl thiodipropionate, and the like.

Examples of the nitroso compound include N-nitrosodiphenylamine, N-nitrosophenylnaphthylamine, N-nitrosodinaphthylamine, p-nitrosophenol, nitrosobenzene, p-nitrosodiphenylamine, α-nitroso-β-naphthol, and the like, N,N-dimethyl-p-nitrosoaniline, p-nitrosodiphenylamine, N,N-diethyl-p-nitrosoaniline, N-nitrosoethanolamine, N-nitrosodibutylamine, N-nitroso-N-butyl-4-butanolamine, 1,1'-nitrosoiminobis(2-propanol), N-nitroso-N-ethyl-4-butanolamine, 5-nitroso-8-hydroxyquinoline, N-nitrosomorpholine, N-nitroso-N-phenylhydroxylamine ammonium salt, nitrosobenzene, 2,4,6-tri-tert-butylnitrosobenzene, N-nitroso-N-methyl-p-toluenesulfonamide, N-nitroso-N-ethylurethane, N-nitroso-N-propylurethane, 1-nitroso-2-naphthol, 2-nitroso-1-naphthol, 1-nitroso-2-naphthol-3,6-sodium sulfonate, 2-nitroso-1-naphthol-4-sodium sulfonate, 2-nitroso-5-methylaminophenol hydrochloride, 2-nitroso-5-methylaminophenol hydrochloride, and the like.

An amount of the polymerization inhibitor added is preferably from 0.01% to 1.0% by mass, and more preferably from 0.05% to 0.5% by mass with respect to the polymerizable composition.

(Antioxidant)

In order to enhance the stability of the polymerizable composition in the present invention, it is preferable to add an antioxidant or the like. Examples of such compound include hydroquinone derivatives, nitrosamine-based polymerization inhibitors, hindered phenol-based antioxidants, hindered amine-based antioxidants, and the like. More specific examples thereof include tert-butyl hydroquinone, methyl hydroquinone, "Q-1300" and "Q-1301" manufactured by Wako Pure Chemical Industries, Ltd., "IRGANOX1010", "IRGANOX1035", "IRGANOX1076", "IRGANOX1098", "IRGANOX1135", "IRGANOX1330", "IRGANOX1425", "IRGANOX1520", "IRGANOX1726", "IRGANOX245", "IRGANOX259", "IRGANOX3114", "IRGANOX3790", "IRGANOX5057", "IRGANOX565", "TINUVIN PA144", "TINUVIN765", and "TINUVIN770DF" manufactured by BASF SE.

An amount of the antioxidant added is preferably 0.01% to 2.0% by mass and more preferably from 0.05% to 1.0% by mass with respect to the polymerizable composition.

(Photopolymerization Initiator)

The polymerizable composition in the present invention preferably contains a photopolymerization initiator. It is preferable that at least one photopolymerization initiator is contained. Specific examples thereof include "IRGACURE 651", "IRGACURE 184", "IRGACURE 907", "IRGACURE 127", "IRGACURE 369", "IRGACURE 379", "IRGACURE 819", "IRGACURE 2959", "IRGACURE 1800", "IRGACURE 250", "IRGACURE 754", "IRGACURE 784", "IRGACURE OXE01", "IRGACURE OXE02", "LUCIRIN TPO", "DAROCUR 1173", AND "DAROCUR MBF" manufactured by BASF SE, "ESACURE 1001M", "ESCACURE KIP150", "SPEEDCURE BEM", "SPEEDCURE BMS", "SPEEDCURE MBP", "SPEEDCURE PBZ", "SPEEDCURE ITX", "SPEEDCURE DETX", "SPEEDCURE EBD", "SPEEDCURE MBB", and "SPEEDCURE BP" manufactured by Lambson Limited, "Kayacure DMBI" manufactured by Nippon Kayaku Co., Ltd., "TAZ-A" manufactured by Nihon Siber-Hegner K.K. (currently DKSH), "ADEKA OPTOMER SP-152", "ADEKA OPTOMER SP-170", "ADEKA OPTOMER N-1414", "ADEKA OPTOMER N-1606", "ADEKA OPTOMER N-1717", and "ADEKA OPTOMER N-1919", manufactured by ADEKA CORPORATION, and the like.

An amount of the photopolymerization initiator used is preferably 0.1% to 10% by mass and particularly preferably 0.5% to 7% by mass with respect to the polymerizable composition. These can be used alone or in combination of two or more kinds thereof. Sensitizers and the like may be added.

(Thermal Polymerization Initiator)

For the polymerizable composition of the present invention, a thermal polymerization initiator may be used together with the photopolymerization initiator. Specific examples thereof include "V-40" and "VF-096" manufactured by Wako Pure Chemical Industries, Ltd., "PERHEXYL D" and "PERHEXYL I" manufactured by NOF CORPORATION, and the like.

An amount of the thermal polymerization initiator used is preferably 0.1% to 10% by mass and particularly preferably 0.5% to 5% by mass with respect to the polymerizable composition. These can be used alone or in combination of two or more kinds thereof.

(Surfactant)

The polymerizable composition in the present invention may contain at least one surfactant in order to reduce unevenness in film thickness in the case where the composition is an optically anisotropic body. Examples of the surfactant that can be contained include alkyl carboxylate, alkyl phosphate, alkyl sulfonate, fluoroalkyl carboxylate, fluoroalkyl phosphate, fluoroalkyl sulfonate, polyoxyethylene derivatives, fluoroalkyl ethylene oxide derivatives, polyethylene glycol derivatives, alkyl ammonium salts, fluoroalkyl ammonium salts, and the like. A fluorine-containing surfactant is particularly preferable.

Specific examples thereof include "MEGAFACE F-110", "MEGAFACE F-113", "MEGAFACE F-120", "MEGAFACE F-812", "MEGAFACE F-142D", "MEGAFACE F-144D", "MEGAFACE F-150", "MEGAFACE F-171", "MEGAFACE F-173", "MEGAFACE F-177", "MEGAFACE F-183", "MEGAFACE F-195", "MEGAFACE F-824", "MEGAFACE F-833", "MEGAFACE F-114", "MEGAFACE F-410", "MEGAFACE F-493", "MEGAFACE F-494", "MEGAFACE F-443", "MEGAFACE F-444", "MEGAFACE F-445", "MEGAFACE F-446", "MEGAFACE F-470", "MEGAFACE F-471", "MEGAFACE F-474", "MEGAFACE F-475", "MEGAFACE F-477", "MEGAFACE F-4783", "MEGAFACE F-479", "MEGAFACE F-480SF", "MEGAFACE F-482", "MEGAFACE F-483", "MEGAFACE F-484", "MEGAFACE F-486", "MEGAFACE F-487", "MEGAFACE F-489", "MEGAFACE F-172D", "MEGAFACE F-178K", "MEGAFACE F-178RM", "MEGAFACE R-08", "MEGAFACE R-30", "MEGAFACE F-472SF", "MEGAFACE BL-20", "MEGAFACE R-61", "MEGAFACE R-90", "MEGAFACE ESM-1", and "MEGAFACE MCF-350SF" (manufactured by DIC Corporation), "FTERGENT 100", "FTERGENT 100C", "FTERGENT 110", "FTERGENT 150", "FTERGENT 150CH", "FTERGENT A", "FTERGENT 100A-K", "FTERGENT 501", "FTERGENT 300", "FTERGENT 310", "FTERGENT 320", "FTERGENT 400SW", "FTX-400P", "FTERGENT 251", "FTERGENT 215W", "FTERGENT 212MH", "FTERGENT 250", "FTERGENT 222F", "FTERGENT 212D", "FTX-218", "FTX-209F", "FTX-213F", "FTX-233F", "FTERGENT 245F", "FTX-208G", "FTX-240G", "FTX-206D", "FTX-220D", "FTX-230D", "FTX-240D", "FTX-207S", "FTX-211S", "FTX-220S", "FTX-230S", "FTX-750FM", "FTX-730FM", "FTX-730FL", "FTX-710FS", "FTX-710FM", "FTX-710FL", "FTX-750LL", "FTX-730 LS", "FTX-730LM", "FTX-730LL", and "FTX-710LL" (manufactured by Neos Corporation), "BYK-300", "BYK-302", "BYK-306", "BYK-307", "BYK-310", "BYK-315", "BYK-320", "BYK-322", "BYK-323", "BYK-325", "BYK-330", "BYK-331", "BYK-333", "BYK-337", "BYK-340", "BYK-344", "BYK-370", "BYK-375", "BYK-377", "BYK-350", "BYK-352", "BYK-354", "BYK-355", "BYK-356", "BYK-358N", "BYK-361N", "BYK-357", "BYK-390", "BYK-392", "BYK-UV3500", "BYK-UV3510", "BYK-UV3570", and "BYK-SILCLEAN 3700" (manufactured by BYK Additives & Instruments), "TEGO RAD 2100", "TEGO RAD 2200N", "TEGO RAD 2250", "TEGO RAD 2300", "TEGO RAD 2500", "TEGO RAD 2600", and "TEGO RAD 2700" (manufactured by Evonik Industries), and the like.

An amount of the surfactant added is preferably 0.01% to 2% by mass and more preferably 0.05% to 0.5% by mass with respect to the polymerizable composition.

In the case where the polymerizable composition of the present invention is used as an optically anisotropic body, a tilt angle of an air interface can be effectively decreased by using the above surfactant.

The polymerizable composition of the present invention has an effect of effectively decreasing the tilt angle of the air interface in the case where the composition is an optically anisotropic body. Examples thereof other than the above surfactant include a compound having a repeating unit represented by General Formula (X-41) and having a weight average molecular weight of 100 or higher.

[Chem. 110]

$$\text{---}(CR^{41}R^{42}\text{---}CR^{43}R^{44})\text{---} \qquad (X\text{-}41)$$

(In the formulas, $R^{41}$, $R^{42}$, $R^{43}$, and $R^{44}$ each independently represent a hydrogen atom, a fluorine atom, a chlorine atom, or a linear alkyl group or a branched alkyl group having 1 to 20 carbon atoms, and an arbitrary hydrogen atom in the alkyl group may be substituted with a fluorine atom.)

Preferable examples of the compound represented by General Formula (X-41) include polyethylene, polypropylene, polyisobutylene, paraffin, liquid paraffin, chlorinated polypropylene, chlorinated paraffin, chlorinated liquid paraffin, and the like.

The compound represented by General Formula (X-41) is preferably added in a step of mixing a polymerizable compound to an organic solvent, followed by heating and stirring so as to prepare a polymerizable solution, but the compound may be added in the subsequent step of mixing the polymerization initiator to the polymerizable solution, or may be added in both steps.

An amount of the compound added represented by General Formula (X-41) is preferably 0.01% to 1% by mass and more preferably 0.05% to 0.5% by mass with respect to the polymerizable composition solution.

It is preferable that a chain transfer agent is added to the polymerizable composition solution in the present invention in order to further improve adhesiveness to the substrate in the case where the composition is an optically anisotropic body. As the chain transfer agent, a thiol compound is preferable, a monothiol compound, a dithiol compound, a trithiol compound, and a tetrathiol compound are more preferable, and a trithiol compound is still more preferable. Specifically, compounds represented by Formulas (X-51-1) to (X-51-12) are more preferable.

[Chem. 111]

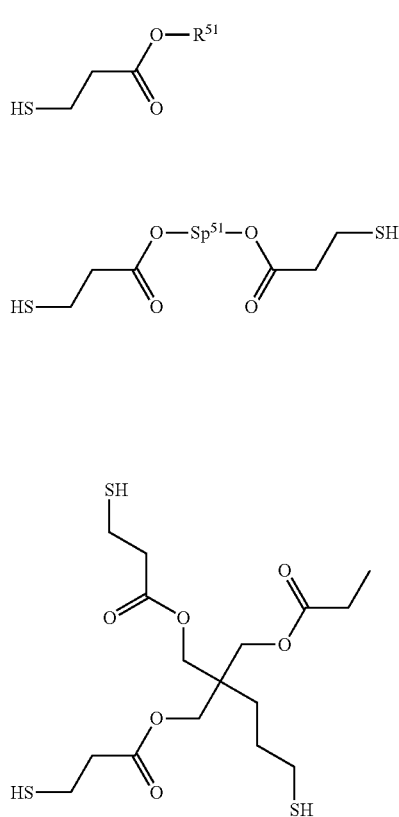

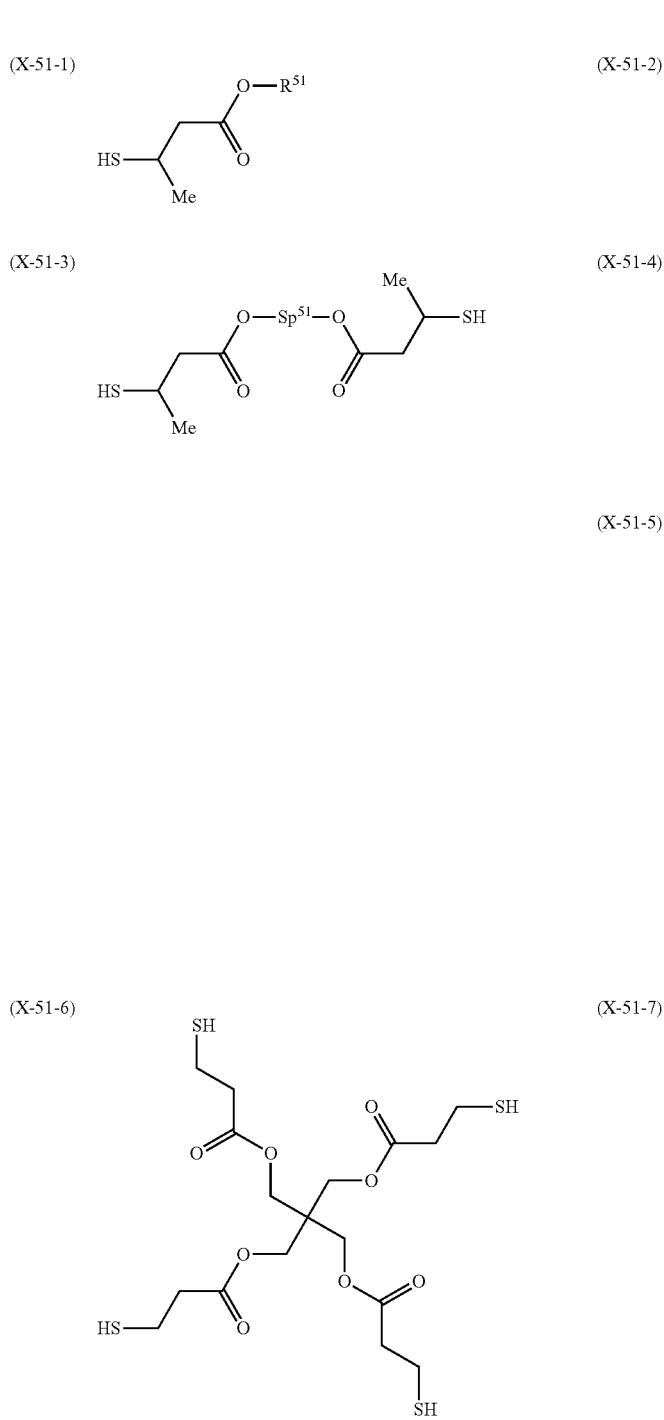

[Chem. 112]

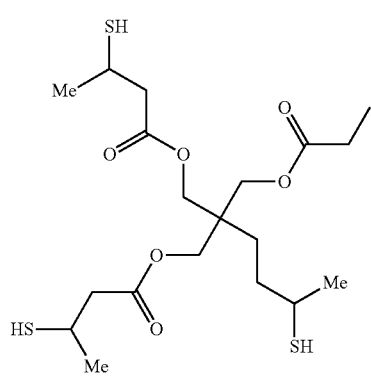

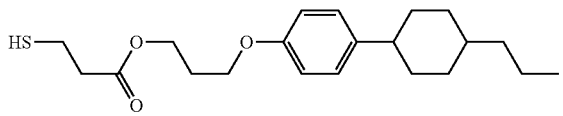
(X-51-8)

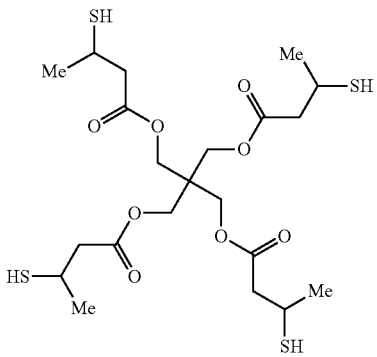

(X-51-9)

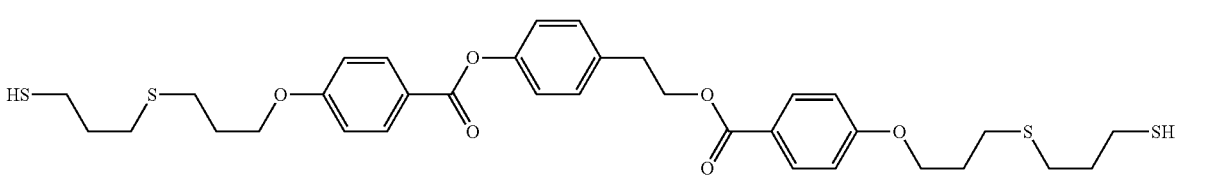

(X-51-10)

[Chem. 113]

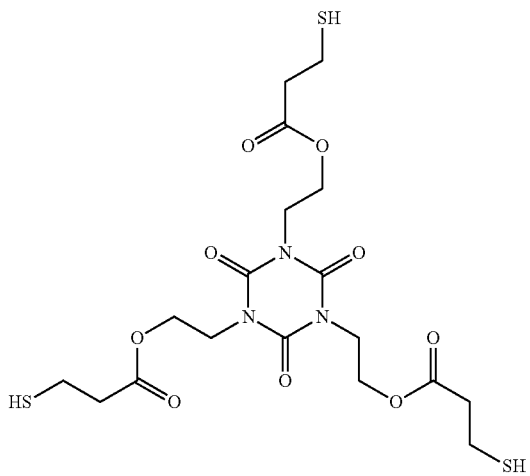

(X-51-11)

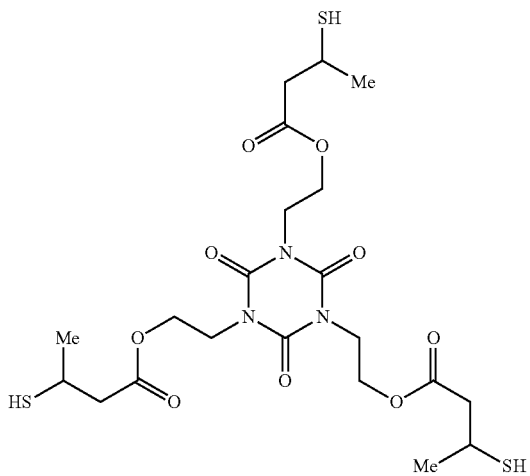

(X-51-12)

(In the formulas, $R^{S1}$ each independently represent a linear alkyl group or a branched alkyl group having 1 to 20 carbon atoms in which one —$CH_2$— or two or more non-adjacent —$CH_2$—'s may be independently substituted with —O—, —S—, —CO—, —COO—, —OCO—, or —CH=CH—, and $Sp^{51}$ each independently represent a linear alkylene group or a branched alkylene group having 2 to 20 carbon atoms in which one —$CH_2$— or two or more non-'s —$CH_2$— may be independently substituted with —O—, —S—, —CO—, —COO—, —OCO—, or —CH=CH—.)

The chain transfer agent is preferably added in a step of mixing the polymerizable liquid crystal compound to an organic solvent, followed by heating and stirring so as to prepare a polymerizable solution, but the agent may be added in the subsequent step of mixing the polymerization initiator to the polymerizable solution, or may be added in both steps.

An amount of the chain transfer agent added is preferably 0.5% to 10% by mass and more preferably 1.0% to 5.0% by mass with respect to the polymerizable composition.

For adjusting physical properties, it is also possible to add a liquid crystal compound which is not polymerizable, or a polymerizable compound which is non-liquid crystalline, and the like, as required. The polymerizable compound which is non-liquid crystalline is preferably added in a step of mixing a polymerizable compound to an organic solvent, followed by heating and stirring so as to prepare a polymerizable solution, but a liquid crystal compound or the like which is not polymerizable may be added in the subsequent step of mixing the polymerization initiator to the polymerizable solution, or may be added in both steps. An amount of these compounds added is preferably 20% by mass or lower, more preferably 10% by mass or lower, and still more preferably 5% by mass or lower with respect to the polymerizable composition.

To the polymerizable mixture or the polymerizable composition of the present invention, other additives such as thixo agents, ultraviolet absorbents, infrared absorbents, antioxidants, and surface treatment agents may be added to the extent that the alignment ability of the liquid crystal is not significantly lowered.

The total content of the mixture in the polymerizable composition is preferably 5.0% by mass or higher, more preferably 10.0% by mass or higher, and still more preferably 15.0% by mass or higher, or preferably 90.0% by mass or lower and more preferably 85.0% by mass or lower with respect to the total content of the polymerizable composition.

(Method for Producing Composition Satisfying Formula (2))

In order to obtain a polymerizable composition satisfying Formula (2), for example, there is a method in which a degree of purification of one or two or more compounds having a mesogenic group contained in the polymerizable composition is appropriately adjusted, and therefore a polymerizable composition satisfying Formula 2 is obtained. The degree of purification of one or two or more compounds having a mesogenic group can be adjusted by performing purification in a step of synthesizing a compound containing a mesogenic group as required. Purification can be appropriately carried out in each step of synthesis, and examples of purification methods include chromatography, recrystallization, distillation, sublimation, reprecipitation, adsorption, liquid separation treatment, and the like. In the case of using a purification agent, examples of the purification agent include silica gel, alumina, activated carbon, activated clay, celite, zeolite, mesoporous silica, carbon nanotube, carbon nanohorn, binchotan, charcoal, graphene, ion exchange resin, acid clay, silicon dioxide, diatomaceous earth, pearlite, cellulose, an organic polymer, a porous gel, and the like.

The polymerizable composition is a composition which contains a compound having two or more mesogenic groups or contains a compound having one mesogenic group, but in the case where the polymerizable composition contains compounds having different yellowness indexes, a value of the yellowness index (YI) of each compound itself and a value of the refractive index anisotropy (Δn) are not particularly limited. In the case where a composition is used, a material obtained by combining all of the compounds having a mesogenic group in the composition may be a material satisfying Formula (2).

(Method for Producing Optically Anisotropic Body)
(Optically Anisotropic Body)

The optically anisotropic body prepared by using the polymerizable composition of the present invention is a body to which a substrate, an alignment film if necessary, and a polymer of a polymerizable composition are laminated in order.

The substrate used for the optically anisotropic body of the present invention is a substrate generally used for a liquid crystal device, a display, an optical component, and an optical film, and is not particularly limited as long as a material thereof is a material having heat resistance capable of withstanding heating during drying after application of the polymerizable composition of the present invention. Examples of such a substrate include an organic material such as a glass substrate, a metal substrate, a ceramic substrate, and a plastic substrate. In particular, in the case where the substrate is an organic material, examples thereof include cellulose derivatives, polyolefins, polyesters, polyolefins, polycarbonates, polyacrylates, polyarylates, polyethersulfones, polyimides, polyphenylene sulfides, polyphenylene ethers, nylons, polystyrenes, and the like. Among these, plastic substrates such as polyesters, polystyrenes, polyolefins, cellulose derivatives, polyarylates, and polycarbonates are preferable.

For improving applying properties and adhesiveness of the polymerizable composition of the present invention, a surface treatment of these substrates may be carried out. Examples of the surface treatment include ozone treatment, plasma treatment, corona treatment, silane coupling treatment, and the like. In order to adjust the transmittance and the reflectance of light, an organic thin film, an inorganic oxide thin film, a metal thin film, or the like is provided on the surface of the substrate by a method such as vapor deposition. Alternatively, in order to give optical added value, the substrate may be a pickup lens, a rod lens, an optical disc, a phase difference film, a light diffusing film, a color filter, or the like. Among these, a pickup lens, a phase difference film, a light diffusing film, and a color filter which have higher added value are preferable.

The substrate may be subjected to a general alignment treatment or may be provided with an alignment film so that the polymerizable composition is aligned in the case where the polymerizable composition of the present invention is applied and dried. Examples of the alignment treatment include stretching treatment, rubbing treatment, polarization ultraviolet visible light irradiation treatment, ion beam processing, and the like. In the case of using an alignment film, a conventionally known alignment film may be used. Examples of such an alignment film include a compound such as polyimide, polysiloxane, polyamide, polyvinyl alcohol, polycarbonate, polystyrene, polyphenylene ether, polyarylate, polyethylene terephthalate, polyethersulfone, epoxy resin, epoxy acrylate resin, acrylic resin, a coumarin compound, a chalcone compound, a cinnamate compound, a fulgide compound, an anthraquinone compound, an azo compound, and an aryl ethene compounds. The compound subjected to the alignment treatment by rubbing is preferably a compound by which the crystallization of the material is promoted by adding a heating step during the alignment treatment or after the alignment treatment. Among the compounds subjected to the alignment treatment other than rubbing, it is preferable to use photoalignment materials.

(Applying)

As the method of obtaining an optically anisotropic body of the present invention, known conventional methods such as an applicator method, a bar coating method, a spin coating method, a roll coating method, a direct gravure coating method, a reverse gravure coating method, a flexo coating method, an inkjet method, a die coating method, a cap coating method, a dip coating method, a slit coating method, and the like may be performed. The polymerizable composition may be dried after applying.

(Polymerization Step)

The polymerization operation of the polymerizable composition of the present invention is generally carried out by irradiation with light such as ultraviolet rays or heating in a state where the liquid crystal compound of the polymerizable composition is horizontally aligned, vertically aligned, hybrid aligned, or cholesteric aligned (planar aligned) to the substrate. In the case where the polymerization is carried out by light irradiation, specifically to irradiate with an ultraviolet light having a wavelength of 390 nm or lower is preferable and to irradiate with an ultraviolet light having a wavelength of 250 to 370 nm is most preferable. However, in the case where the polymerizable composition is decomposed by the ultraviolet light of 390 nm or lower, it may be preferable to carry out polymerization treatment with ultraviolet light of 390 nm or higher. It is preferable that this light is a diffused light and is an unpolarized light.

(Polymerization Method)

As a method of polymerizing a polymerizable composition of the present invention, a method of irradiating with an active energy ray, a thermal polymerization, or the like are exemplified, but the method of irradiating with the active energy ray is preferable since the reaction proceeds at room temperature without heating, and among them, the method of irradiating with light such as ultraviolet rays is preferable since the operation is simple. The temperature during irradiation is a temperature at which the polymerizable composition of the present invention may maintain liquid crystal phases and is preferably 30° C. or lower, if possible, in order to avoid the induction of the thermal polymerization of the polymerizable composition. In addition, during a temperature elevating step, the liquid crystal composition usually shows a liquid crystal phase within a range from an N-I transition temperature to C (solid phase)–N (nematic) transition temperature (hereinafter, abbreviated as C—N transition temperature.). On the other hand, the liquid crystal composition is in a thermodynamically non-equilibrium state, and thus the liquid crystal state may be maintained without solidification even at C-N transition temperature or lower during a temperature lowering step. This state is referred to as a supercooled state. In the present invention, a liquid crystal composition that is in the supercooled state also maintains the liquid crystal phase. Specifically, to irradiate with the ultraviolet light having a wavelength of 390 nm or lower is preferable, and to irradiate with light having a wavelength of 250 to 370 nm is most preferable. However, in the case where the polymerizable composition is decomposed with the ultraviolet light of 390 nm or lower, it may be preferable to carry out polymerization treatment with ultraviolet light of 390 nm or higher. It is preferable that this light is a diffused light and is an unpolarized light. The intensity of the ultraviolet ray irradiation is preferably in a range of 0.05 kW/m² to 10 kW/m². In particular, a range of 0.2 kW/m² to 2 kW/m² is preferable. In the case where the intensity of the ultraviolet ray is less than 0.05 kW/m², it takes a lot of time to complete the polymerization. On the other hand, if the intensity is greater than 2 kW/m², the liquid crystal molecules of the polymerizable composition tend to be photo-decomposed, and a lot of polymerization heat is generated, the temperature during polymerization increases, and the order parameter of the polymerizable liquid crystal changes, and thus there is a possibility that the deviation of the phase difference of the film occurs after polymerization.

An optically anisotropic body having a plurality of regions having different alignment directions may be obtained by changing the alignment state of the unpolymerized part by applying the electric field, the magnetic field, the temperature, or the like and then polymerizing the unpolymerized part after only a specific part using mask is polymerized by the ultraviolet ray irradiation.

Further, an optically anisotropic body having a plurality of regions having different alignment directions may be obtained by regulating the alignment of the polymerizable composition of the unpolymerized state by previously applying the electric field, the magnetic field, the temperature, or the like to the composition and then polymerizing the unpolymerized part by irradiation with light from the mask while maintaining the state, when polymerizing only a specific part using mask by the ultraviolet ray irradiation.

The optically anisotropic body obtained by polymerizing the polymerizable composition of the present invention may be used alone as an optically anisotropic body which is peeled off from the substrate and may also be used as an optically anisotropic body as it is which is not peeled off from the substrate. In particular, since other members are hardly contaminated, it is useful in the case where the optically anisotropic body is used as a substrate to be layered or is used to be bonded to another substrate.

(Applications)

The polymer obtained by polymerizing the polymerizable composition of the application of the present invention in a state of being in a horizontal alignment, a vertical alignment, a hybrid alignment, or a cholesteric alignment, may be used as an optical compensation film, a phase difference film, a film with expanded viewing angle, a film with enhanced luminance, a reflective film, a polarizing film, and an optical information recording material as an optically anisotropic body having alignment properties. Further, the polymer may be used as an adhesive having heat dissipation properties, a sealant, a heat dissipation sheet, and inks for security printing.

EXAMPLES

Hereinafter, the present invention will be described with reference to synthesis examples, examples, and comparative examples, but the present invention is not limited thereto. Unless otherwise specified, "parts" and "%" are on a mass basis. As a raw material compound of a compound having a mesogenic group, compounds represented by Formulas (A-1) to (A-22), Formulas (B-1) to (B-8), and Formulas (C-1) to (C-3) were used.

[Chem. 114]

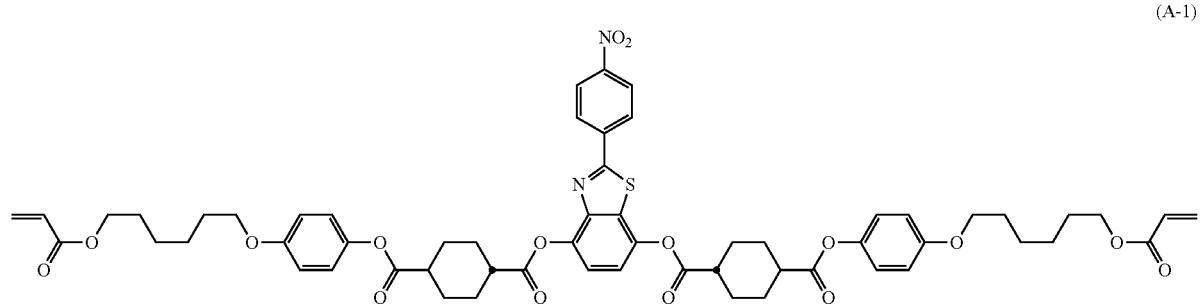

(A-1)

-continued
(A-2)
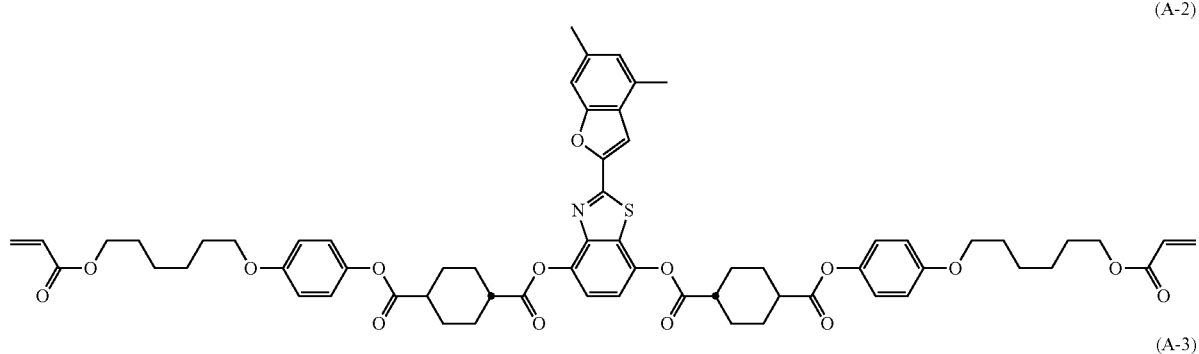
(A-3)
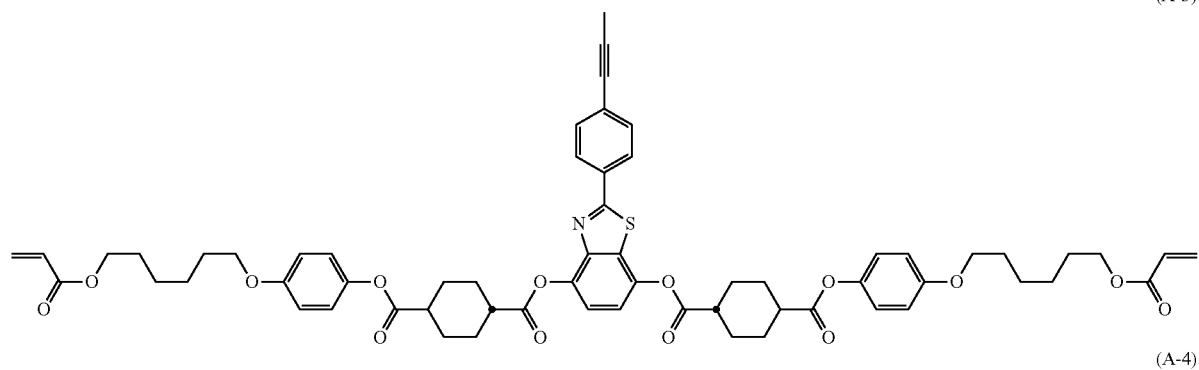
(A-4)
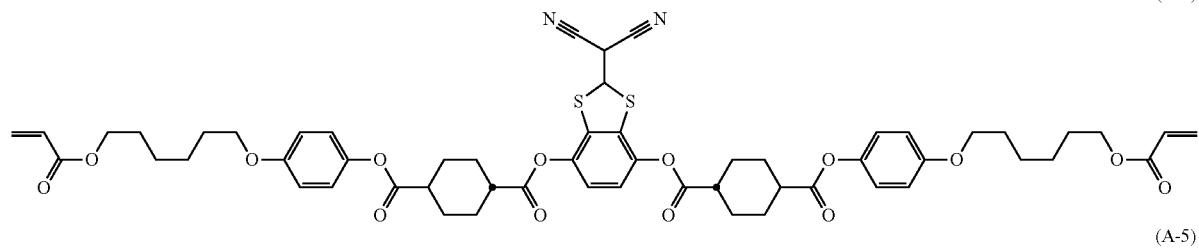
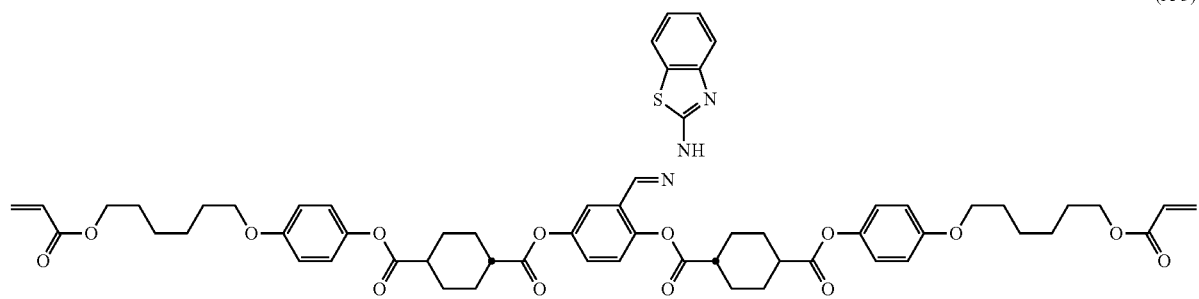
[Chem. 115]
(A-5)
(A-6)
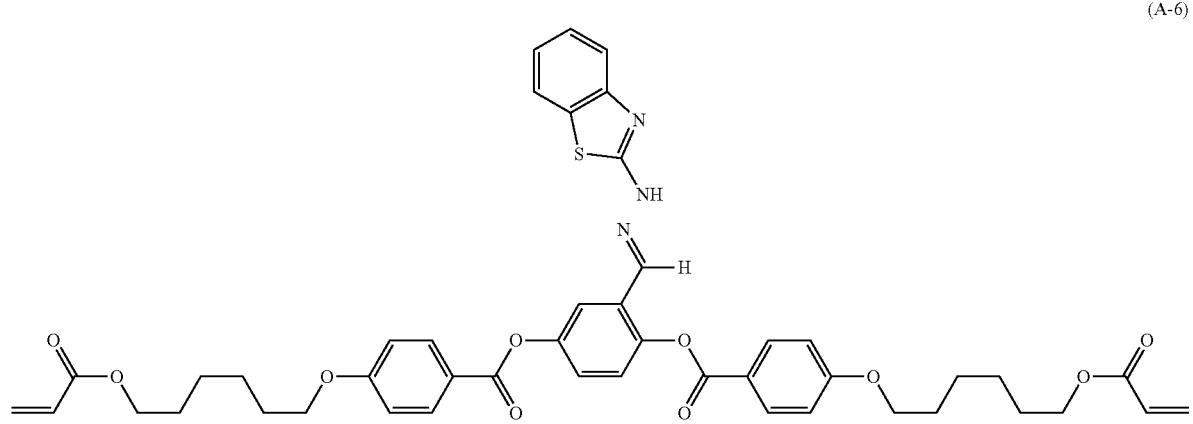

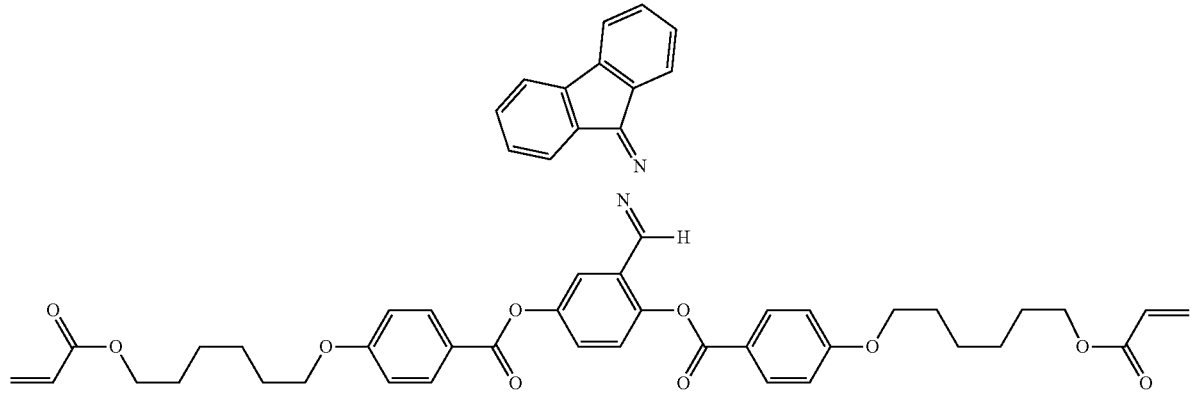
(A-7)
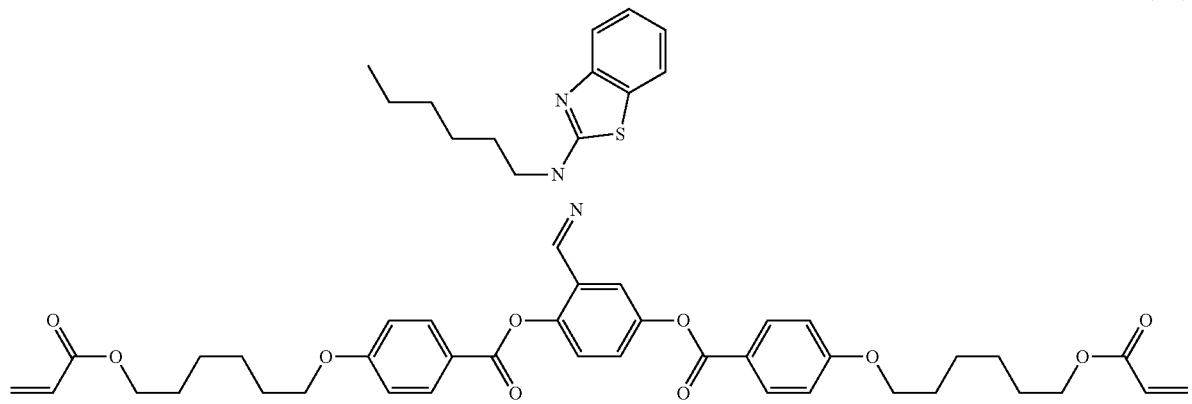
(A-8)
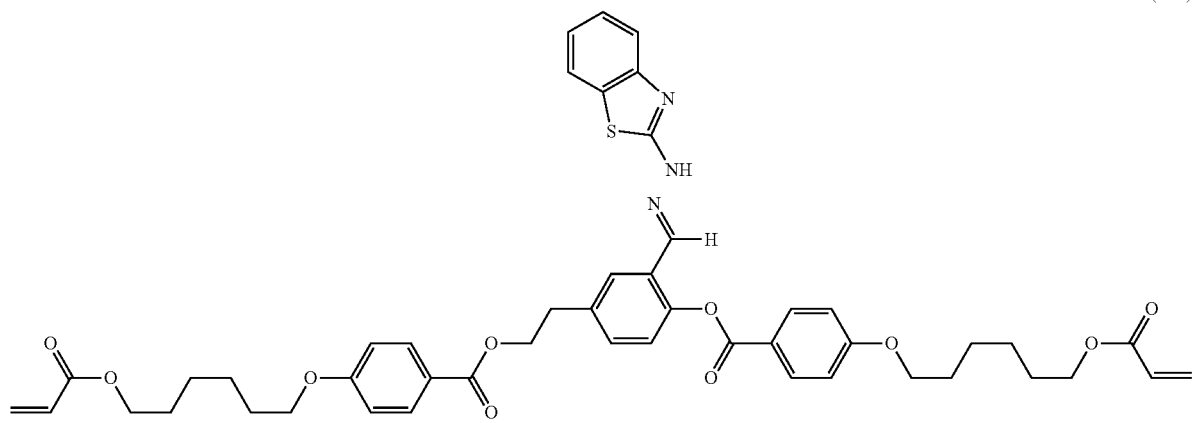
(A-9)

-continued
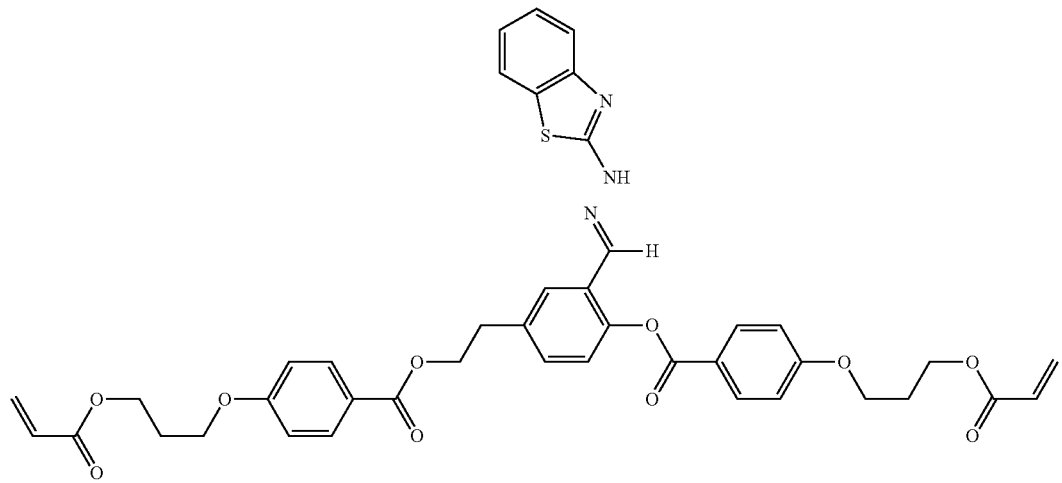
(A-10)
[Chem. 116]
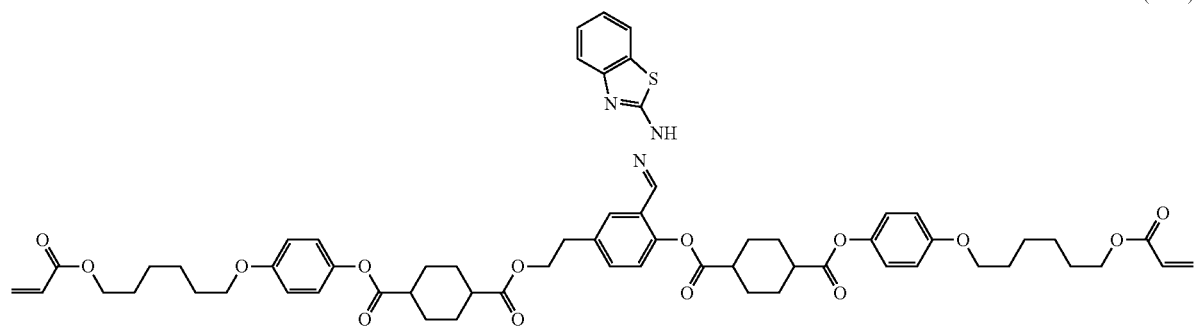
(A-11)
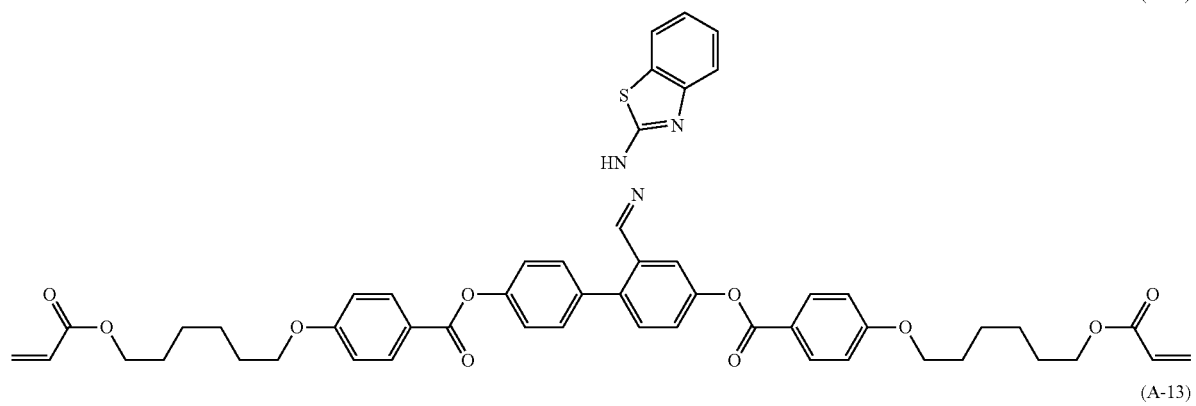
(A-12)
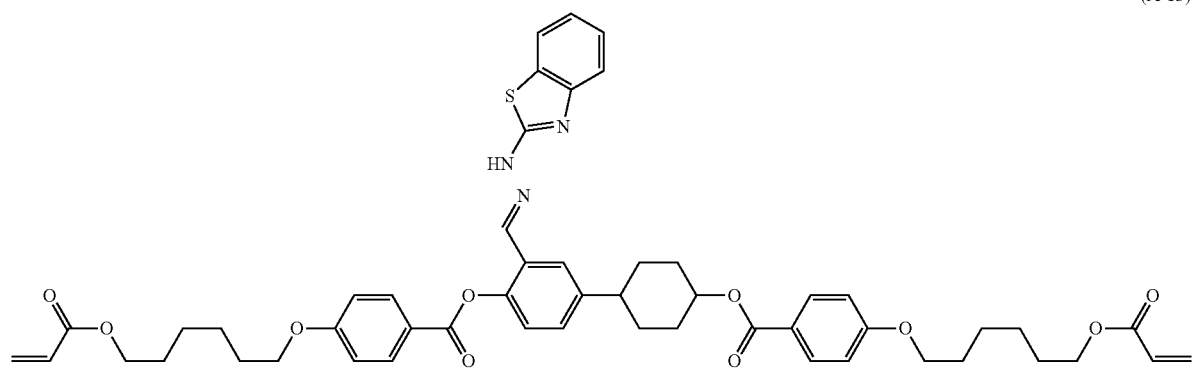
(A-13)

-continued
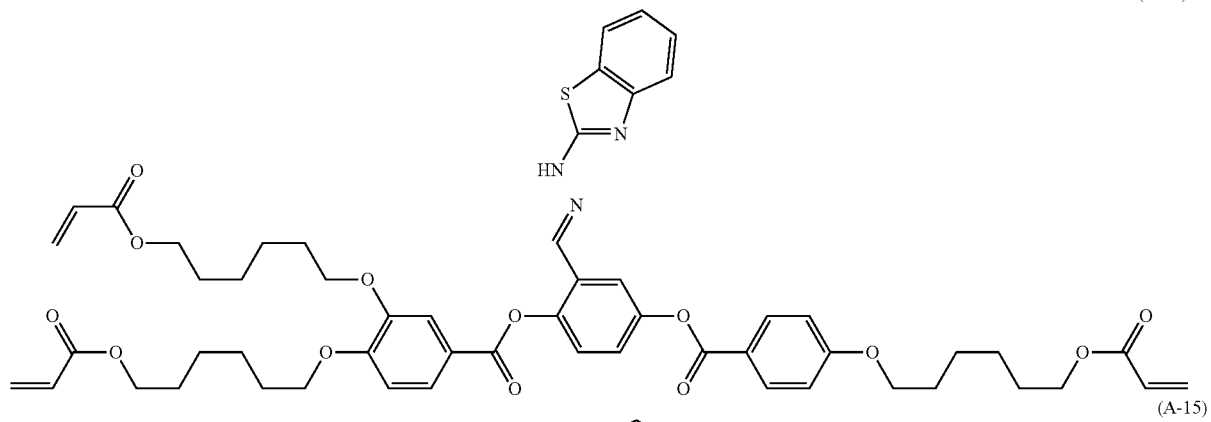
(A-14)
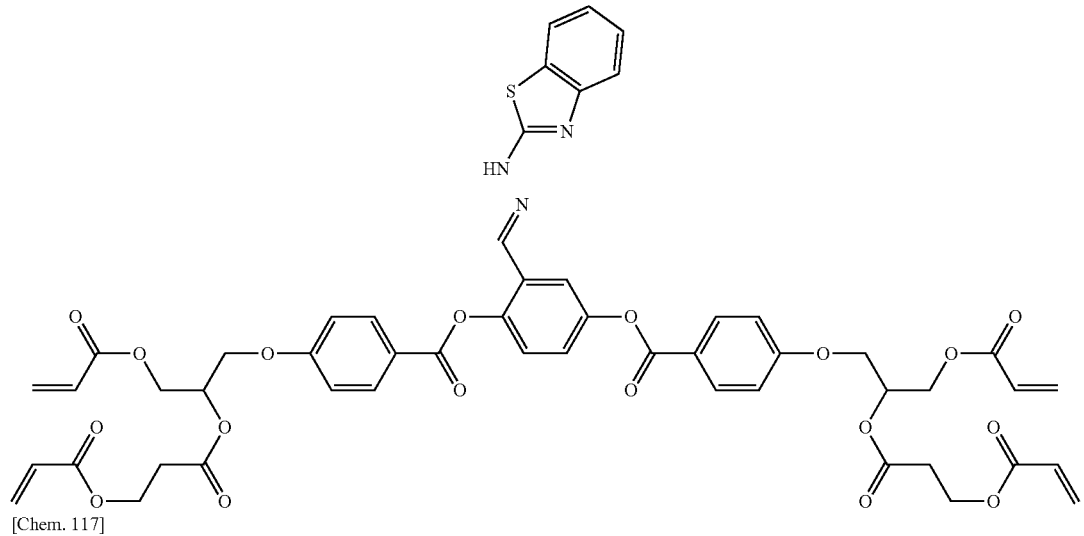
(A-15)
[Chem. 117]
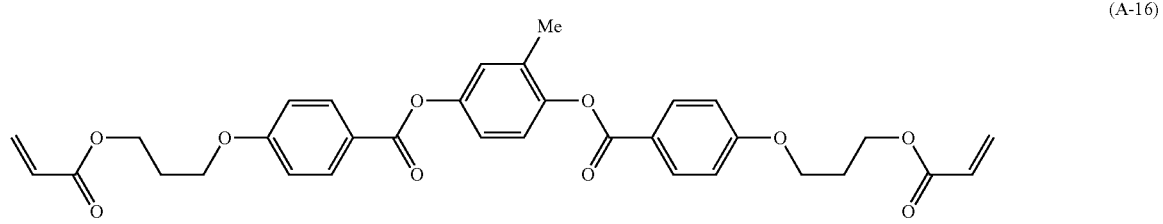
(A-16)
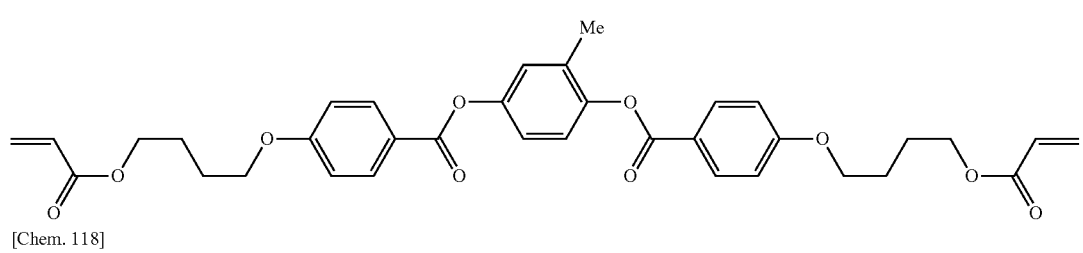
(A-17)
[Chem. 118]
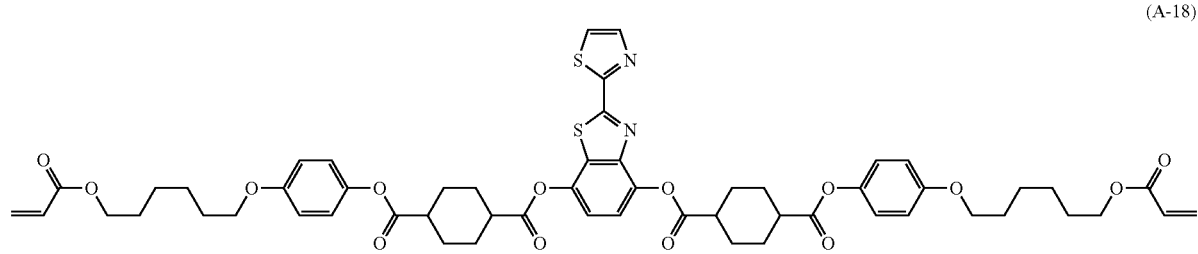
(A-18)

-continued
(A-19)
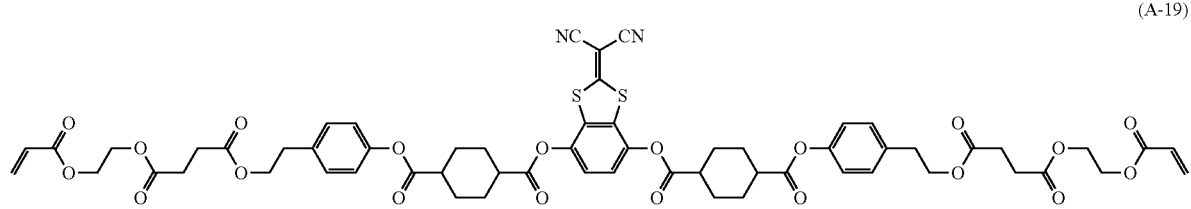
[Chem. 119]
mixture of
(A-20)
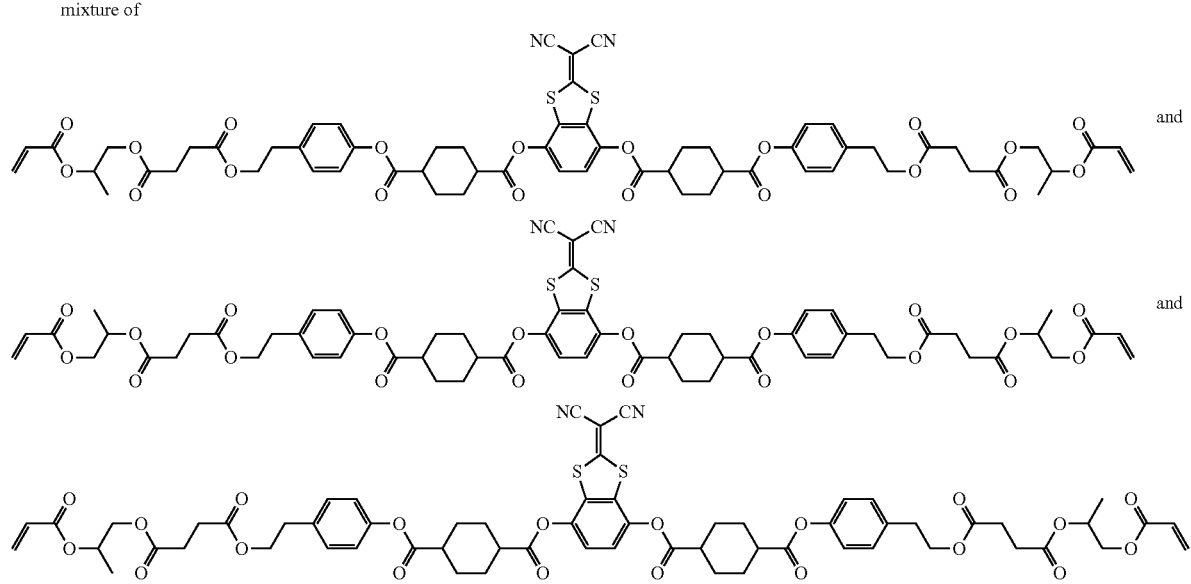
and
and
[Chem. 120]
(A-21)
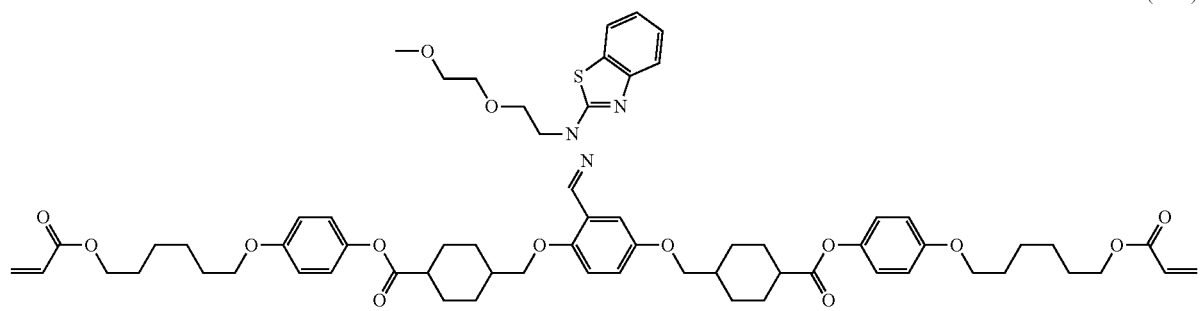
(A-22)
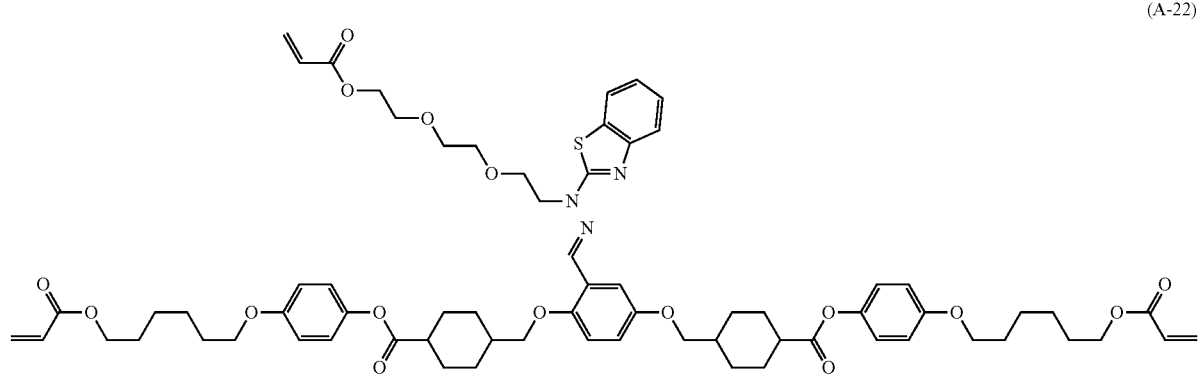

[Chem. 121]
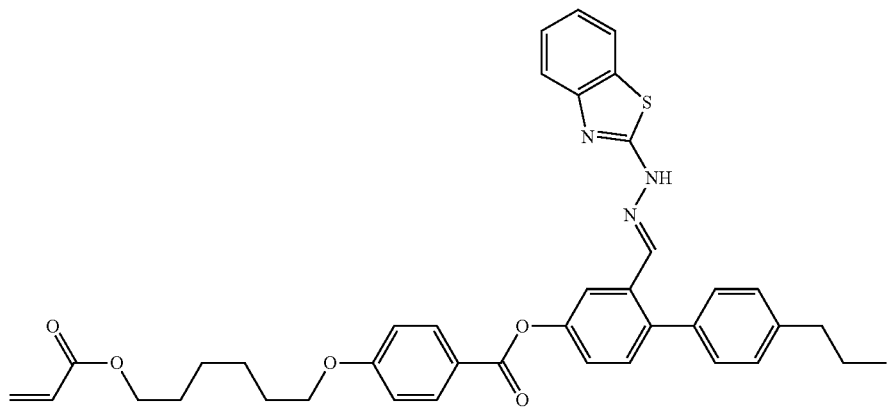
(B-1)
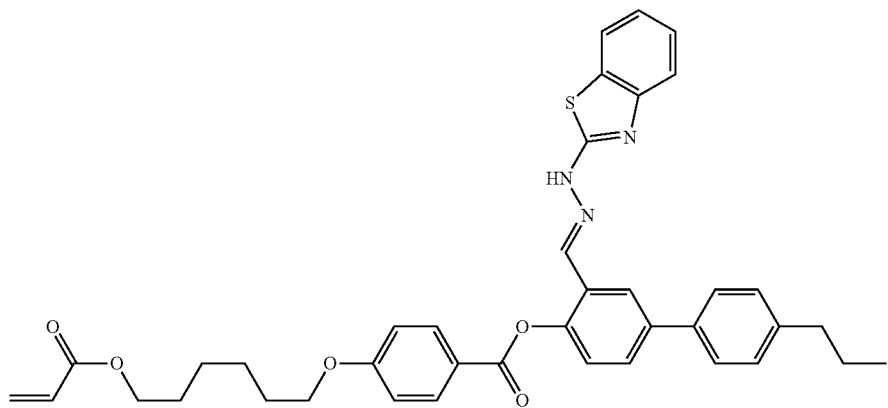
(B-2)
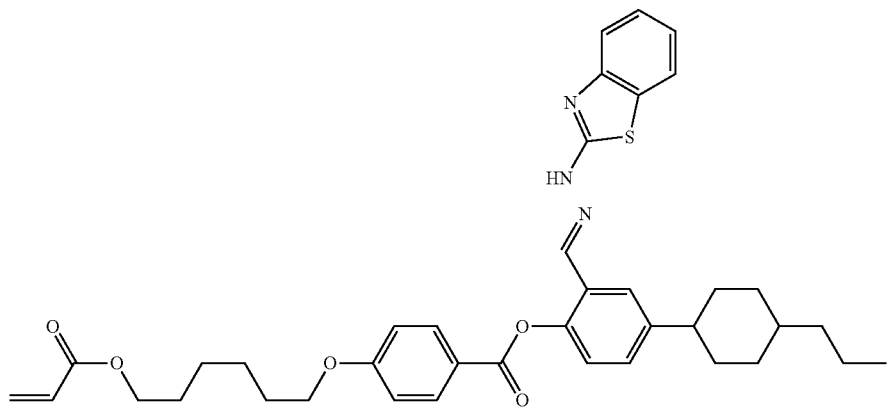
(B-3)

-continued
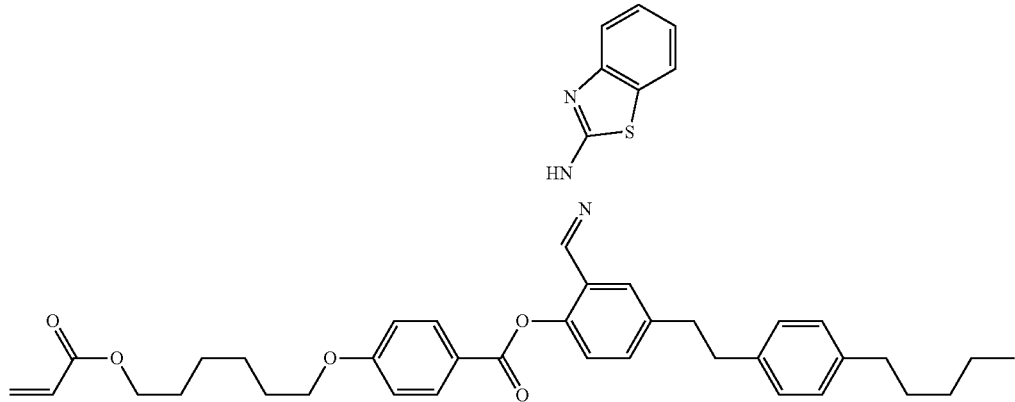
(B-4)
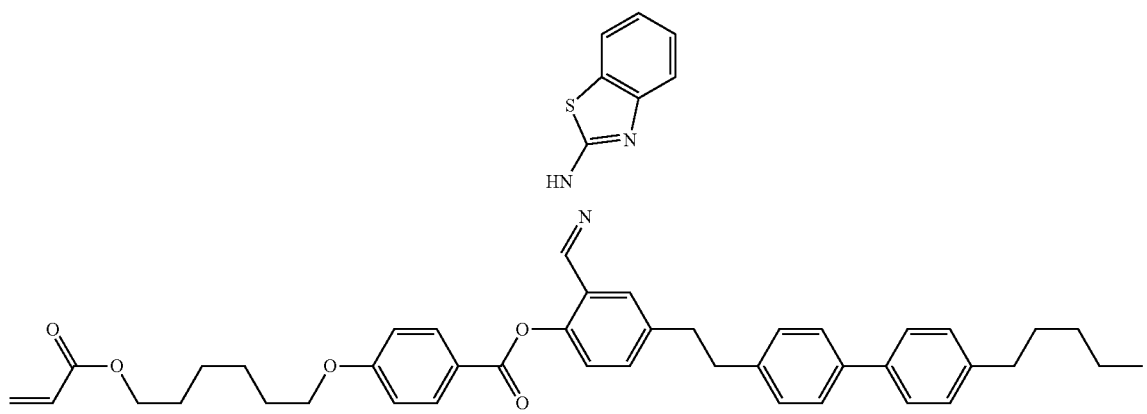
(B-5)
[Chem. 122]
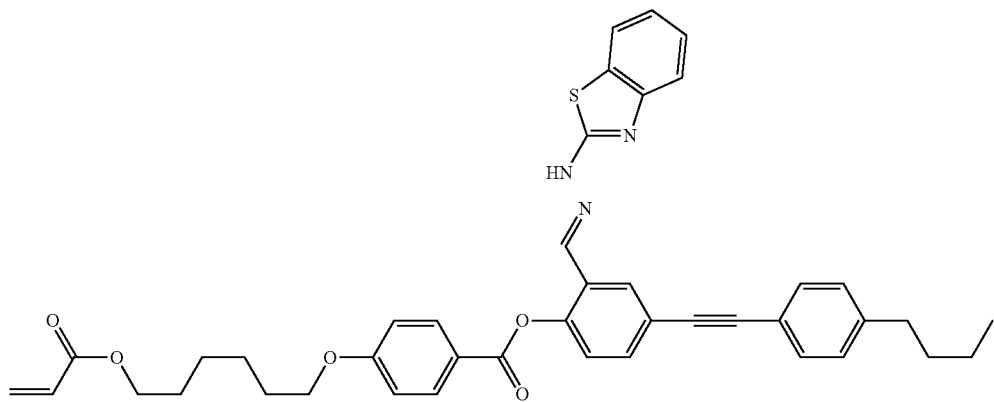
(B-6)

-continued

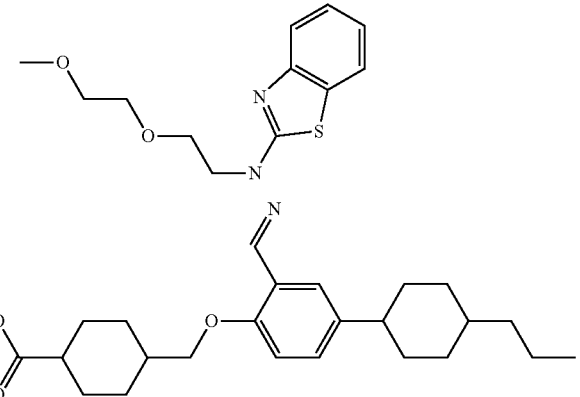
(B-7)

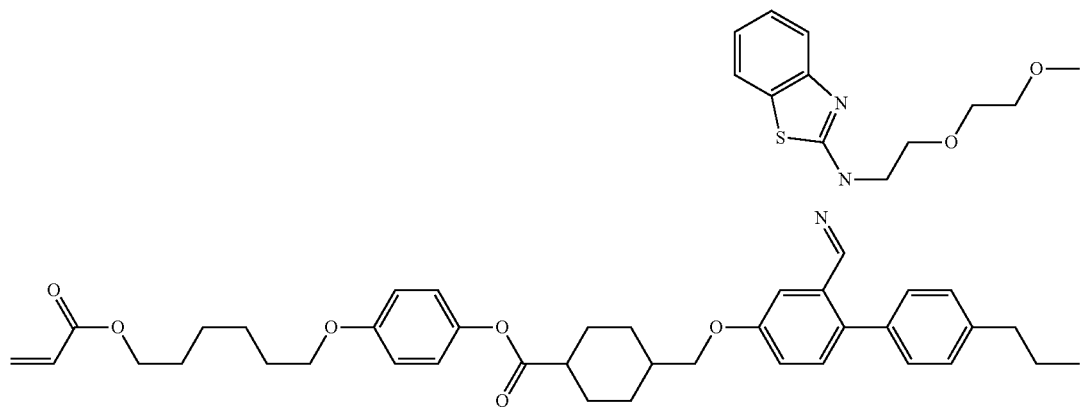
(B-8)

[Chem. 123]

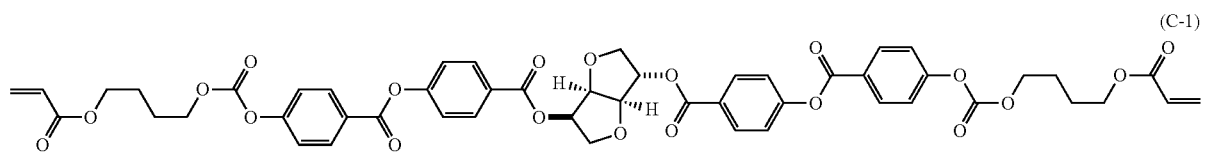
(C-1)

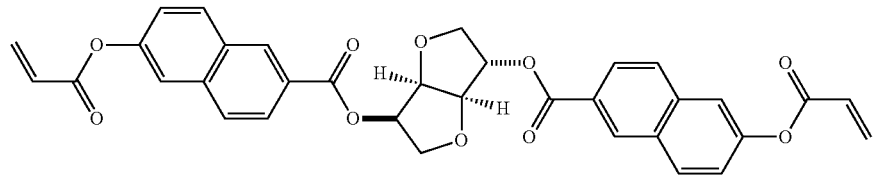
(C-2)

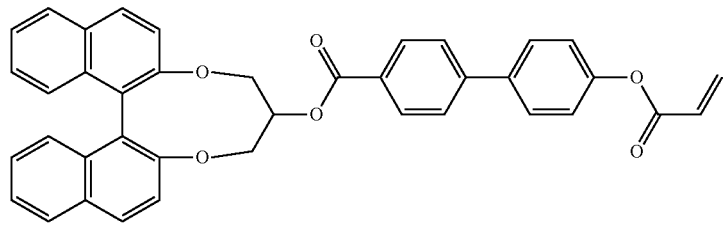
(C-3)

Chloroform (D-1)
1,1,2-Trichloroethane (D-2)
p-methoxyphenol (E-1)
IRGACURE 907 (F-1)
IRGACURE OXE-01 (F-2)
Isopropylthioxanthone (G-1)
MEGAFACE F-554 (H-1)

The compounds represented by Formulas (A-1) to (A-15), Formulas (A-18) to (A-22), and Formulas (B-1) to (B-8) satisfied the formula represented by Formula (1).

<Measurement of YI/Δn>

A yellowness index of the compounds represented by Formulas (A-1) to (A-122) and Formulas (B-1) to (B-8) was measured as follows.

Each compound represented by Formulas (A-1) to (A-22) and Formulas (B-1) to (B-8) was dissolved in a solvent to make a 20 ppm solution. An acetonitrile solution was used as a solvent. In the case where the compound was not dissolved in acetonitrile, a chloroform solution was used as a solvent. The solution was put into a transparent cell having an optical path length of 1 cm, and the yellowness index was calculated using a spectrophotometer.

Δn of each compound represented by Formulas (A-1) to (A-22) and Formulas (B-1) to (B-8) was calculated as follows. A solution containing a compound, to which three parts of an initiator, IRGACURE 907 was added was applied to a glass substrate provided with a polyimide alignment film by using a spin coating method and was dried at a specific temperature described below for 2 minutes. The obtained coating film was cooled to room temperature, and then irradiated with ultraviolet rays for 30 seconds at an intensity of 30 mW/cm$^2$ by using a high pressure mercury lamp, and thus a film of each compound represented by Formulas (A-1) to (A-22) and Formulas (B-1) to (B-8) was obtained. Drying for producing the coating film of the solution containing each compound represented by Formulas (A-1), (A-3), (A-5) to (A-7), (A-9), (A-10), (A-12) to (A-17), (A-18), (A-21) and (A-22), and Formulas (B-1) to (B-6) and (B-8), was carried out at 80° C., drying for producing the coating film of the solution containing each compound represented by Formulas (A-2) and (A-11) was carried out at 140° C., drying for producing the coating film of the solution containing each compound represented by Formula (A-4) was carried out at 130° C., drying for producing the coating film of the solution containing each compound represented by Formulas (A-8), (A-19), and (A-20) was carried out at 120° C., and drying for producing the coating film of the solution containing each compound represented by Formula (B-7) was carried out at 60° C. A phase difference of the obtained film was measured by using a phase difference film/optical material evaluation apparatus RETS-100 (manufactured by OTSUKA ELECTRONICS Co., LTD.).

In the case where the compound is not dissolved in the solvent, in the case where a compound of the evaluation target is non-liquid crystalline by itself or in the case where a uniform film cannot be obtained, a film was produced by using a composition in which the compound of the evaluation target (10%, 20%, or 30%) was added to a matrix liquid crystal consisting of a compound (50%) represented by Formula (a) and a compound (50%) represented by Formula (b).

[Chem. 124]

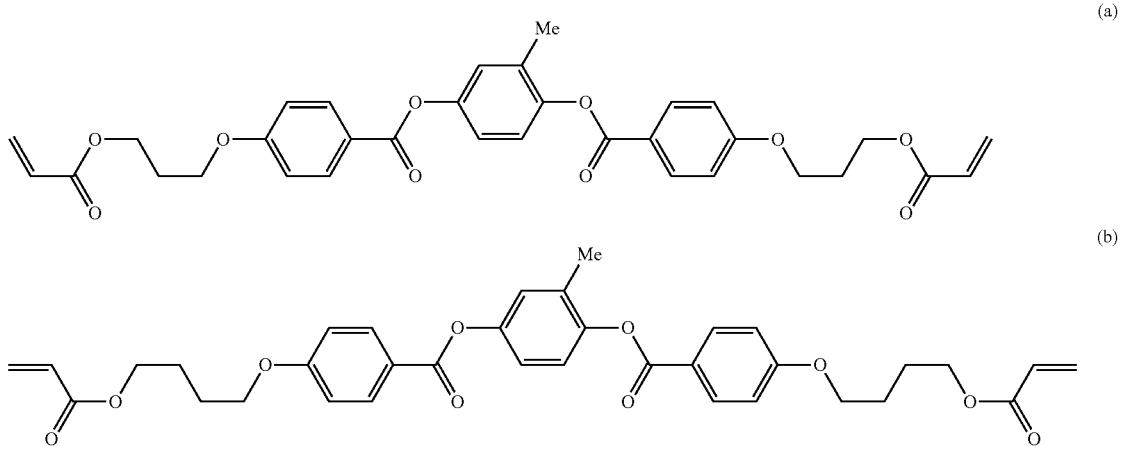

Namely, the phase difference was measured by extrapolation.

A film thicknesses of each compound represented by Formulas (A-1) to (A-22) and Formulas (B-1) to (B-8) was measured by using a surface profiler DEKTAK-XT (manufactured by Bruker). An of each compound represented by Formulas (A-1) to (A-22) and Formulas (B-1) to (B-8) was calculated from the phase difference and the film thickness of the film. Thereafter, by dividing the YI obtained as described above by the Δn obtained as described above, a value of YI/Δn represented by Formulas (A-1) to (A-22) and Formulas (B-1) to (B-8) was obtained.

In regard to each compound represented by Formulas (A-1) to (A-4), (A-6) to (A-12), and (B-1) and (B-2), compounds having different degrees of purification were prepared, and YI/Δn was measured for each compound having different degrees of purification. For purification of each compound, one or a plurality of optional steps selected from the following purification methods were carried out once or a plurality of times, amounts of a purifying agent and a solvent were appropriately adjusted, and thus, compounds each having different values of YI were obtained.

(Purification Method)

(Purification Method 1)

Methanol was added to a mixture of the purification target to crystallize. The crystals were filtered and redissolved in chloroform. Activated carbon was added to the obtained solution, and the solution was stirred at room temperature for 1 hour. After filtration, the solvent was distilled off to ⅓ and methanol was added thereto while stirring. The precipitated solid was filtered and dried, and thus, a compound was obtained.

(Purification Method 2)

Methanol was added to a mixture of the purification target to crystallize. The crystals were filtered and redissolved in chloroform. Methanol was added to the obtained solution while stirring. The precipitated solid was filtered and dried, and thus, a compound was obtained.

(Purification Method 3)

A mixture of the purification target was dissolved in ethyl acetate and the solvent was distilled off. Methanol was added thereto, and the mixture was cooled so as to crystallize. The precipitated solid was filtered and dried, and thus, a compound was obtained.

(Purification Method 4)

A mixed solvent of dichloromethane and methanol was added to and dissolved in a mixture of the purification target, and purified by column chromatography (silica gel), and thus, a compound was obtained.

(Purification Method 5)

Ethyl acetate was added to and dissolved in a mixture of the purification target, and the mixture was washed with water. After drying an organic layer with anhydrous sodium sulfate, the solvent was distilled off. The mixture was dissolved in a mixed solvent of toluene and ethyl acetate and purified by column chromatography (silica gel), and thus, a compound was obtained.

(Purification Method 6)

Ethyl acetate was added to and dissolved in a mixture of the purification target, and the mixture was washed with water. After drying an organic layer with anhydrous sodium sulfate, the solvent was distilled off. The mixture was dissolved in a mixed solvent of hexane and ethyl acetate and purified by column chromatography (silica gel) and thus, a compound was obtained.

(Purification Method 7)

A mixture of the purification target was dissolved in dichloromethane, activated carbon was added thereto, and the mixture was heated and stirred. The activated carbon was removed by filtration and the solvent was distilled off. Column chromatography (silica gel and alumina) and recrystallization were carried out, and thus, a compound was obtained.

(Purification Method 8)

A mixture of the purification target was dissolved in a mixed solvent of dichloromethane and hexane and purified by column chromatography (silica gel and alumina), and thus, a compound was obtained.

(Purification Method 9)

A mixture of the purification target was dissolved in a mixed solvent of dichloromethane and acetone, activated charcoal was added thereto, and the mixture was heated and stirred. The activated carbon was removed by filtration, and the solvent was distilled off, and thus, a compound was obtained.

(Purification Method 10)

A mixture of the purification target was dissolved in toluene, silica gel and alumina were added thereto, and the mixture was stirred at room temperature for 1 hour. Silica gel and alumina were removed by filtration, and the solvent was distilled off, and thus, a compound was obtained.

(Purification Method 11)

A mixture of the purification target was dispersed in methanol and stirred at room temperature for 1 hour. Filtration and drying were carried out, and thus, a compound was obtained.

(Purification Method 12)

A mixture of the purification target was dispersed in ethanol and stirred at room temperature for 1 hour. Filtration and drying were carried out, and thus, a compound was obtained.

(Purification Method 13)

A mixture of the purification target was dispersed in hexane and stirred at room temperature for 1 hour. Filtration and drying were carried out, and thus, a compound was obtained.

Examples 1 to 27 and Comparative Examples 1 to 17

Preparation of Liquid Crystal Composition of Example 1

As the compound having a mesogenic group in the polymerizable composition, a material (M1) containing 10% of the compound (YI/Δn=2.4) represented by Formula (A-1), 25% of the compound (YI/Δn=59.7) represented by Formula (A-10), 25% of the compound (YI/Δn=76.1) represented by Formula (A-11), and 40% of the compound (YI/Δn=60.9) represented by Formula (B-1) was prepared. The yellowness index of the material, that is, the material (M1) including all the compounds having a mesogenic group in the polymerizable composition was 4.29, and YI/Δn was 58.0. The material (M1) was dissolved in an acetonitrile solution so as to make a 20 ppm solution, and the yellowness index of the material (M1) was measured in the same manner as the measurement method of the above compound. In regard to a refractive index anisotropy of the material (M1), a solution containing (M1) to which 3 parts of the initiator, IRGACURE 907 was added, was applied to a glass substrate provided with a polyimide alignment film by a spin coating method, the coating film obtained by drying for 2 minutes at 80° C. was cooled and then irradiated with ultraviolet rays for 30 seconds at an intensity of 30 mW/cm$^2$ by using a high pressure mercury lamp, and thus, a film of the evaluation target was obtained. A phase difference of the obtained film was measured by using a phase difference film/optical material evaluation apparatus RETS-100 (manufactured by OTSUKA ELECTRONICS Co., LTD.). A film thicknesses of the obtained film was measured by using a surface profiler DEKTAK-XT (manufactured by Bruker). Δn of the material (M1) consisting only of the compounds having a mesogenic group in the polymerizable composition was calculated from the phase difference and the film thickness of the film. Thereafter, by dividing the YI obtained as described above by the Δn obtained as described above, a value of YI/Δn of the material (M1) consisting only of the compounds having a mesogenic group in the polymerizable composition was obtained.

100 parts of the material (M1), 300 parts of cyclopentanone (D-1) which is an organic solvent, 0.1 parts of p-methoxyphenol (E-1), 3 parts of IRGACORE 907 (F-1), 3 parts of IRGACURE OXE-01 (F-2), 2 parts of isopropylthioxanthone (G-1), and 0.2 parts of MEGAFACE F-554 (H-1) were stirred for 30 minutes at a stirring rate of 500 rpm under a condition of a solution temperature of 60° C. by using a stirrer having a stirring propeller, and thus, a liquid crystal composition of Example 1 was obtained.

Preparation of Liquid Crystal Compositions of Examples 2 to 27 and Comparative Examples 1 to 17

In the same manner as the preparation of the liquid crystal composition of Example 1, materials (M2) to (M44) containing the compounds represented by Formulas (A-1) to (A-22) and Formulas (B-1) to (B-8) as shown in the following table, by proportions shown in the tables were prepared. In the same manner as the material (M1), values of YI and YI/Δn of each of the materials (M2) to (M44) were measured.

In the same manner as the liquid crystal composition of Example 1, except that each materials (M2) to (M16), (M21) to (M41), and (M43) and (M44) was used in place of the material (M1) in the liquid crystal composition of Example 1, that is, 100 parts of each material, 300 parts of cyclopentanone (D-1) which is an organic solvent, 0.1 parts of p-methoxyphenol (E-1), 3 parts of IRGACURE 907 (F-1), 3 parts of IRGACURE OXE-01 (F-2), 2 parts of isopropyl-thioxanthone (G-1), and 0.2 parts of MEGAFACE F-554 (H-1) were stirred for 30 minutes at a stirring rate of 500 rpm under a condition of a solution temperature of 60° C. by using a stirrer having a stirring propeller, and thus, liquid crystal compositions of Examples 2 to 16, 21 to 27, and Comparative Examples 1 to 14, and 16 and 17 were obtained.

100 parts of (M17), 5.0 parts of the material (C-1), 300 parts of cyclopentanone (D-1) which is an organic solvent, 0.1 parts of p-methoxyphenol (E-1), 3 parts of IRGACURE 907 (F-1), 3 parts of IRGACURE OXE-01 (F-2), 2 parts of isopropyl thioxanthone (G-1), and 0.2 parts of MEGAFACE F-554 (H-1) were stirred for 30 minutes at a stirring rate of 500 rpm under a condition of a solution temperature of 60° C. by using a stirrer having a stirring propeller, and thus, the liquid crystal composition of Example 17 was obtained.

In the same manner as the liquid crystal composition of Example 17, except that the material (M17) was used in place of the material (M42) in the liquid crystal composition of Example 17, that is, 100 parts of the material, 5.0 parts of the material (C-1), 300 parts of cyclopentanone (D-1) which is an organic solvent, 0.1 parts of p-methoxyphenol (E-1), 3 parts of IRGACURE 907 (F-1), 3 parts of IRGACURE OXE-01 (F-2), 2 parts of isopropyl thioxanthone (G-1), and 0.2 parts of MEGAFACE F-554 (H-1) were stirred for 30 minutes at a stirring rate of 500 rpm under a condition of a solution temperature of 60° C. by using a stirrer having a stirring propeller, and thus, the liquid crystal composition of Comparative Example 15 was obtained.

The liquid crystal composition of Example 18 was obtained under the same conditions as those for the liquid crystal composition of Example 17, except that the material (M18) was used in place of the material (M17) and 4.0 parts of the material (C-2) was added instead of using 5.0 parts of the material (C-1) in the liquid crystal composition of Example 17.

The liquid crystal compositions of Example 19 (M19) to Example 20 (M20) were obtained under the same conditions as those for the liquid crystal composition of Example 17, except that materials (M19) to (M20) were each used in place of the material (M17) and 8.0 parts of the material (C-3) was added instead of using 5.0 parts of the material (C-1) in the liquid crystal composition of Example 17.

The compositions of the materials (M1) to (M44) and the values of YI/Δn are shown below.

TABLE 1

| Compound | Material (M1) | | | Material (M2) | | | Material (M3) | | | Material (M4) | | |
|---|---|---|---|---|---|---|---|---|---|---|---|---|
| | Composition | YI | YI/Δn | Composition | YI | YI/Δn | Composition | YI | YI/Δn | Composition | YI | YI/Δn |
| A-1 | 10.0% | 0.19 | 2.4 | | | | 40.0% | 0.02 | 0.3 | 40.0% | 0.19 | 2.4 |
| A-2 | | | | 10% | 0.20 | 2.9 | 45.0% | 0.20 | 2.9 | 45.0% | 0.20 | 2.9 |
| A-3 | | | | | | | 15.0% | 0.24 | 4.8 | 15.0% | 0.24 | 4.8 |
| A-10 | 25.0% | 4.00 | 59.7 | 25% | 4.00 | 59.7 | | | | | | |
| A-11 | 25.0% | 5.40 | 76.1 | 25% | 5.40 | 76.1 | | | | | | |
| B-1 | 40.0% | 4.81 | 60.9 | 40% | 50.00 | 632.9 | | | | | | |
| Material (M) | 100.0% | 4.29 | 58.0 | 100% | 22.37 | 306.0 | 100.0% | 0.13 | 1.9 | 100.0% | 0.20 | 2.9 |

TABLE 2

| Compound | Material (M5) | | | Material (M6) | | | Material (M7) | | | Material (M8) | | |
|---|---|---|---|---|---|---|---|---|---|---|---|---|
| | Composition | YI | YI/Δn | Composition | YI | YI/Δn | Composition | YI | YI/Δn | Composition | YI | YI/Δn |
| A-1 | | | | | | | | | | 40.0% | 0.19 | 2.4 |
| A-2 | | | | | | | | | | 45.0% | 0.20 | 2.9 |
| A-4 | 30.0% | 0.30 | 9.1 | | | | | | | | | |
| A-5 | | | | 20.0% | 7.71 | 214.2 | | | | | | |
| A-6 | | | | 40.0% | 4.30 | 44.3 | | | | | | |
| A-7 | | | | 40.0% | 4.50 | 30.8 | | | | | | |
| A-8 | | | | | | | 10.0% | 0.20 | 1.9 | 15.0% | 0.20 | 1.9 |
| A-9 | 15.0% | 4.27 | 80.6 | | | | | | | | | |
| A-10 | 15.0% | 4.00 | 59.7 | | | | 25.0% | 4.00 | 59.7 | | | |
| A-11 | | | | | | | 25.0% | 5.40 | 76.1 | | | |
| B-1 | 40.0% | 50.00 | 632.9 | | | | 40.0% | 80.00 | 1012.7 | | | |
| Material (M) | 100.0% | 21.33 | 358.5 | 100.0% | 5.06 | 48.5 | 100.0% | 34.37 | 448.7 | 100.0% | 0.196 | 2.5 |

TABLE 3

| Compound | Material (M9) | | | Material (M10) | | | Material (M11) | | | Material (M12) | | |
|---|---|---|---|---|---|---|---|---|---|---|---|---|
| | Composition | YI | YI/Δn | Composition | YI | YI/Δn | Composition | YI | YI/Δn | Composition | YI | YI/Δn |
| A-9 | 10.0% | 4.27 | 80.6 | | | | | | | | | |
| A-10 | 10.0% | 4.00 | 59.7 | | | | | | | | | |

TABLE 3-continued

|          | Material (M9) | | | Material (M10) | | | Material (M11) | | | Material (M12) | | |
| --- | --- | --- | --- | --- | --- | --- | --- | --- | --- | --- | --- | --- |
| Compound | Composition | YI | YI/$\Delta$n | Composition | YI | YI/$\Delta$n | Composition | YI | YI/$\Delta$n | Composition | YI | YI/$\Delta$n |
| A-11 | 10.0% | 5.40 | 76.1 | 25.0% | 5.40 | 76.1 | 30.0% | 0.20 | 2.8 | 25.0% | 60.00 | 845.1 |
| A-12 | | | | 25.0% | 5.00 | 50.0 | | | | 25.0% | 5.00 | 50.0 |
| A-13 | | | | | | | 20.0% | 4.50 | 47.4 | | | |
| A-14 | | | | | | | | | | 10.0% | 4.60 | 52.9 |
| B-1 | 45.0% | 4.81 | 60.9 | | | | 30.0% | 4.81 | 60.9 | 40.0% | 4.81 | 60.9 |
| B-2 | 25.0% | 50.00 | 684.9 | 50.0% | 4.41 | 60.4 | | | | | | |
| B-3 | | | | | | | 20.0% | 6.45 | 179.2 | | | |
| Material (M) | 100.0% | 16.03 | 219.9 | 100.0% | 4.81 | 60.6 | 100.0% | 3.69 | 51.9 | 100.0% | 18.63 | 224.4 |

TABLE 4

|          | Material (M13) | | | Material (M14) | | | Material (M15) | | | Material (M16) | | |
| --- | --- | --- | --- | --- | --- | --- | --- | --- | --- | --- | --- | --- |
| Compound | Composition | YI | YI/$\Delta$n | Composition | YI | YI/$\Delta$n | Composition | YI | YI/$\Delta$n | Composition | YI | YI/$\Delta$n |
| A-9 | | | | | | | 10.0% | 4.27 | 80.6 | 10.0% | 4.27 | 80.6 |
| A-10 | | | | 10.0% | 4.00 | 59.7 | 10.0% | 4.00 | 59.7 | 10.0% | 4.00 | 59.7 |
| A-11 | 25.0% | 60.00 | 845.1 | 20.0% | 5.40 | 76.1 | 10.0% | 5.40 | 76.1 | 10.0% | 5.40 | 76.1 |
| A-12 | 30.0% | 5.00 | 50.0 | | | | | | | | | |
| A-15 | 5.0% | 4.80 | 57.8 | | | | | | | | | |
| B-1 | 40.0% | 50.00 | 632.9 | 45.0% | 4.81 | 60.9 | 45.0% | 50.00 | 632.9 | 45.0% | 30.00 | 379.7 |
| B-4 | | | | 25.0% | 5.94 | 135.0 | | | | | | |
| B-5 | | | | | | | 25.0% | 6.00 | 111.1 | | | |
| B-6 | | | | | | | | | | 25.0% | 6.50 | 92.9 |
| Material (M) | 100.0% | 36.74 | 440.0 | 100.0% | 5.13 | 76.0 | 100.0% | 25.37 | 372.2 | 100.0% | 16.49 | 228.6 |

TABLE 5

|          | Material (M17) | | | Material (M18) | | | Material (M19) | | | Material (M20) | | |
| --- | --- | --- | --- | --- | --- | --- | --- | --- | --- | --- | --- | --- |
| Compound | Composition | YI | YI/$\Delta$n | Composition | YI | YI/$\Delta$n | Composition | YI | YI/$\Delta$n | Composition | YI | YI/$\Delta$n |
| A-10 | 21.5% | 4.00 | 59.7 | 20.8% | 4.00 | 59.7 | 21.7% | 4.00 | 59.7 | 21.7% | 4.00 | 59.7 |
| A-11 | 48.4% | 5.40 | 76.1 | 49.0% | 5.40 | 76.1 | 45.7% | 5.40 | 76.1 | 45.7% | 5.40 | 76.1 |
| B-1 | 21.5% | 30.00 | 379.7 | 20.8% | 10.00 | 126.6 | 21.7% | 20.00 | 253.2 | 21.7% | 4.81 | 60.9 |
| B-2 | 8.6% | 4.41 | 60.4 | 9.4% | 4.41 | 60.4 | 10.9% | 4.41 | 60.4 | 10.9% | 4.41 | 60.4 |
| Material (M) | 100.0% | 9.58 | 143.0 | 100.0% | 5.73 | 82.9 | 100.0% | 7.51 | 113.2 | 100.0% | 4.47 | 67.4 |

TABLE 6

|          | Material (M21) | | | Material (M22) | | | Material (M23) | | |
| --- | --- | --- | --- | --- | --- | --- | --- | --- | --- |
| Compound | Composition | YI | YI/$\Delta$n | Composition | YI | YI/$\Delta$n | Composition | YI | YI/$\Delta$n |
| A-1 | 30.0% | 0.19 | 2.4 | 30.0% | 0.19 | 2.4 | | | |
| A-2 | 45.0% | 0.20 | 2.9 | 45.0% | 0.20 | 2.9 | | | |
| A-8 | 15.0% | 0.20 | 1.9 | 15.0% | 0.20 | 1.9 | | | |
| A-16 | 10.0% | 0.10 | 0.6 | | | | | | |
| A-17 | | | | 10.0% | 0.11 | 0.6 | | | |
| A-18 | | | | | | | 45.0% | 7.00 | 80.5 |
| A-19 | | | | | | | 45.0% | 5.20 | 80.0 |
| A-20 | | | | | | | 10.0% | 5.50 | 87.3 |
| Material (M) | 100.0% | 0.19 | 2.1 | 100.0% | 0.19 | 2.2 | 100.0% | 6.04 | 80.9 |

TABLE 7

|          | Material (M24) | | | Material (M25) | | | Material (M26) | | | Material (M27) | | |
| --- | --- | --- | --- | --- | --- | --- | --- | --- | --- | --- | --- | --- |
| Compound | Composition | YI | YI/$\Delta$n | Composition | YI | YI/$\Delta$n | Composition | YI | YI/$\Delta$n | Composition | YI | YI/$\Delta$n |
| A-16 | | | | 5.0% | 0.10 | 0.6 | 5.0% | 0.10 | 0.6 | 5.0% | 0.10 | 0.6 |
| A-18 | | | | 45.0% | 7.0 | 80.5 | | | | | | |
| A-19 | | | | 45.0% | 5.20 | 80.0 | | | | | | |
| A-20 | | | | 5.0% | 5.50 | 87.3 | | | | | | |
| A-21 | 40.0% | 1.20 | 17.4 | | | | 50.0% | 1.20 | 17.4 | 35.0% | 1.20 | 17.4 |
| A-22 | 40.0% | 1.30 | 21.3 | | | | 45.0% | 1.30 | 21.3 | 35.0% | 1.30 | 21.3 |
| B-7 | 10.0% | 2.50 | 42.6 | | | | | | | 10.0% | 2.50 | 42.6 |

TABLE 7-continued

|  | Material (M24) | | | Material (M25) | | | Material (M26) | | | Material (M27) | | |
| --- | --- | --- | --- | --- | --- | --- | --- | --- | --- | --- | --- | --- |
| Compound | Composition | YI | YI/Δn | Composition | YI | YI/Δn | Composition | YI | YI/Δn | Composition | YI | YI/Δn |
| B-8 | 10.0% | 1.00 | 15.2 | | | | | | | 5.0% | 1.00 | 15.2 |
| Material (M) | 100.0% | 1.35 | 20.9 | 100.0% | 5.77 | 71.9 | 100.0% | 1.19 | 16.8 | 100.0% | 1.18 | 18.6 |

TABLE 8

|  | Material (M28) | | | Material (M29) | | | Material (M30) | | | Material (M31) | | |
| --- | --- | --- | --- | --- | --- | --- | --- | --- | --- | --- | --- | --- |
| Compound | Composition | YI | YI/Δn | Composition | YI | YI/Δn | Composition | YI | YI/Δn | Composition | YI | YI/Δn |
| A-1 | 10.0% | 0.19 | 2.4 | | | | 40.0% | 0.02 | 0.3 | 40.0% | 0.04 | 0.5 |
| A-2 | | | | 10.0% | 0.20 | 2.9 | 45.0% | 0.01 | 0.1 | 45.0% | 0.02 | 0.3 |
| A-3 | | | | | | | 15.0% | 0.02 | 0.4 | 15.0% | 0.02 | 0.4 |
| A-10 | 25.0% | 4.00 | 59.7 | 25.0% | 4.00 | 59.7 | | | | | | |
| A-11 | 25.0% | 5.40 | 76.1 | 25.0% | 5.40 | 76.1 | | | | | | |
| B-1 | 40.0% | 90.00 | 1139.2 | 40.0% | 90.00 | 1139.2 | | | | | | |
| Material M | 100.0% | 38.37 | 518.5 | 100.0% | 38.37 | 526.3 | 100.0% | 0.02 | 0.2 | 100.0% | 0.03 | 0.4 |

TABLE 9

|  | Material (M32) | | | Material (M33) | | | Material (M34) | | | Material (M35) | | |
| --- | --- | --- | --- | --- | --- | --- | --- | --- | --- | --- | --- | --- |
| Compound | Composition | YI | YI/Δn | Composition | YI | YI/Δn | Composition | YI | YI/Δn | Composition | YI | YI/Δn |
| A-1 | | | | | | | | | | 40.0% | 0.02 | 0.3 |
| A-2 | | | | | | | | | | 45.0% | 0.01 | 0.1 |
| A-4 | 30.0% | 0.03 | 0.9 | | | | | | | | | |
| A-5 | | | | 20.0% | 7.71 | 214.2 | | | | | | |
| A-6 | | | | 40.0% | 30.00 | 309.3 | | | | | | |
| A-7 | | | | 40.0% | 100.00 | 684.9 | | | | | | |
| A-8 | | | | | | | 10.0% | 0.20 | 1.9 | 15.0% | 0.03 | 0.3 |
| A-9 | 15.0% | 0.03 | 0.6 | | | | | | | | | |
| A-10 | 15.0% | 0.03 | 0.4 | | | | 25.0% | 4.00 | 59.7 | | | |
| A-11 | | | | | | | 25.0% | 5.40 | 76.1 | | | |
| B-1 | 40.0% | 0.02 | 0.3 | | | | 40.0% | 90.00 | 1139.2 | | | |
| Material M | 100.0% | 0.03 | 0.4 | 100.0% | 53.54 | 512.9 | 100% | 38.37 | 500.9 | 100.0% | 0.02 | 0.2 |

TABLE 10

|  | Material (M36) | | | Material (M37) | | | Material (M38) | | | Material (M39) | | |
| --- | --- | --- | --- | --- | --- | --- | --- | --- | --- | --- | --- | --- |
| Compound | Composition | YI | YI/Δn | Composition | YI | YI/Δn | Composition | YI | YI/Δn | Composition | YI | YI/Δn |
| A-9 | 10.0% | 4.27 | 80.6 | | | | | | | | | |
| A-10 | 10.0% | 4.00 | 59.7 | | | | | | | | | |
| A-11 | 10.0% | 5.40 | 76.1 | 25.0% | 0.02 | 0.3 | 30.0% | 60.00 | 845.1 | 25.0% | 90.00 | 1267.6 |
| A-12 | | | | 25.0% | 0.02 | 0.2 | | | | 25.0% | 5.00 | 50.0 |
| A-13 | | | | | | | 20.0% | 4.50 | 47.4 | | | |
| A-14 | | | | | | | | | | 10.0% | 4.60 | 52.9 |
| B-1 | 45.0% | 55.00 | 696.2 | | | | 30.0% | 55.00 | 696.2 | 40.0% | 55.00 | 696.2 |
| B-2 | 25.0% | 50.00 | 684.9 | 50.0% | 0.02 | 0.3 | | | | | | |
| B-3 | | | | | | | 20.0% | 6.45 | 179.2 | | | |
| Material M | 100.0% | 38.62 | 529.7 | 100.0% | 0.02 | 0.3 | 100.0% | 36.69 | 515.3 | 100.0% | 46.21 | 556.4 |

TABLE 11

|  | Material (M40) | | | Material (M41) | | | Material (M42) | | |
| --- | --- | --- | --- | --- | --- | --- | --- | --- | --- |
| Compound | Composition | YI | YI/Δn | Composition | YI | YI/Δn | Composition | YI | YI/Δn |
| A-10 | | | | 10.0% | 4.00 | 59.7 | 21.5% | 4.00 | 59.7 |
| A-11 | 25.0% | 60.00 | 845.1 | 20.0% | 60.00 | 845.1 | 48.4% | 60.00 | 845.1 |
| A-12 | 30.0% | 25.00 | 250.0 | | | | | | |
| A-15 | 5.0% | 4.80 | 57.8 | | | | | | |
| B-1 | 40.0% | 50.00 | 632.9 | 45.0% | 50.00 | 632.9 | 21.7% | 30.00 | 379.7 |
| B-2 | | | | | | | 10.9% | 4.41 | 60.4 |

TABLE 11-continued

|  | Material (M40) | | | Material (M41) | | | Material (M42) | | |
| --- | --- | --- | --- | --- | --- | --- | --- | --- | --- |
| Compound | Composition | YI | YI/Δn | Composition | YI | YI/Δn | Composition | YI | YI/Δn |
| B-4 |  |  |  | 25.0% | 5.94 | 135.0 |  |  |  |
| Material M | 100.0% | 42.74 | 511.9 | 100.0% | 36.39 | 539.4 | 100.0% | 34.15 | 509.8 |

TABLE 12

|  | Material (M43) | | | Material (M44) | | |
| --- | --- | --- | --- | --- | --- | --- |
| Compound | Composition | YI | YI/Δn | Composition | YI | YI/Δn |
| A-1 | 30.0% | 0.02 | 0.3 | 30.0% | 0.02 | 0.3 |
| A-2 | 45.0% | 0.01 | 0.1 | 45.0% | 0.01 | 0.1 |
| A-8 | 15.0% | 0.03 | 0.3 | 15.0% | 0.03 | 0.3 |
| A-16 | 10.0% | 0.10 | 0.6 |  |  |  |
| A-17 |  |  |  | 10.0% | 0.11 | 0.6 |
| Material (M) | 100.0% | 0.03 | 0.3 | 100.0% | 0.03 | 0.3 |

<Evaluation on Solubility of Polymerizable Composition>

In order to evaluate the solubility, chloroform was added as a solvent so as to make the concentration of the materials (M1) to (M44) of 20%. Using a stirrer having a stirring propeller, the mixture was stirred for 10 minutes at a stirring rate of 500 rpm to evaluate solubility.

A: A transparent and uniform state can be visually confirmed.
B: When heated and stirred, a transparent and uniform state can be visually confirmed.
D: The compound cannot be uniformly dissolved even when heated and stirred.

<Preparation of Film for Reliability Evaluation Test>

A polyimide solution for an alignment film was applied to a glass substrate having a thickness of 0.7 mm at room temperature by a spin coating method and was dried at 80° C. for 10 minutes, and then baked at 200° C. for 60 minutes to thereby obtain a coating film. The obtained coating film was subjected to a rubbing treatment to obtain a substrate. The polymerizable compositions of Examples 1 to 27 and Comparative Examples 1 to 17 were applied on the substrate at room temperature by a spin coater, and then dried at 80° C. for 2 minutes. Thereafter, the substrate was left to stand at room temperature for 2 minutes, and then irradiated with UV light by using a conveyer-type high pressure mercury lamp having an illuminance set to 800 mJ/cm$^2$, and thus, the films of Examples 1 to 27 and Comparative Examples 1 to 17 were obtained.

<Evaluation 1 of Discoloration of Film>

With respect to the film obtained as described above, in order to evaluate the susceptibility to discoloration by the reliability test, the films of Examples 1 to 27 and Comparative Examples 1 to 17 were stored in a light resistance tester (UV intensity 500 W/m$^2$) for 1 month. Each yellowness index (YI) of the film before and after storage was measured so as to obtain a yellowing factor (ΔYI). An absorption spectrum of the polymer was measured with a spectrophotometer, and the yellowness index (YI) was calculated with the attached color diagnosis program. The calculation formula is as below.

YI=100(1.28X−1.06Z)/Y (In the formula, YI is a yellowness index of the film, and X, Y, and Z represent tristimulus values in the XYZ colorimetric system (JIS K 7373), and a yellowing factor (ΔYI) means a difference between the initial yellowness index of the film and the yellowness index of the film after exposure (JIS K7373)).

A: The yellowing factor (ΔYI) is less than 0.5.
B: The yellowing factor (ΔYI) is 0.5 or higher and less than 1.
C: The yellowing factor (ΔYI) is 1 or higher and less than 5.
D: The yellowing factor (ΔYI) is 5 or higher.

<Evaluation 2 of Discoloration of Film>

The films of Examples 1 to 27 and Comparative Examples 1 to 17 were stored in a dryer at 80° C. for 1 month. In the same manner as in Evaluation 1 on discoloration of the film, each yellowness index (YI) of the film before storage and after storage was measured to obtain a yellowing factor (ΔYI).

A: The yellowing factor (ΔYI) is less than 0.5.
B: The yellowing factor (ΔYI) is 0.5 or higher and less than 1.
C: The yellowing factor (ΔYI) is 1 or higher and less than 5.
D: The yellowing factor (ΔYI) is 5 or higher.

The results are shown in the following tables.

TABLE 13

| | Material (M) | Material (M) YI/Δn | Solubility | Discoloration 1 | Discoloration 2 |
| --- | --- | --- | --- | --- | --- |
| Example 1 | (M1) | 58.0 | A | A | A |
| Example 2 | (M2) | 306.9 | A | B | B |
| Example 3 | (M3) | 1.9 | B | A | A |
| Example 4 | (M4) | 2.9 | B | A | A |
| Example 5 | (M5) | 358.5 | A | B | B |
| Example 6 | (M6) | 48.5 | A | A | A |
| Example 7 | (M7) | 448.7 | A | B | B |
| Example 8 | (M8) | 2.5 | B | A | A |
| Example 9 | (M9) | 219.9 | A | B | B |
| Example 10 | (M10) | 60.6 | A | A | A |
| Example 11 | (M11) | 51.9 | A | A | A |
| Example 12 | (M12) | 224.4 | A | B | B |
| Example 13 | (M13) | 440.0 | A | B | B |
| Example 14 | (M14) | 76.0 | A | A | A |
| Example 15 | (M15) | 372.2 | A | B | B |
| Example 16 | (M16) | 228.6 | A | B | B |
| Example 17 | (M17) | 143.0 | B | A | A |
| Example 18 | (M18) | 82.9 | B | A | A |
| Example 19 | (M19) | 113.2 | B | A | A |
| Example 20 | (M20) | 67.4 | A | B | B |

TABLE 13-continued

| | Material (M) | Material (M) YI/Δn | Solubility | Discoloration 1 | Discoloration 2 |
|---|---|---|---|---|---|
| Example 21 | (M21) | 2.1 | B | A | A |
| Example 22 | (M22) | 2.2 | B | A | A |
| Example 23 | (M23) | 80.9 | A | A | A |
| Example 24 | (M24) | 20.9 | A | A | A |
| Example 25 | (M25) | 71.9 | A | A | A |
| Example 26 | (M26) | 16.8 | A | A | A |
| Example 27 | (M27) | 18.6 | A | A | A |

TABLE 14

| | Material (M) | Material (M) YI/Δn | Solubility | Discoloration 1 | Discoloration 2 |
|---|---|---|---|---|---|
| Comparative Example 1 | (M28) | 518.5 | B | D | D |
| Comparative Example 2 | (M29) | 526.3 | B | D | D |
| Comparative Example 3 | (M30) | 0.2 | D | C | C |
| Comparative Example 4 | (M31) | 0.4 | D | C | C |
| Comparative Example 5 | (M32) | 0.4 | D | C | C |
| Comparative Example 6 | (M33) | 512.9 | B | D | D |
| Comparative Example 7 | (M34) | 500.9 | B | D | D |
| Comparative Example 8 | (M35) | 0.2 | D | C | C |
| Comparative Example 9 | (M36) | 529.7 | B | D | D |
| Comparative Example 10 | (M37) | 0.3 | D | C | C |
| Comparative Example 11 | (M38) | 515.3 | B | D | D |
| Comparative Example 12 | (M39) | 556.4 | B | D | D |
| Comparative Example 13 | (M40) | 511.9 | B | D | D |
| Comparative Example 14 | (M41) | 539.4 | B | D | D |
| Comparative Example 15 | (M42) | 509.8 | B | D | D |
| Comparative Example 16 | (M43) | 0.2 | D | C | C |
| Comparative Example 17 | (M44) | 0.2 | D | C | C |

From the above results, it became clear that with respect to Examples 1 to 27 in which the value of YI/Δn of the material (M) is 0.5 to 500, the polymerizable composition having good solubility and the optically anisotropic body having less discoloration after long term storage can be obtained.

The invention claimed is:

1. A polymerizable composition comprising:
a compound that has at least one mesogenic group and satisfies an expression represented by Expression (1):

$$Re(450\,nm)/Re(550\,nm) < 1.05 \qquad \text{Expression (1)}$$

wherein Re (450 nm) represents an in-plane phase difference at a wavelength of 450 nm obtained in the case where the molecules of the compound are aligned on a substrate such that a major axis direction of each molecule is aligned substantially horizontally with respect to the substrate, and Re (550 nm) represents an in-plane phase difference at a wavelength of 550 nm obtained in the case where the molecules of the compound are aligned on a substrate such that a major axis direction of each molecule is aligned substantially horizontally with respect to the substrate,
the composition satisfying an expression represented by Expression (2):

$$1.0 \leq YI/\Delta n \leq 500 \qquad \text{Expression (2)}$$

wherein YI represents a yellowness index of a material consisting only of the above-defined compound present in the polymerizable composition, Δn represents a refractive index anisotropy of a material consisting only of the above-defined compound present in the polymerizable composition, provided that a chiral compound having a mesogenic group is excluded from a material consisting only of the above-defined compound.

2. The polymerizable composition according to claim 1, comprising, as the compound defined in claim 1, one or two or more of compounds, which have a polymerizable group.

3. The polymerizable composition according to claim 1, wherein a total content of the compound defined in claim 1 is 5.0% by mass to 99.9% by mass.

4. The polymerizable composition according to claim 1, wherein the polymerizable composition is liquid crystalline.

5. A polymer obtained by polymerizing the polymerizable composition according to claim 1.

6. An optically anisotropic body obtained by polymerizing the polymerizable composition according to claim 1.

7. A phase difference film obtained by polymerizing the polymerizable composition according to claim 1.

8. A display device having the optically anisotropic body according to claim 6.

9. An optical element having the optically anisotropic body according to claim 6.

10. A light-emitting device having the optically anisotropic body according to claim 6.

11. A printed material having the optically anisotropic body according to claim 6.

12. An optical information recording apparatus having the optically anisotropic body according to claim 6.

13. The polymerizable composition according to claim 1, wherein the compound satisfying the expression represented by Expression (1) is represented by General Formula (I),

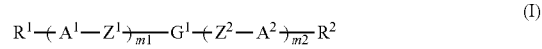

(I)

where $R^1$ and $R^2$ each independently represent a hydrogen atom or a hydrocarbon group having 1 to 80 carbon atoms, the group may have a substituent, and an arbitrary carbon atom may be substituted with a hetero atom, in which at least one of $R^1$ and $R^2$ represents a group represented by Formula (I-0-R),

(I-0-R)

$P^0$ represents a polymerizable group, $Sp^0$ represents a spacer group or a single bond and in the case where a plurality of $Sp^0$'s are present, these may be the same as or different from each other, $X^0$ represents —O—, —S—, —OCH$_2$—, —CH$_2$O—, —CO—, —COO—, —OCO—, —CO—S—, —S—CO—, —O—CO—

—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —COO—CH$_2$CH$_2$—, —CH$_2$CH$_2$—COO—, —CH$_2$CH$_2$—OCO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—N═CH—, —CF═CF—, —C≡C—, or a single bond, and in the case where a plurality of $X^0$'s are present, these may be the same as or different from each other, with the proviso that $P^0$-$(Sp^0$-$X^0)_{k0}$— does not contain an —O—O— bond, and k0 represents an integer of 0 to 10, $A^1$ and $A^2$ each independently represent a 1,4-phenylene group, a 1,4-cyclohexylene group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, and these groups may be unsubstituted or substituted with one or more of substituents L, L represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which one —CH$_2$— or two or more non-adjacent —CH$_2$-'s may be independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, an arbitrary hydrogen atom in the alkyl group may be substituted with a fluorine atom, or L may represent a group represented by $P^L$-$(Sp^L$-$X^L)_{kL}$— in which $P^L$ represents a polymerizable group, $Sp^L$ represents a spacer group or a single bond, and in the case where a plurality of $Sp^L$'s are present, these may be the same as or different from each other, $X^L$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —CH$_2$CH$_2$—COO—, —CH$_2$CH$_2$—OCO—, —OCO—CH$_2$CH$_2$—, —COO—CH$_2$—, —OCO—CH$_2$—, —CH$_2$—COO—, —CH$_2$—OCO—, —CH═CH—, —N═N—, —CH═N—N═CH—, —CF═CF—, —C≡C—, or a single bond, and in the case where a plurality of $X^L$'s are present, these may be the same as or different from each other, with the proviso that $P^L$-$(Sp^L$-$X^L)_{kL}$— does not contain an —O—O— bond, kL represents an integer of 0 to 10, and in the case where a plurality of L's are present in the compound, these may be the same as or different from each other, $Z^1$ and $Z^2$ each independently represent a group represented by —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH═CH—, —N═N—, —CH═N—, —N═CH—, —CH═N—N═CH—, —CF═CF—, —C≡C—, or a single bond, in the case where a plurality of $Z^1$'s are present, these may be the same as or different from each other, and in the case where a plurality of $Z^2$'s are present, these may be the same as or different from each other, but in the case where the plurality of $Z^1$'s and $Z^2$'s are present, at least one of $Z^1$ and $Z^2$ each independently represent a group selected from —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —NH—O—, —O—NH—, —SCH$_2$—, —CH$_2$S—, —CF$_2$O—, —OCF$_2$—, —CF$_2$S—, —SCF$_2$—, —CH═CH—, —N═N—, —CH═N—, —N═CH—, —CF═CF—, —C≡C—, or a single bond, $G^1$ represents a divalent group having at least one aromatic ring selected from the group consisting of an aromatic hydrocarbon ring or an aromatic heterocyclic ring, the number of π electrons contained in the aromatic ring in the group represented by $G^1$ is 12 or higher, and the group represented by $G^1$ may be unsubstituted or substituted with one or more substituents $L^G$'s, $L^G$ represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which one —CH$_2$— or two or more non-adjacent —CH$_2$-'s may be independently substituted with —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, an arbitrary hydrogen atom in the alkyl group may be substituted with a fluorine atom, or $L^G$ may represent a group represented by $P^{LG}$-$(Sp^{LG}$-$X^{LG})_{kLG}$— in which $P^{LG}$ represents a polymerizable group and a preferred polymerizable group therefor is the same as that defined for $P^0$ above, $Sp^{LG}$ represents a spacer group or a single bond and a preferred spacer group therefor represents the same as that defined for $Sp^0$, in the case where a plurality of $Sp^{LG}$'s are present, these are the same as or different from each other, $X^{LG}$ represents —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH═CH—COO—, —CH═CH—OCO—, —COO—CH═CH—, —OCO—CH═CH—, —COO—CH$_2$CH$_2$—, —COO—

$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—N=CH—, —CF=CF—, or a single bond, and in the case where a plurality of $X^{LG}$'s are present, these may be the same as or different from each other, with the proviso that $P^{LG}$-$(Sp^{LG}$-$X^{LG})_{kLG}$— does not contain an —O—O— bond, kLG represents an integer of 0 to 10, and in the case where a plurality of $L^G$'s are present in the compound, these may be the same as or different from each other, and m1 and m2 each independently represent an integer of 0 to 6, provided that m1+m2 represents an integer of 0 to 6.

14. The polymerizable composition according to claim 13, wherein $G^1$ represents a group selected from Formulas (M-1) to (M-6),

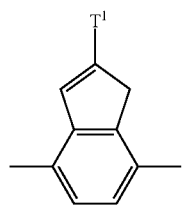

(M-1)

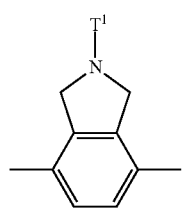

(M-2)

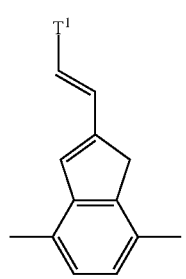

(M-3)

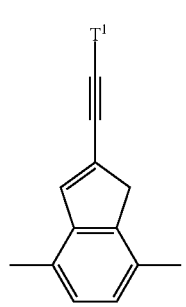

(M-4)

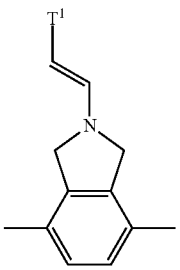

(M-5)

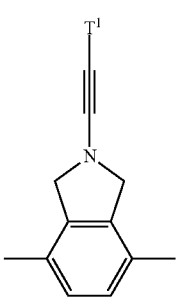

(M-6)

wherein the group selected from Formulas (M-1) to (M-6) may be unsubstituted or substituted with one or more of the substituents $L^G$, an arbitrary —CH= may be independently substituted with —N=, —$CH_2$— may be independently substituted with —O—, —S—, —$NR^T$— where $R^T$ represents a hydrogen atom or an alkyl group having 1 to 20 carbon atoms, —CS—, or —CO—, and $T^1$ represents a group selected from Formulas (T1-1) to (T1-6),

(T1-1)

(T1-2)

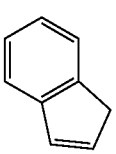

(T1-3)

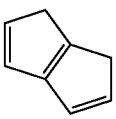

(T1-4)

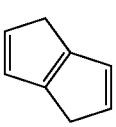

(T1-5)

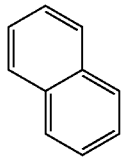

(T1-6)

wherein a bond site may be provided at an arbitrary position, an arbitrary —CH= may be independently substituted with —N=, and each —CH$_2$— may be independently substituted with —O—, —S—, —NR$^T$— where R$^T$ represents a hydrogen atom or an alkyl group having 1 to 20 carbon atoms, —CS—, or —CO—, wherein the group selected from Formulas (T1-1) to (T1-6) may be unsubstituted or substituted with one or more of the substituents L$^G$.

* * * * *